United States Patent
He et al.

(10) Patent No.: US 11,256,255 B2
(45) Date of Patent: Feb. 22, 2022

(54) SELF-MOVING GARDENING ROBOT AND SYSTEM THEREOF

(71) Applicant: Positec Power Tools (Suzhou) Co., Ltd., Jiangsu (CN)

(72) Inventors: Mingming He, Jiangsu (CN); Yiyun Tan, Jiangsu (CN); Yong Shao, Jiangsu (CN)

(73) Assignee: Positec Power Tools (Suzhou) Co., Ltd., Suzhou (CN)

(*) Notice: Subject to any disclaimer, the term of this patent is extended or adjusted under 35 U.S.C. 154(b) by 385 days.

(21) Appl. No.: 16/250,957

(22) Filed: Jan. 17, 2019

(65) Prior Publication Data

US 2019/0278269 A1    Sep. 12, 2019

Related U.S. Application Data

(63) Continuation of application No. PCT/CN2017/093437, filed on Jul. 18, 2017.

(30) Foreign Application Priority Data

Jul. 19, 2016  (CN) .......................... 201610566840.3
Dec. 14, 2016  (CN) .......................... 201611149286.5

(51) Int. Cl.
*G05D 1/00* (2006.01)
*G05D 1/02* (2020.01)
(Continued)

(52) U.S. Cl.
CPC ......... *G05D 1/0088* (2013.01); *G05D 1/0022* (2013.01); *G05D 1/02* (2013.01);
(Continued)

(58) Field of Classification Search
CPC ........ A01D 42/06; A01D 42/02; A01D 42/04; A01D 43/02; A01D 43/006; A01D 43/063;
(Continued)

(56) References Cited

U.S. PATENT DOCUMENTS 6,611,738 B2 * 8/2003 Ruffner ................... B60L 53/14
                                                    701/23
8,634,960 B2 * 1/2014 Sandin ..................... B60L 50/66
                                                    700/258
(Continued)

FOREIGN PATENT DOCUMENTS

CN    1690902    11/2005
CN    1927553    3/2007
(Continued)

OTHER PUBLICATIONS

State Intellectual Property Office of the P R. China, International Search Report and Written Opinion for PCT/CN2017/093437 dated Oct. 16, 2017, Beijing, China, 9 pages.

*Primary Examiner* — Jeff A Burke
*Assistant Examiner* — Zachary Joseph Wallace
(74) *Attorney, Agent, or Firm* — Middleton Reutlinger

(57) ABSTRACT

A self-moving gardening robot, including a positioning module, a control module, a material cavity, and a working module. The positioning module of the self-moving gardening robot is configured to perform path planning, and the control module controls the self-moving gardening robot to travel according to planned path; and the working module performs a corresponding work when the self-moving gardening robot travels. When the material cavity contains different materials, the self-moving gardening robot may finish different functional tasks based on a same control procedure. In one of embodiments, the self-moving gardening robot is further provided with an accessory interface. By (Continued)

connecting different functional accessories through the accessory interface, the self-moving gardening robot implements multiple functions.

19 Claims, 33 Drawing Sheets

(51) Int. Cl.
  *A01D 34/00* (2006.01)
  *A01D 43/00* (2006.01)
  *A01D 101/00* (2006.01)

(52) U.S. Cl.
  CPC ......... *G05D 1/0219* (2013.01); *G05D 1/0225* (2013.01); *G05D 1/0278* (2013.01); *A01D 34/008* (2013.01); *A01D 43/00* (2013.01); *A01D 2101/00* (2013.01); *G05D 2201/0208* (2013.01)

(58) Field of Classification Search
  CPC ........ A01D 43/12; A01D 43/14; A01D 43/16; A01D 2101/00; A01D 34/52; A01D 34/58; A01D 34/4162; A01D 43/105; A01D 34/47; A01D 11/06; A01D 69/025; A01D 34/665; A01D 34/49; A01D 75/004; A01D 89/006; A01D 34/008; A01D 43/082; A01D 43/00; A01D 43/06; A01D 34/13; A01D 75/00
  See application file for complete search history.

(56) References Cited

U.S. PATENT DOCUMENTS

| | | | |
|---|---|---|---|
| 8,938,318 B2 * | 1/2015 | Bergstrom et al. | A01D 34/008 700/245 |
| 9,491,904 B2 | 11/2016 | Jagenstedt et al. | |
| 9,804,604 B2 | 10/2017 | Mattsson et al. | |
| 10,104,835 B2 | 10/2018 | Kohler et al. | |
| 2005/0234610 A1 | 10/2005 | Shimizu et al. | |
| 2011/0295424 A1 * | 12/2011 | Johnson et al. | G05D 1/0274 700/248 |
| 2015/0189830 A1 | 7/2015 | Jagenstedt et al. | |
| 2016/0157422 A1 | 6/2016 | Kholer et al. | |
| 2016/0195876 A1 | 7/2016 | Mattsson et al. | |
| 2016/0198644 A1 | 7/2016 | Lameli et al. | |
| 2017/0079201 A1 | 3/2017 | Jagenstedt et al. | |
| 2017/0251060 A1 | 8/2017 | Larsen et al. | |
| 2017/0361456 A1 | 12/2017 | He et al. | |
| 2018/0213731 A1 | 8/2018 | Wykman et al. | |

FOREIGN PATENT DOCUMENTS

| | | |
|---|---|---|
| CN | 201562145 U | 8/2010 |
| CN | 103054517 | 4/2013 |
| CN | 103744425 A | 4/2014 |
| CN | 204539960 U | 8/2015 |
| CN | 105377015 | 3/2016 |
| CN | 105501321 | 4/2016 |
| CN | 105573311 | 5/2016 |
| EP | 2269433 | 1/2011 |
| EP | 3222391 | 9/2017 |
| JP | 2005309700 A | 11/2005 |
| WO | 2014007729 | 1/2014 |
| WO | 2014029357 | 2/2014 |
| WO | 2015022654 | 2/2015 |
| WO | 2015022672 | 2/2015 |
| WO | 2016024208 | 2/2016 |
| WO | 2016078517 | 5/2016 |
| WO | 2016097892 | 6/2016 |
| WO | 2016103071 | 6/2016 |

* cited by examiner

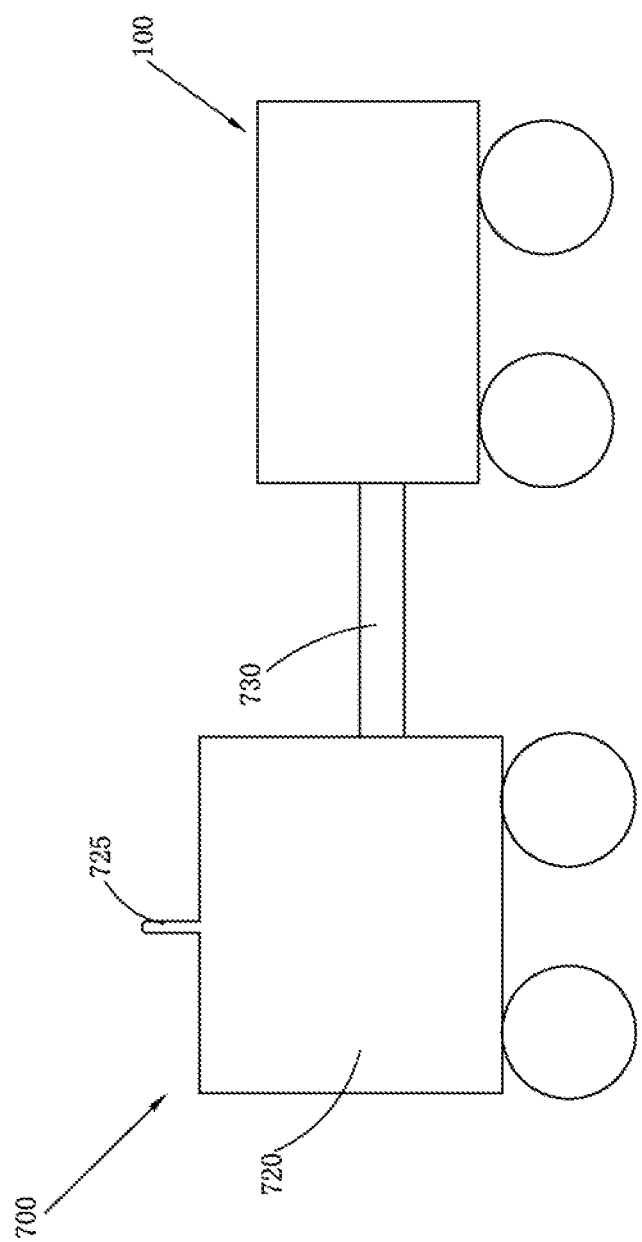

FIG. 26

SELF-MOVING GARDENING ROBOT AND SYSTEM THEREOF

TECHNICAL FIELD

The present invention relates to a self-moving gardening robot and a system thereof. The present invention particularly relates to a self-moving gardening robot and a system thereof for implementing a courtyard maintenance function.

RELATED ART

A common home courtyard scenario is shown in FIG. 1. A whole lawn is usually laid around a house (for example, in front of or back of the house), and bushes, flower beds, or trees are scattered or spread in shapes in other places of the courtyard. A user needs to perform a plurality of different tasks when maintaining the courtyard. Specifically, the tasks include a grass cutting task, a water spraying task, or a fallen leaves sweeping task that is of a high frequency, and a sowing task, a fertilizing task, or a soil loosening and withered grass removing task that is of a low frequency but physical work intensive.

To release users from various types of courtyard maintenance tasks, various automatic and semi-automatic courtyard maintenance machines have emerged on the market, for example, an automatic robotic lawn mower configured to cut grasses, a semi-automatic blowing and sucking machine configured to sweep fallen leaves, various types of automatic irrigation systems configured to spray water, a semi-automatic sowing machine configured to sow, a semi-automatic fertilizing machine configured to fertilize, a semi-automatic soil loosening machine configured to loosen soil, and a weeding machine configured to remove withered grasses.

To finish all courtyard maintenance work, a user needs to buy various machines for performing different tasks. In this way, first the costs are high and second the home environment may be caused to be in disorder.

Further, by merely using a self-moving gardening robot for implementing a single functional task of courtyard maintenance, the user needs to select different functional machines at different times and to control on and off the different functional machines when performing courtyard maintenance. The degree of human intervention is excessively high and robotic courtyard maintenance cannot be well implemented.

Therefore, the user is in urgent need of a self-moving gardening robot platform when performing courtyard maintenance. The self-moving machine platform can be integrated with a plurality of functions of courtyard maintenance.

SUMMARY

In an existing self-moving gardening robot system, a charging station and related circuits need to be arranged for each automatic apparatus separately. A user needs to arrange different boundary signal lines for different systems, and mutual interference may be generated between the boundary signal lines.

In an existing self-moving gardening robot for implementing a single functional task of courtyard maintenance, the self-moving gardening robot merely performs a functional task on a whole lawn according to an instruction. A correspondingly rising problem is that the task may still be mechanically performed in some areas of the courtyard in which the task does not need to be performed, and a same functional task may be repeatedly performed in some areas of the lawn.

In the existing self-moving gardening robot for implementing a single functional task of lawn maintenance, for example, in a self-moving gardening robot for fertilizing, a user needs to replenish a fertilizer in real time when the fertilizer carried by the self-moving machine is used up. The self-moving gardening robot for fertilizing lacks full automation and is not advantageous in user experience.

In the existing self-moving gardening robot for implementing a single functional task of lawn maintenance, although a user can remotely control the self-moving gardening robot, a supplier or service provider of the self-moving gardening robot does not implement working condition counting and simple management and control function of the self-moving gardening robot by using a remote facility.

At present, to resolve a lawn irrigation problem in a courtyard, a user usually uses an automatic irrigation system with embedded pipes or performs irrigation manually. By using an automatic irrigation system with embedded pipes, laying of the pipes not only causes damage to the lawn surface, but also costs labor and money. By performing irrigation manually, the user cannot be released from the courtyard maintenance tasks. Therefore, an automatic water spraying machine not needing embedded pipes is needed urgently to resolve the lawn irrigation problem.

In view of the above, an objective of the present invention lies in providing a self-moving gardening robot having a positioning function, capable of working and traveling along a planned path, and integrated with multiple functions.

A technical solution of the embodiments of the present invention is: a self-moving gardening robot, configured to perform at least two lawn care works, including: a housing; a moving module, driving the self-moving gardening robot to move; a working module, performing the corresponding lawn care work; a power module, driving the moving module and the working module; an energy module, supplying energy to the self-moving gardening robot; and a control module, controlling the self-moving gardening robot to automatically move and perform a work, where the self-moving gardening robot includes a positioning module, configured to obtain location information of the self-moving gardening robot; the control module includes a path planning unit, storing a preset path mode; and the control module controls, based on obtained location information, the self-moving gardening robot to move in the preset path mode.

In one of embodiments, the path planning unit stores at least two preset path modes and the control module controls the self-moving gardening robot to move in the corresponding preset path modes respectively when performing the at least two lawn care works.

In one of embodiments, the working module comprises at least two of a grass cutting module, a liquid spraying module, a fertilizing module, a soil loosening module, a fallen leaves collecting module, a sowing module, a withered grass removing module, and a sweeping module, to respectively perform the corresponding lawn care works.

In one of embodiments, the self-moving gardening robot comprises an accessory interface, configured to externally connect the working module performing the lawn care work.

In one of embodiments, the self-moving gardening robot comprises an ambient detection module, configured to detect an environment of a working area; the control module generates a preset moving path or a preset target location based on the preset path mode and based on at least the ambient information and/or the location information; and the control module controls the self-moving gardening robot to move along the preset moving path or to move toward the preset target location.

In one of embodiments, the control module generates at least two preset moving paths for performing one lawn care work, so that moving paths of the self-moving gardening robot when performing the corresponding lawn care work are not repeated.

In one of embodiments, the preset moving path comprises a reciprocating path;

the working module comprises a fallen leaves collecting module, configured to perform a fallen leaves collecting work; and the fallen leaves collecting module comprises a leaves raking part, configured to centralize fallen leaves on a working surface and to enable the centralized fallen leaves to move with the self-moving gardening robot; and the control module controls the self-moving gardening robot to move along the reciprocating path when performing the fallen leaves collecting work, controls the leaves raking part to perform a leaves raking work when the self-moving gardening robot moves along one direction of the reciprocating path, so that the fallen leaves move to a fallen leaves storage location along the moving direction of the self-moving gardening robot, and controls the leaves raking part not to perform the leaves raking work when the self-moving gardening robot moves along the other direction of the reciprocating path, so that the self-moving gardening robot returns to a working location.

In one of embodiments, the working module comprises a spraying device, configured to perform a liquid spraying work; and the preset target location comprises a spraying location; and the control module generates at least two spraying locations, and the control module controls the self-moving gardening robot to move to the at least two spraying locations to perform the liquid spraying work and controls working parameters of the self-moving gardening robot to be different when the self-moving gardening robot performs the liquid spraying work at the at least two spraying locations.

In one of embodiments, the preset target location comprises a location of a docking station of the self-moving gardening robot, or the preset moving path comprises a moving path for the self-moving gardening robot to return back to the docking station; and when the self-moving gardening robot interrupts performing at least one lawn care work, the control module records a location and a gesture of the self-moving gardening robot when the work is interrupted, then controls the self-moving gardening robot to move toward the docking station based on the preset moving path or the preset target location, and further controls the self-moving gardening robot to return to the location where the work is interrupted and to continuously work in the gesture when the work is interrupted.

In one of embodiments, the working module comprises a fallen leaves collecting module, configured to perform a fallen leaves collecting work; the fallen leaves collecting module comprises a fallen leaves storage part, storing the collected fallen leaves; and the docking station is configured to store the fallen leaves stored in the fallen leaves storage part;

the fallen leaves storage part comprises a capacity detection device, detecting a capacity of the fallen leaves stored in the fallen leaves storage part;

when the capacity detection device detects that the capacity of the fallen leaves stored in the fallen leaves storage part reaches a preset threshold, the control module controls the self-moving gardening robot to interrupt the fallen leaves collecting work, records a current location and gesture, then controls the self-moving gardening robot to move toward the docking station based on the preset moving path or the preset target location to store the fallen leaves, and further controls the self-moving gardening robot to return back to the recorded location and to continuously perform the fallen leaves collecting work in the recorded gesture.

In one of embodiments, the self-moving gardening robot comprises a material cavity, configured to store a material and the self-moving gardening robot performs a corresponding material spreading work; and the docking station is configured to replenish a material to the material cavity;

the material cavity comprises a capacity detection device, detecting a material capacity in the material cavity; and when the capacity detection device detects that the material capacity in the material cavity is less than a preset threshold, the control module controls the self-moving gardening robot to interrupt the spreading work, records a current location and gesture, then controls the self-moving gardening robot to move toward the docking station based on the preset moving path or the preset target location, to replenish a material to the material cavity, and further controls the self-moving gardening robot to return back to the recorded location and to continuously perform the spreading work in the recorded gesture.

In one of embodiments, the moving path for the self-moving gardening robot to return back to the docking station does not pass through an area where the self-moving gardening robot has performed the lawn care work.

In one of embodiments, the moving path for the self-moving gardening robot to return back to the docking station comprises a shortest path from a returning start point to the docking station.

In one of embodiments, the control module controls the self-moving gardening robot to return back to the docking station in a varying moving path.

In one of embodiments, the positioning module comprises a DGPS receiving module, configured to receive a satellite signal.

In one of embodiments, the self-moving gardening robot comprises a wireless communication module, configured to implement wireless communications between the self-moving gardening robot and a user equipment, the self-moving gardening robot receives a preset path mode set by a user through the wireless communication module, and the path planning unit stores the preset path mode set by the user.

In one of embodiments, the self-moving gardening robot comprises a self-learning mode, and in the self-learning mode, the self-moving gardening robot learns about a preset path mode, and the path planning unit stores the preset path mode learned by the self-moving gardening robot.

In one of embodiments, the self-moving gardening robot comprises a function selection module and the control module controls the self-moving gardening robot to correspondingly perform at least one lawn care work according to an instruction received by the function selection module.

In one of embodiments, the self-moving gardening robot comprises an input module, disposed in the housing, for a user to input an instruction of performing at least one lawn care work, and configured to transmit the instruction to the function selection module.

In one of embodiments, the self-moving gardening robot comprises a wireless communication module, configured to implement wireless communications between the self-moving gardening robot and a user equipment; and the wireless communication module receives an instruction of performing at least one lawn care work and sent by the user equipment and transmits the instruction to the function selection module.

In one of embodiments, the control module controls an order for the self-moving gardening robot to perform the at least two lawn care works according to the instruction received by the function selection module.

In one of embodiments, the self-moving gardening robot comprises a grass condition identification sensor, configured to identify a grass growth condition; the control module comprises a storage unit and the storage unit stores location information of a location where the self-moving gardening robot passes during moving and information about a grass condition identified at the location; and after the self-moving gardening robot traverses a working area, the control module counts grass conditions in the working area.

In one of embodiments, the self-moving gardening robot comprises a wireless communication module and is remotely connected to a service end through the wireless communication module and the service end collects or/and counts relevant data information about the self-moving gardening robot.

A beneficial effect of the embodiments of the present invention is: the self-moving gardening robot is capable of performing at least two lawn care works and has a path planning function, thereby being cost effective, easy to use, and more intelligent.

A self-moving gardening robot, performing at least two lawn care works, comprising:

a housing;

a moving module, driving the self-moving gardening robot to move;

a working module, performing the corresponding lawn care work;

a power module, driving the moving module and the working module;

an energy module, supplying energy to the self-moving gardening robot; and a control module, controlling the self-moving gardening robot to automatically move and perform a work, wherein:

the control module generates a working time plan and the control module controls a start or end time for the self-moving gardening robot to perform the at least two lawn care works according to the working time plan.

In one of embodiments, the self-moving gardening robot comprises an input module, for a user to input information about the working time plan of the self-moving gardening robot or an instruction; and the control module generates the working time plan according to the information or the instruction received by the input module.

In one of embodiments, the self-moving gardening robot comprises a wireless communication module, configured to implement wireless communications between the self-moving gardening robot and a user equipment; the wireless communication module receives information about the working time plan or an instruction sent by the user equipment; and the control module generates the working time plan according to the information or instruction received by the wireless communication module.

In one of embodiments, the self-moving gardening robot comprises a wireless communication module; the wireless communication module receives weather information through the Internet; and the control module generates the working time plan according to the weather information received by the wireless communication module.

In one of embodiments, the self-moving gardening robot comprises an ambient detection module, detecting an ambient condition; and the control module generates the working time plan according to the ambient condition detected by the ambient detection module.

In one of embodiments, the self-moving gardening robot comprises a wireless communication module, configured to implement wireless communications between the self-moving gardening robot and a user equipment; and the control module sends information about the ambient condition to the user equipment through the wireless communication module and formulates the working time plan through an application applied to the user equipment.

In one of embodiments, the ambient detection module comprises a capacitive sensor or an image sensor.

In one of embodiments, the working time plan comprises an order for the self-moving gardening robot to perform the at least two lawn care works.

In one of embodiments, the working time plan comprises a time interval for the self-moving gardening robot to perform the at least two lawn care works.

In one of embodiments, the working time plan comprises a frequency for the self-moving gardening robot to perform one lawn care work.

In one of embodiments, the control module comprises a storage unit, storing a map of a working area, and divides the working area into several working subareas based on the map of the working area, and the control module controls start or end times for the self-moving gardening robot to perform the lawn care work in different working subareas to be different.

In one of embodiments, the self-moving gardening robot comprises an ambient detection module, detecting an ambient condition, and the control module updates the map of the working area according to information about the ambient condition detected by the ambient detection module.

In one of embodiments, the energy module comprises a battery pack; and an area of the working subarea is not greater than a working area covered by the self-moving gardening robot in a discharging process of the battery pack.

In one of embodiments, the self-moving gardening robot comprises a material cavity, configured to store a material; and an area of the working subarea is not greater than a working area covered by the self-moving gardening robot after finishing spreading the material stored in the material cavity.

In one of embodiments, division of the working area by the control module comprises at least two dividing modes; and results of dividing the working area by the control module in the two dividing modes are different.

A beneficial effect of the embodiments of the present invention is: the self-moving gardening robot is capable of performing at least two lawn care works and has an automatic scheduling function, thereby being cost effective, easy to use, and more intelligent.

A self-moving gardening robot, comprising:

a housing;

a moving module, driving the self-moving gardening robot to move;

a working module, performing a corresponding work;

a power module, driving the moving module and the working module;

an energy module, supplying energy to the self-moving gardening robot; and a control module, controlling the self-moving gardening robot to automatically move and perform a work, wherein:

the self-moving gardening robot further comprises a material cavity, configured to store a material; and the material cavity comprises a material opening;

the working module comprises an automatic switch, and the automatic switch is configured to open or close the material opening; and the control module controls the automatic switch to open the material opening, to perform a material spreading work.

In one of embodiments, a capacity detection device is disposed in or on the material cavity and is configured to detect a residual material capacity in the material cavity.

In one of embodiments, the capacity detection device comprises a ranging sensor, a weight sensor, or a space sensor.

In one of embodiments, the control module comprises a capacity conversion unit that converts the capacity detected by the capacity detection device based on a preset algorithm and according to a slope gradient of a slope where the self-moving gardening robot is located.

In one of embodiments, the capacity detection device comprises at least two capacity detection sensors, disposed along a moving direction of the self-moving gardening robot; and the control module calculates the residual material capacity in the material cavity based on outputs of the at least two capacity detection sensors.

In one of embodiments, the self-moving gardening robot comprises a display module, configured to prompt information about the residual material capacity.

In one of embodiments, the self-moving gardening robot comprises a wireless communication module, configured to implement wireless communications between the self-moving gardening robot and a user equipment; and the self-moving gardening robot sends information about the residual material capacity to the user equipment through the wireless communication module.

In one of embodiments, the material cavity is configured to store at least two materials; and the self-moving gardening robot performs a corresponding lawn care work according to a type of the material stored in the material cavity.

In one of embodiments, the control module controls a moving speed of the self-moving gardening robot or controls a dimension by which the automatic switch opens the material opening, according to the type of the material stored in the material cavity.

In one of embodiments, the type of the material stored in the material cavity comprises water, a nutrient solution, pesticides, a fertilizer, or seeds.

In one of embodiments, the material cavity comprises at least two chambers.

In one of embodiments, one of the chambers stores a nutrient solution or pesticides, and the other chamber stores water; a liquid passage and a passage switch are disposed between the chambers; the passage switch is configured to open or close the liquid passage; and the nutrient solution or the pesticides flow toward the chamber that stores water when the passage switch opens the liquid passage.

In one of embodiments, the material cavity comprises a partition plate and the at least two chambers are formed by the partition plate; the material cavity comprises a partition plate switch, configured to open or close the partition plate; and when the partition plate switch opens the partition plate, the materials are connected in the at least two chambers.

In one of embodiments, there is a height difference between bottom surfaces of the chambers.

In one of embodiments, the housing is provided with a counter weight, disposed in front of a moving direction of the self-moving gardening robot.

In one of embodiments, a cleaning device is disposed in the material cavity to automatically or by a user to initiate cleaning the material cavity.

In one of embodiments, a wall of the material cavity is at least partially made of a thermal conductive material.

In one of embodiments, the material cavity is disposed in the housing; or the material cavity mates with the housing through a connection device and moves with the self-moving gardening robot.

In one of embodiments, the housing is further provided with a drip irrigation device; and the drip irrigation device is connected to the material cavity.

In one of embodiments, the drip irrigation device comprises a drip irrigation opening; the drip irrigation opening is not higher than a bottom of the housing or a distance between the drip irrigation opening and a working surface is not greater than 15 cm.

In one of embodiments, a width of the drip irrigation device is not less than that of the housing.

In one of embodiments, the drip irrigation device is disposed at a rear side of the moving module.

In one of embodiments, the drip irrigation device is connected to the material opening; the drip irrigation device comprises a drip irrigation opening; and a cross section of the drip irrigation opening increases with an increase in a distance between the drip irrigation opening and the material opening.

In one of embodiments, the housing is further provided with a spraying device; and the spraying device is connected to the material cavity.

In one of embodiments, the spraying device comprises a spraying nozzle and a pump; and the control module controls a throw range of the spraying device by controlling a magnitude of a hydraulic pressure formed by the pump.

In one of embodiments, the working module comprises a cutting module, driven by a driving module to rotate; and the cutting module is disposed below the material opening;

the cutting module rotates to perform a grass cutting work; and the cutting module rotates to further perform a material spreading work.

In one of embodiments, the control module controls a rotation speed of the cutting module; and the cutting module respectively performs the grass cutting and material spreading works when rotating at different rotation speeds.

In one of embodiments, a rotation speed of the cutting module when performing the grass cutting work is greater than that of the cutting module when performing the material spreading work.

In one of embodiments, the control module controls a rotation speed of the cutting module to be greater than 2000 r/min when the cutting module rotates to perform the grass cutting work.

In one of embodiments, the control module controls a rotation speed of the cutting module to be less than or equal to 1000 r/min when the cutting module rotates to perform the material spreading work.

In one of embodiments, the control module controls a rotation speed of the cutting module to be different when the cutting module performs spreading works of different materials.

In one of embodiments, the control module controls the self-moving gardening robot to move to a docking station to replenish a material when the capacity detection device detects that a residual material capacity is lower than a preset threshold.

In one of embodiments, the material cavity comprises a main cavity and an overflowing preventing cavity; the overflowing preventing cavity is communicated with the main cavity at a preset height; when a height of a material in the main cavity is higher than a preset height, the material flows out of the material cavity through the overflowing preventing cavity.

In one of embodiments, the docking station comprise a material replenishing device; the material replenishing device comprises a material replenishing opening and a material replenishing switch; the material replenishing switch is configured to open or close the material replenishing opening; and the material replenishing device delivers the material out when the material replenishing switch opens the material replenishing opening.

In one of embodiments, the material replenishing device comprises a docking detection device, configured to detect whether the self-moving gardening robot is at a predetermined location of the docking station; and if it is detected that the self-moving gardening robot is at the predetermined location of the docking station, the material replenishing device replenishes the material to the material cavity.

In one of embodiments, the self-moving gardening robot sends a docking signal to the material replenishing device, to indicate a type of the material stored in the material cavity; and the material replenishing device replenishes the material of the corresponding type to the material cavity according to the received docking signal.

In one of embodiments, the self-moving gardening robot comprises a wireless communication module, in wireless communications with the material replenishing device; and when the material capacity in the material cavity is higher than a preset threshold, the self-moving gardening robot sends a signal to the material replenishing device through the wireless communication module, to instruct the material replenishing device to stop replenishing the material.

A beneficial effect of the embodiments of the present invention is: by disposing a material cavity, different functions can be implemented on one same machine, thereby improving an efficiency of using the machine.

A self-moving gardening robot system, comprising a self-moving gardening robot according to any one of the claims, and a docking station.

In one of embodiments, the docking station is further configured to replenish energy to an energy module of the self-moving gardening robot.

A technical solution of the embodiments of the present invention is: a self-moving gardening robot, including: a housing; a moving module, driving the self-moving gardening robot to move; a working module, performing the corresponding lawn care work; a power module, driving the moving module and the working module; an energy module, supplying energy to the self-moving gardening robot; and a control module, controlling the self-moving gardening robot to automatically move and perform a work, where the self-moving gardening robot further includes a positioning module, configured to determine location information of the self-moving gardening robot; the control module includes a path planning unit; the control module travels or/and works along a path set by the path planning unit based on the location information; and the self-moving gardening robot further includes a material cavity, configured to store a material.

In one of embodiments, the positioning module includes a DGPS receiving module, configured to receive a satellite signal.

In one of embodiments, the material cavity is disposed in the housing and includes a material inlet and a material opening.

In one of embodiments, the working module includes an automatic valve, where the automatic valve opens or/and closes the material inlet and the material opening under control of the control module.

In one of embodiments, the self-moving gardening robot performs different functions when the material cavity stores different materials.

In one of embodiments, the self-moving gardening robot performs a water spraying function when the material cavity stores water.

In one of embodiments, the housing is further provided with a drip irrigation device; and the drip irrigation device is connected to the material cavity.

In one of embodiments, the housing is further provided with a spraying device; and the spraying device is connected to the material cavity.

In one of embodiments, the self-moving gardening robot performs a sowing function when the material cavity stores seeds.

In one of embodiments, the self-moving gardening robot performs a pesticides spraying function when the material cavity stores pesticides.

In one of embodiments, the self-moving gardening robot performs a fertilizing function when the material cavity stores a fertilizer.

In one of embodiments, a capacity detection device is disposed in or on the material cavity and is configured to detect a residual material capacity in the material cavity.

In one of embodiments, the capacity detection device is an infrared detection sensor.

In one of embodiments, the self-moving gardening robot is provided with an accessory interface, configured to externally connect accessories for implementing different functions.

In one of embodiments, in the self-moving gardening robot, a cutting module is disposed below the material cavity, and the cutting module is driven by the power module to rotate.

In one of embodiments, the control module controls a rotation speed of the cutting module to be different, to implement different functions by using the same cutting module.

In one of embodiments, the control module controls a rotation speed of the cutting module to be greater than 2000 r/min when the cutting module performs a cutting function.

In one of embodiments, the control module controls a rotation speed of the cutting module to be less than or equal to 1000 r/min when the cutting module performs a spreading function.

In one of embodiments, the self-moving gardening robot further includes a grass condition identification sensor, configured to identify a grass condition at a location where the self-moving gardening robot is located.

In one of embodiments, the grass condition identification sensor is a capacitive sensor, and a signal processing circuit connected to the capacitive sensor outputs different frequency signals at different grass conditions.

In one of embodiments, the grass condition identification sensor is an image/video sensor, and the control module identifies, based on an image obtained by the image/video sensor, the grass condition according to a color and texture of the image.

In one of embodiments, the control module controls whether the working module performs a work based on the grass condition identified by the grass condition identification sensor.

In one of embodiments, the self-moving gardening robot further includes a wireless communication module, configured to perform remote data and/or instruction communications.

In one of embodiments, the self-moving gardening robot is remotely connected to a service end through the wireless communication module, and the service end is remotely connected to a user equipment.

In one of embodiments, the service end collects or/and counts relevant data information of the self-moving gardening robot.

In one of embodiments, the service end monitors weather forecast information and remotely changes a working schedule of the self-moving gardening robot through the wireless communication module based on the weather forecast information.

In one of embodiments, the wireless communication module obtains weather forecast information, and the control module changes the working schedule of the self-moving gardening robot based on the weather forecast information.

In one of embodiments, the control module includes a storage unit, and the storage unit stores relevant data of the self-moving gardening robot; and when the self-moving gardening robot is in a wireless communication coverage, the wireless communication module remotely transmits the relevant data stored in the storage unit.

In one of embodiments, the control module controls the self-moving gardening robot to travel to a docking station to replenish a material when the control module detects that a material capacity in the material cavity is lower than a preset threshold.

In one of embodiments, the docking station is provided with a material replenishing device, and the material replenishing device is provided with a docking detection device, configured to detect whether the self-moving gardening robot is in a predetermined location of the docking station.

In one of embodiments, the material replenishing device is provided with an automatic valve and the automatic valve automatically starts opening and closing of the material.

The embodiments of the present invention further provides a technical solution: a multi-functional self-moving gardening robot, including: a housing; a moving module, driving the self-moving gardening robot to move; a multi-functional module, performing works corresponding to different functions; a power module, driving the moving module and the working module; an energy module, supplying energy to the self-moving gardening robot; a control module, controlling the self-moving gardening robot to automatically move and perform a work; and a positioning module, configured to determine location information of the self-moving gardening robot, where the self-moving gardening robot has a single functional selection mode and a full-automatic multi-functional mode; in the single functional selection mode, the self-moving gardening robot automatically performs a selected single functional task; and in the full-automatic multi-functional mode, the self-moving gardening robot automatically performs a plurality of functional tasks in different time periods or/and at intervals of different time periods.

The embodiments of the present invention further provides a technical solution: a multi-functional self-moving gardening robot, including: a housing; a moving module, driving the self-moving gardening robot to move; a multi-functional module, performing works corresponding to different functions; a power module, driving the moving module and the working module; an energy module, supplying energy to the self-moving gardening robot; a control module, controlling the self-moving gardening robot to automatically move and perform a work; a positioning module, configured to determine location information of the self-moving gardening robot; a grass condition identification sensor, configured to identify a growth condition of the grasses, where the control module includes a storage unit and the storage unit stores location information of a location where the self-moving gardening robot passes during traveling and information about a grass condition identified at the location; and after the self-moving gardening robot traverses a working area, the control module counts grass conditions in the working area.

The embodiments of the present invention further provides a technical solution: a multi-functional self-moving gardening robot system, including a self-moving gardening robot and a docking station, where the self-moving gardening robot includes: a housing; a moving module, driving the self-moving gardening robot to move; a multi-functional module, performing works corresponding to different functions; a power module, driving the moving module and the working module; an energy module, supplying energy to the self-moving gardening robot; a control module, controlling the self-moving gardening robot to automatically move and perform a work; and a positioning module, configured to determine location information of the self-moving gardening robot; and the docking station includes a material replenishing device or/and an accessory switching device, where the multi-functional module includes a material cavity or/and an accessory interface, and the self-moving gardening robot automatically travels to the docking station for replenishing a material or transferring an accessory when a capacity in the material cavity is less than a preset threshold or accessory transfer is needed.

Compared with the existing technology, beneficial effects of the embodiments of the present invention are: in the embodiments of the present invention, a material cavity is disposed and different functions can be implemented on one same machine, thereby improving an efficiency of using the machine. In the embodiments of the present invention, a positioning device is used, so that the self-moving gardening robot can implement path planning in a self-moving and working process, thereby better performing the work, ensuring covering the working area, and improving efficiency. The self-moving gardening robot of the embodiments of the present invention has a single functional selection mode and a full-automatic multi-functional mode, providing semi-automatic and full-automatic lawn maintenance policies for a user, thereby well improving the user experience. The embodiments of the present invention provide a self-moving gardening robot working system, in which a docking station includes a material replenishing device and an accessory switching device, capable of automatically adding a material or transferring a functional accessory for the self-moving gardening robot, thereby providing an automatic performance of the self-moving gardening robot and improving the user experience. The embodiments of the present invention use a grass condition identification sensor and a positioning device are used and can count grass conditions of a whole working area, thereby facilitating intuitive learning of information about the grass conditions of the lawn.

Compared with the existing technology, beneficial effects of the embodiments of the present invention are: the embodiments of the present invention provide an automatic water spraying robot, capable of finishing a water spraying task on a lawn and automatically adding water when a water source in the material cavity is insufficient. The automatic water spraying robot of the embodiments of the present invention implements path planning by using a positioning module, sprays water along a path in the path plan, and does not damage a lawn on which water has been sprayed. The automatic water spraying robot of the embodiments of the present invention can irrigate a flower garden in a courtyard by using a spraying device and can automatically travel to a location of the flower garden to perform an irrigation work through the positioning module.

BRIEF DESCRIPTION OF THE DRAWINGS

The foregoing objectives, technical solutions, and beneficial effects of the present invention may be described in detail through the specific embodiments capable of implementing the present invention below.

The same labels and symbols in the accompanying drawings and specification are used to represent the same or identical elements.

FIG. 8 is a schematic structural diagram of a self-moving gardening robot according to another implementation of the present invention;

FIG. 26 is a schematic diagram of other partition of a working subarea by a self-moving gardening robot according to the present invention;

| | | |
|---|---|---|
| 100. Self-moving gardening robot | 10. Housing | 20. Moving module |
| 30. Control module | 40. Grass condition identification sensor | 41. Probe |
| 43. Input capacitor | 45. Resistor | 47. Schmitt trigger |
| 52. Material cavity | 56. Cutting module | 521. Material inlet |
| 523. Material outlet | 54a. First soil loosening accessory | 54b. Second soil loosening accessory |

| | | |
|---|---|---|
| 54c. Fallen leaves sucking accessory | 54d. Fallen leaves raking accessory | 3. Working area |
| 12. Accessory interface | 90. Wireless communication module | 300. Service end |
| 200. User equipment | 80. Power module | 70. Positioning module |
| 500. Material replenishing device | 400. Docking station | 501. Automatic valve |
| 524. Capacity detection device | 524a. First capacity detection device | 524b. Second capacity detection device |
| 523a. First material outlet | 523b. Second material outlet | 52a. First material cavity |
| 52b. Second material cavity | 50. Working module | 542. Mating part |
| 542a. Left mating part | 542b. Right mating part | 544. Rigid shaft |
| 548. Rolling part | 546. Protrusion | 543. Fallen leaves collecting device |
| 5431. Fallen leaves storage part | 5433. Fallen leaves collecting part | 503. Material pipe |
| 505. Tail | 527. Hall sensor | 528a. Drip irrigation device |
| 528b. Drip irrigation device | 545. Leaves raking part | 526. Spraying device |
| 60. Energy Module | 302. Capacity conversion unit | 511. Partition plate |
| 513. Partition plate valve | 700. Drag box | 710. Connection interface |
| 720. Box body | 730. Connector | 725. Sprinkler device |
| 51. Nutrient cavity | 53. Control valve | 529. Drip irrigation device |
| 5291. Connection part | 5293. Drip irrigation accessory | 5292. Drip hole |
| 524. Water overflowing cavity | 522. Main cavity | 525. Water overflowing vent |
| 527. Water overflowing vent | | |

DETAILED DESCRIPTION

Detailed description and technical content of the present invention are described in combination with the accompanying drawings. However, the attached accompanying drawings merely provide reference and description, but are not intended to limit the present invention.

Figure 2:
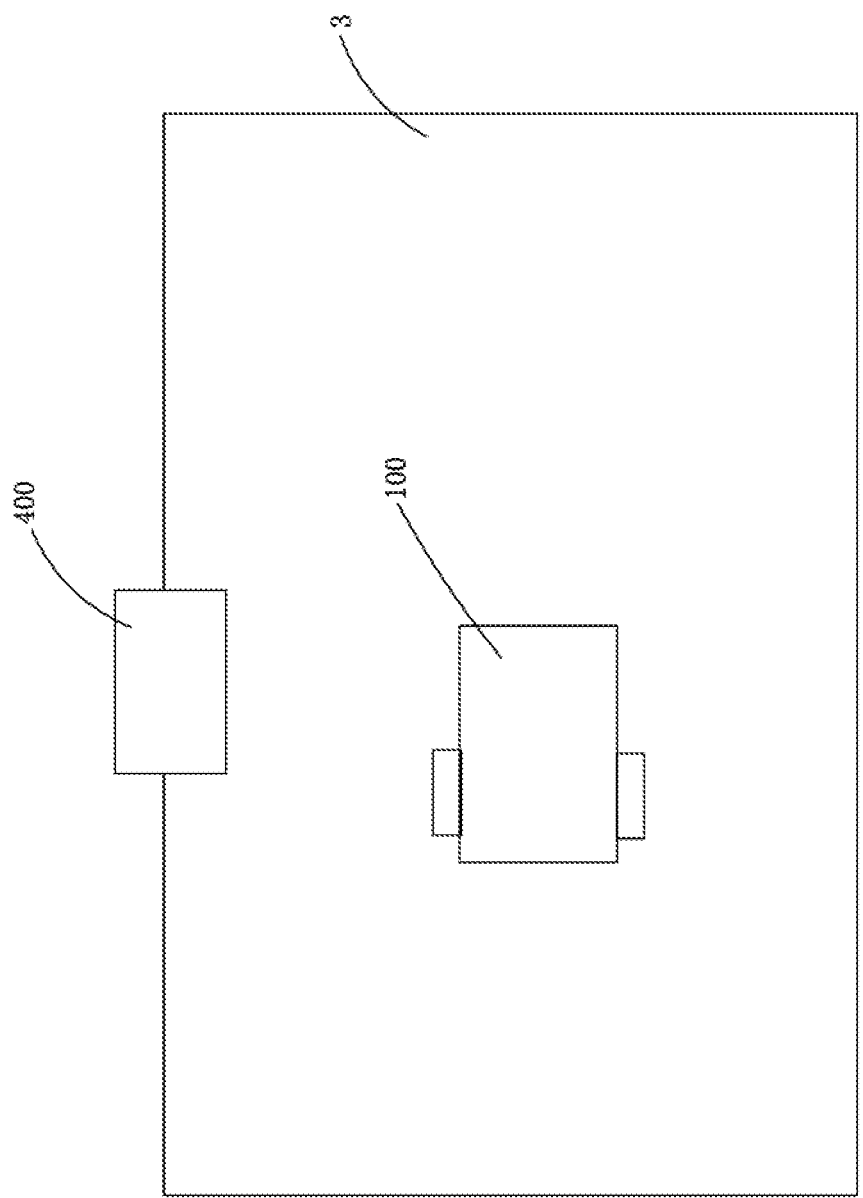
FIG. 2 is a schematic diagram of a self-moving gardening robot working system according to an implementation of the present invention.

FIG. 2 shows a self-moving gardening robot working system. The self-moving gardening robot working system includes a self-moving gardening robot 100 and a docking station 400. The self-moving gardening robot 100 automatically travels and performs a work in a working area 3. The docking station 400 is arranged in or near boundaries of the working area 3, for docking the self-moving gardening robot 100, providing energy replenishing, or/and providing material replenishing, or the like.

Figure 3:
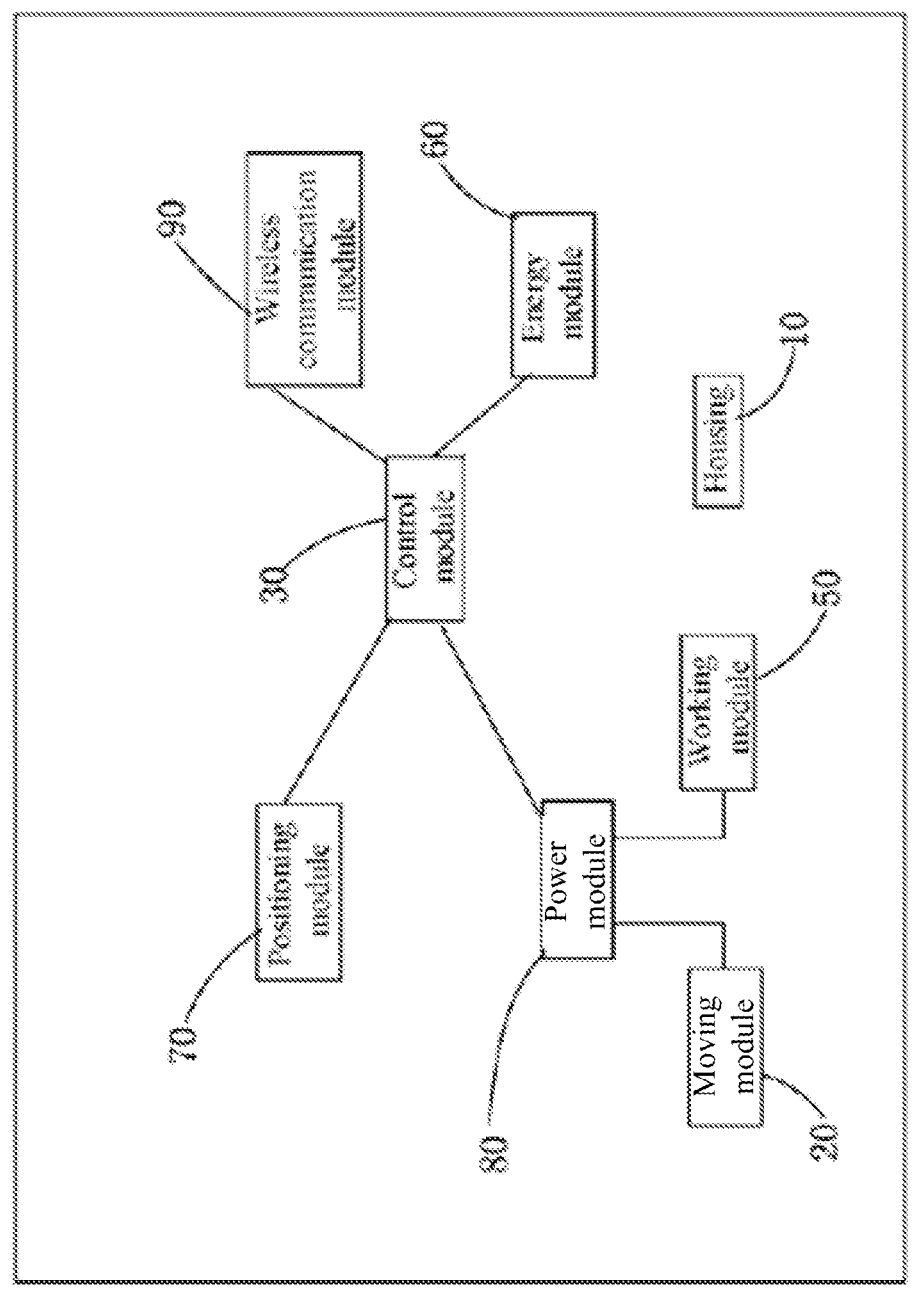
FIG. 3 is a composition block diagram of a self-moving gardening robot according to an implementation of the present invention.

FIG. 3 shows a composition block diagram of a self-moving gardening robot 100. The self-moving gardening robot 100 includes a housing 10, a moving module 20, a power module 80, a working module 50 configured to perform a work, a control module 30 configured to control the self-moving gardening robot 100 to automatically perform a work and move, and an energy module 60 supplying energy to the self-moving gardening robot 100. The moving module 20 may specifically use a track-mobile or wheeled-mobile mode. The energy module 60 may be specifically a lead acid battery, a rechargeable lithium battery, or a super capacitor. Alternatively, the energy module 60 may use solar power or wind power for energy replenishing. The power module 80 may be specifically a driving motor. There may be one or more driving motors, configured to drive the moving module 20 to travel and to drive the working module 50 to perform a corresponding function. Referring to FIG. 3, in one of embodiments, the self-moving gardening robot 100 further includes a positioning module 70. The positioning module 70 is configured to determine location information of the self-moving gardening robot 100. The positioning module 70 may assist the self-moving gardening robot 100 to implement a plurality of functions such as navigation and path planning.

In an embodiment, the positioning module 70 is a GPS positioning device and implements a positioning function by receiving a satellite signal. In an embodiment, the positioning module 70 is a DGPS positioning device and implements differential precise positioning by receiving a satellite signal and cooperating with a base station. In an embodiment, the positioning module 70 is an odometer and compass combined device and implements a positioning function by calculating a travel distance and determining a moving direction. In an embodiment, the positioning module 70 is a combination of a GPS positioning device and an inertial navigation device and implements precise positioning through combined use of the inertial navigation device and the GPS positioning device. In an embodiment, the positioning module 70 is an image navigation device and implements a positioning function by comparing photographed image information and stored image information.

Referring to FIG. 3, in one of embodiments, the self-moving gardening robot 100 further includes a wireless communication module 90 configured for remote communications. The wireless communication module 90 is electrically connected to the control module 30. The control module 30 includes a storage unit configured to store programs and data. The control module 30 sends data to the outside or receives data and instructions from the outside through the wireless communication module 90. The specific device types of the wireless communication module 90 may be various wireless communications devices such as a WiFi device, a Bluetooth device, a cellular mobile communications device, Zigbee, and sub-1G.

Figure 4:
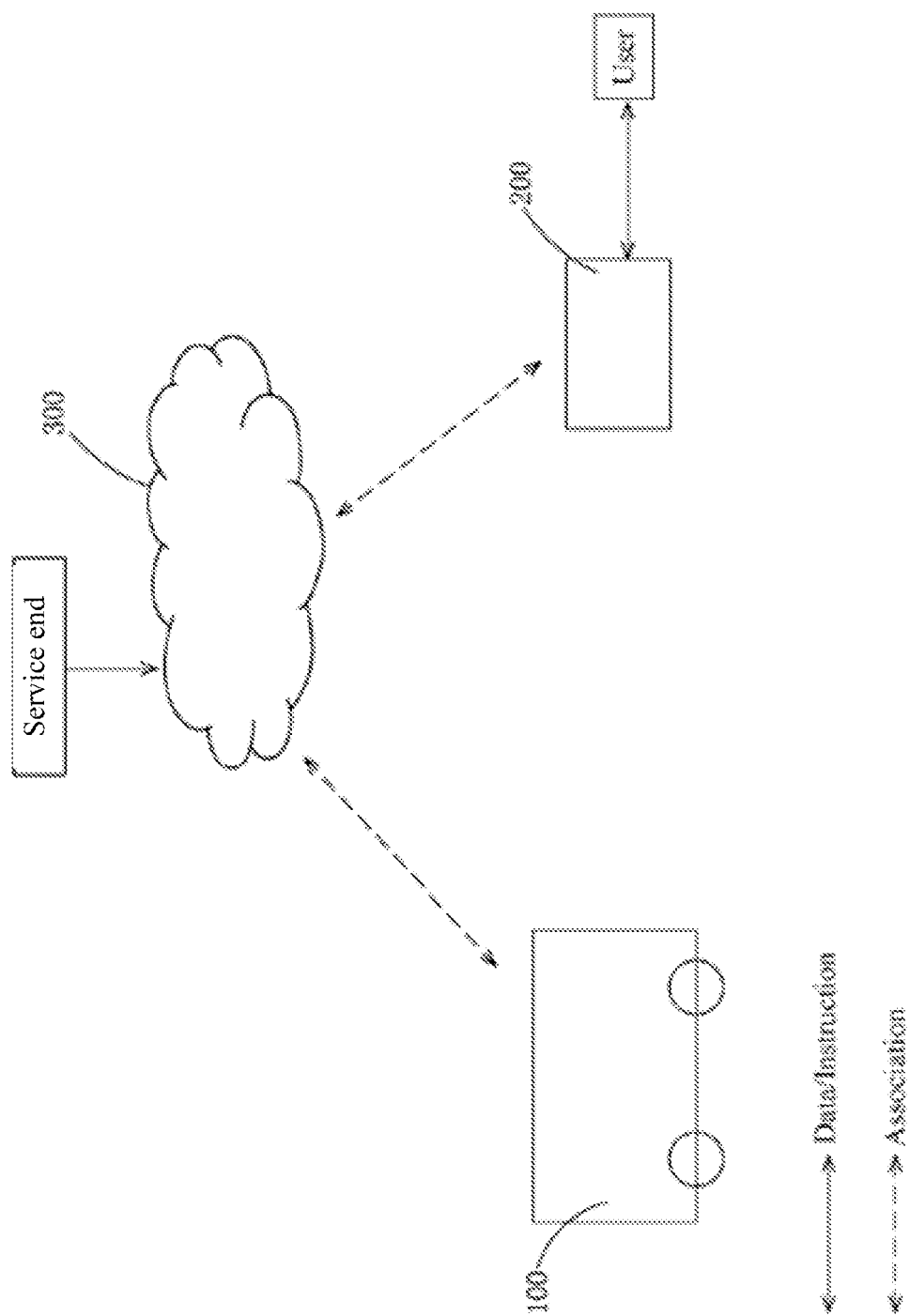
FIG. 4 is a schematic diagram of a remote system of a self-moving gardening robot according to an implementation of the present invention.

FIG. 4 shows a self-moving gardening robot remote working system. In this embodiment, the self-moving gardening robot 100 performs communications with a service end 300 through the wireless communication module 90. The service end 300 is in wireless communications with the user equipment 200. The service end 300 specifically is a remote service end provided by a provider or a manufacturer for the self-moving gardening robot 100, to provide various functions such as data transmission, data statistics, control commands, and software update. The user equipment 200 specifically is a mobile phone, a computer, a tablet computer, a smart wearable apparatus, or the like. The user equipment 200 is provided with an application mating the self-moving gardening robot 100 and the service end 300. A user learns about a condition of the self-moving gardening robot 100, a lawn environment, and statistic information of grass conditions, and sets relevant working instructions of the self-moving gardening robot 100, through an interface of the application.

In this embodiment, a dealer or manufacturer of the self-moving gardening robot 100 may count and collect data of each sold self-moving gardening robot 100 through the service end 300. The specific types of data may be performance data information such as fault information, data of work setting of the self-moving gardening robot 100 by a user, and a total working time of the self-moving gardening robot 100, or data information such as user preferences. Based on the data information counted and collected by the service end 300, the provider or manufacturer of the self-moving gardening robot 100 may obtain multidirectional guide information for performing product planning and product search and development. The provider or manufacturer of the self-moving gardening robot 100 may also automatically update a software version in the self-moving gardening robot 100 through the service end 300 or automatically update a working schedule of the self-moving gardening robot 100 based on database information.

In another embodiment, the self-moving gardening robot 100 may alternatively perform remote communications with the user equipment 200 through the wireless communication module 90. The service end 300 then performs remote communications with the user equipment 200. The service end 300 collects and counts data of the self-moving gardening robot 100 through the user equipment 200 or/and sends various prompt instructions to the user equipment 200. Certainly, in some cases, a remote working system of the self-moving gardening robot 100 may not include a service end 300.

In an embodiment, the working module 50 is an execution component performing a single function and correspondingly, the self-moving gardening robot 100 is a single functional self-moving gardening robot. In this embodiment, the self-moving gardening robot 100 has different functions based on different working modules 50. Specifically, when the working module 50 is a cutting component, the self-moving gardening robot 100 is an automatic lawn mower; when the working module 50 is a sweeping component, the self-moving gardening robot 100 is an automatic sweeper (a robotic vacuum cleaner or a robotic snow sweeper); when the working module 50 is a fertilizing component, the self-moving gardening robot 100 is an automatic fertilizing machine; and when the working module 50 is a water spraying component, the self-moving gardening robot 100 is an automatic water spraying machine, or the like.

In an embodiment, the working module 50 includes a multi-functional execution component and correspondingly, the self-moving gardening robot 100 is a multi-functional self-moving gardening robot. The multi-functional execution component may be a plurality of execution components for respectively executing different functions, or may alternatively be a single execution component capable of executing a plurality of functions.

Figure 5:
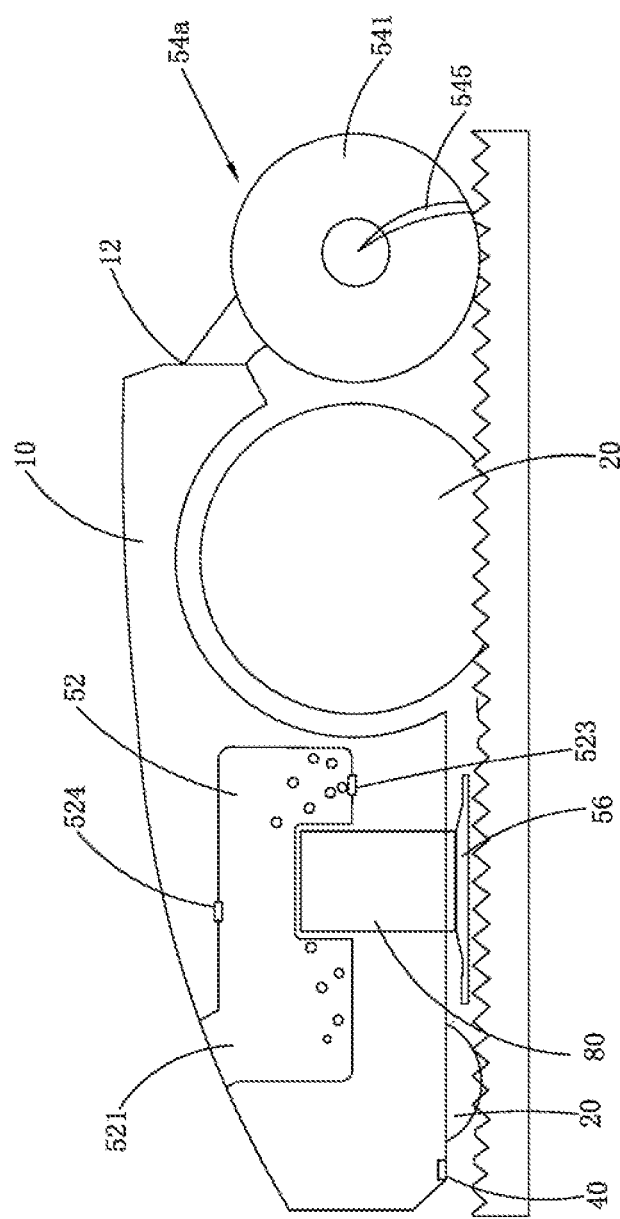
FIG. 5 is a schematic structural diagram of a self-moving gardening robot according to an implementation of the present invention.

FIG. 5 shows a self-moving gardening robot 100 having multiple functions and suitable for lawn maintenance. The self-moving gardening robot 100 can automatically cruise in a working area and perform tasks of multiple different functions. In this embodiment, the self-moving gardening robot 100 is mainly configured for courtyard lawn maintenance and has multiple functions for lawn maintenance, specifically, for example, a sowing function, a water spraying function, a pesticides spraying function, a fertilizing function, a grass cutting function, a soil loosening function, a withered grass removing function, or the like. The self-moving gardening robot 100 includes a plurality of functional modules and respectively controls the functional modules to perform the corresponding functions. The self-moving gardening robot 100 may alternatively include an interface for a plurality of functional modules and connect functional accessories through the interface, thereby implementing the corresponding functions.

The following content specifically introduces the structural composition parts of the self-moving gardening robot by using a multi-functional self-moving gardening robot as an example.

Still referring to FIG. 5, in this embodiment, the self-moving gardening robot 100 further includes a cutting module 56 located at the bottom of the housing 10. The cutting module 56 generates rotary movement under drive of the power module 80, to implement a grass cutting function.

In this embodiment, the self-moving gardening robot 100 further includes a material cavity 52, configured to store materials such as seeds, a fertilizer, water, and pesticides. Specifically, the material cavity 52 is fixedly provided in the housing 10. The material cavity 52 is provided with a material inlet 521, and a material enters the material cavity 52 through the material inlet 521. The material cavity 52 is provided with a material outlet 523 (that is, a material opening), and a material falls on a lawn through the material outlet 523, thereby implementing functions such as sowing, fertilizing, water spraying, and pesticides spraying. The material inlet 521 is provided with an inlet cap configured to cover the inlet. The inlet cap is externally connected to an elastic member and automatically covers the inlet under an elastic force of the elastic member. When an external force is applied to the inlet cap, the external force overcomes the elastic force of the elastic member, the inlet cap no longer covers the inlet, and the material enters the material cavity 52 from the inlet. The material outlet 523 includes an outlet cap configured to cover the outlet. The outlet cap is driven by the power module 80 and may automatically cover the outlet or not cover the outlet in a connection manner. The outlet cap is equivalent to an automatic valve (a type of automatic switch). In one of embodiments, the inlet cap of the material inlet 521 is also configured as an automatic valve. Under control of the control module 30, the automatic valves can automatically open and close the inlet cap and the outlet cap. In one of embodiments, under control of the control module 30, the automatic valves can control an opening size of the inlet cap and/or the outlet cap, to further control a flow of the material. In one of embodiments, based on different types of materials, the control module 30 controls a travel speed and an opening size of the outlet cap of the self-moving gardening robot 100, thereby satisfying an amount of a material needed in each square meter of a lawn. In this embodiment, there is one material inlet, located on an upper surface of the housing 10 at a position opposite to the material cavity 52. There is one material outlet, located on a lower surface of the housing 10 at a position opposite to the material cavity 52. In one of embodiments, the material inlet 521 is disposed in a front side of the material cavity 52 and the material outlet 523 is disposed in a back side of the material cavity 52. Certainly, the numbers of the material inlets and the material outlets may alternatively be other numbers.

In one of embodiments, the material cavity may be provided with a plurality of outlets. The different material outlets are configured to release materials of different functions or in different forms. In this embodiment, the opening sizes of the different material outlets may also be set to be different.

In one of embodiments, the self-moving gardening robot 100 further includes a capacity detection device 524 configured to detect a material storage capacity. The capacity detection device 524 is electrically connected to the control module 30. The capacity detection device 524 detects a residual material capacity in the material cavity 52 and transmits the capacity signal to the control module 30. The control module 30 controls, based on different capacity signals, the self-moving gardening robot 100 to perform different actions. There may be a plurality of implementations of the capacity detection device 524, for example, a ranging sensor, a weight sensor, a space sensor, a capacitance detection sensor, or a Hall induction sensor. When a main function of the material cavity 52 is storing a liquid, the capacity detection device 524 may alternatively use a float to perform capacity detection. In a ranging sensor, specifically an infrared sensor, an ultrasonic sensor, a laser sensor, or the like may be used.

In a specific embodiment, the capacity detection device 524 uses a ranging sensor. In one of embodiments, the ranging sensor is disposed on an upper surface of a cavity body of the material cavity 52. The ranging sensor is close to the material inlet 521 of the material cavity 52 and substantially faces toward the material outlet 523. The ranging sensor transmits a ranging signal. The ranging signal contacts a surface of the material and is then reflected back to the ranging sensor. The control module 30 determines, according to a time difference between transmitted ranging signal and received ranging signal by the ranging sensor, a position of a material upper surface in the material cavity 52, to further determine a residual material in the material cavity 52. When the self-moving gardening robot 100 travels on a slope, the material in the material cavity 52 moves toward a slope toe due to a gravity action, resulting in that the material surface presents an inclined shape. Therefore, the residual capacity detected by one capacity detection device 524 is no longer accurate. In one of embodiments, the control module 30 is provided with a capacity conversion unit 302. The capacity conversion unit 302 scales, according to a slope gradient of a slope and based on a preset algorithm, the capacity detected by the capacity detection device 524. Through conversion of the capacity conversion unit 302, the self-moving gardening robot 10 may not be incapable of accurately determining a residual material capacity in the material cavity 52 due to be travelling on the slope.

Optionally, the self-moving gardening robot 100 is provided with a plurality of capacity detection devices 524. In an embodiment, the self-moving gardening robot 100 is provided with two capacity detection devices 524. The two capacity detection devices 524 are arranged at an interval along an axis of a travelling direction of the self-moving gardening robot 100. When the self-moving gardening robot 100 travels on a slope, the control module 30 respectively receive results detected by the two capacity detection devices 524. The two detected results are added and averaged and a result obtained after adding and averaging is used as the residual material capacity in the material cavity 52. In this embodiment, the two capacity detection devices 524 are arranged at an interval along an axis of a travelling direction of the self-moving gardening robot 100. When the self-moving gardening robot 100 is on a slope, the two capacity detection devices 524 respectively detect capacity values at locations of the capacity detection devices 524. The two capacity values are added and averaged to eliminate or reduce impact of material incline on the detected result.

Still referring to FIG. 5, in this embodiment, the material cavity 52 is substantially in a rectangular block shape, and presents a recessed shaped at a position of a power module 80 to match position setting of the power module 80. Certainly, the material cavity 52 may alternatively be in other shapes, such as a cube, a cone, an irregular body, or the like. In one of embodiments, a specific outline of a profile of the material cavity 52 is adaptive to a spatial shape in the housing 10, to utilize the space as much as possible and effectively improve a storage volume of the material cavity 52.

Figure 6A:
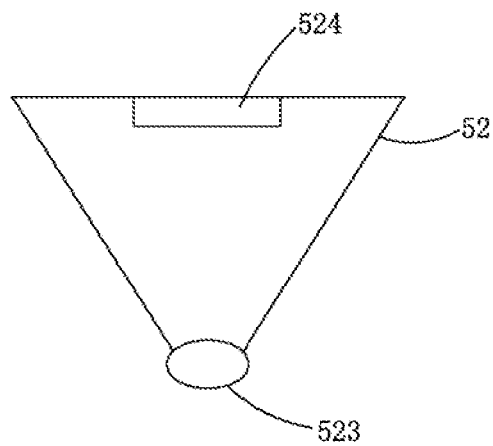
FIG. 6 is a schematic plan view of geometric shapes of a material cavity according to the present invention.
Figure 6B:
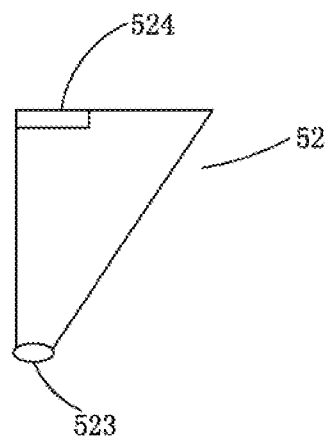

FIG. 6 shows different shape settings of the material cavity. In this embodiment, a height plane of a stereo shape of the material cavity 52 presents a convex shape, and an area of a bottom of the material cavity 52 is less than that of a top of the material cavity 52. As shown in FIG. 6(a), the material cavity 52 presents a cone shape. As shown in FIG. 6(b), the material cavity 52 presents a semi-cone shape. Still referring to FIG. 6(a) and FIG. 6(b), a material opening 523 is located at the bottom of the material cavity 52, the capacity detection sensor 524 is located at the top of the material cavity 52, and the capacity detection sensor 524 directly faces the material opening 523.

In this embodiment, there is one material cavity 52 and the material cavity 52 may store different materials in different times. Optionally, there may be a plurality of material cavities 52, respectively configured to store different materials or store a plurality of parts of a material.

Figure 6C:
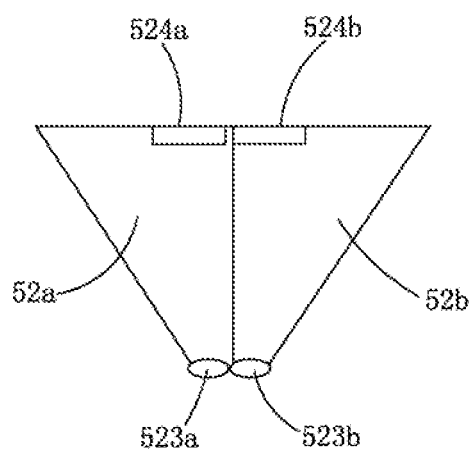

Referring to FIG. 6(c), there are two material cavities 52, respectively, a first material cavity 52a and a second material cavity 52b. The shape of each material cavity 52 is a shape of the material cavity shown in FIG. 6(b). A top of the first material cavity 52a is provided with a first capacity detection sensor 524a, a bottom of the first material cavity 52a is provided with a first material opening 523a, and the first capacity detection sensor 524a directly faces the first material opening 523a. A top of the second material cavity 52b is provided with a second capacity detection sensor 524b, a bottom of the second capacity detection sensor 524b is provided with a second material opening 523b, and the second capacity detection sensor 524b directly faces the second material opening 523b. The first material cavity 52a and the second material cavity 52b respectively store different materials, to implement different functions. For example, the first material cavity 52a stores seeds to implement a sowing function and the second material cavity 52b stores water to implement a water spraying function.

Figure 7A:
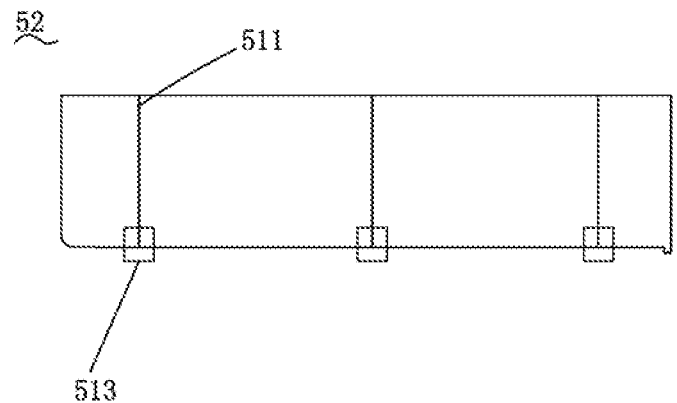
FIG. 7 is a schematic plan view of geometric shapes of another three implementations of a material cavity according to the present invention.

FIG. 7(a) shows that a partition plate 511 is disposed in the cavity body of the material cavity 52. In this embodiment, three partition plates 511 are disposed in the material cavity 52 to divide the material cavity 52 into four chambers. In this embodiment, a valve 513 is further provided at a connection between the partition plate 511 and the cavity body. The control module 30 controls opening and closing of the partition plate valve 513. When the materials in the material cavity 52 need to be in communication among the chambers, for example, when a material is injected into the material cavity 52 or when a material in the material cavity 52 is sprayed to a working surface, the control module 30 controls the partition plate valve 513 to be open; and when the materials in the material cavity 52 need to be kept in the respective chambers, for example, when the self-moving gardening robot 100 is climbing a slope, the control module 30 (e.g., as described with respect to FIG. 3) controls the partition plate valve 513 to be closed. The valve 513 may alternatively be specifically disposed on the partition plate 511 or on any other positions capable of implementing a function of isolating and connecting adjacent chambers. The number of the partition plates 511 may be determined according to a size of the cavity body of the material cavity 52 or scenario requirements, and is not limited herein. When the self-moving gardening robot 100 travels on a slope, the partition plates 511 divide the material cavity 52 into a plurality of small chambers, to avoid danger in an uphill or downhill process caused by excessive forward incline or backward incline of a center of gravity of the whole machine of the self-moving gardening robot 100 due to that the materials in the material cavity 52 inclines toward a slope toe under a gravity action of the materials.

Figure 7B:
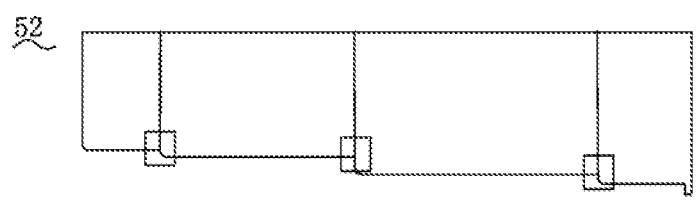
Figure 7C:
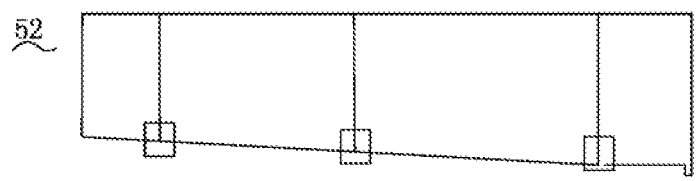

FIG. 7(b) shows that the material cavity 52 presents a step-like shape. The material cavity 52 is provided with a plurality of chambers. There is a predetermined height difference between a bottom of each chamber and a bottom of an adjacent chamber, so that an overall shape of the bottom of the material cavity 52 presents a step-like shape. The setting of the bottom of the material cavity 52 in a step-like shape is advantageous in keeping the center of gravity of the self-moving gardening robot 100 to be stable. Even in an uphill or downhill process of the self-moving gardening robot 100, danger may not occur in an uphill or downhill process caused by excessive forward incline or backward incline of the center of gravity of the whole machine of the self-moving gardening robot 100 due to excessive incline of the materials in the material cavity 52. In another embodiment, the bottom of the material cavity 52 may alternatively be configured in another shape. FIG. 7(c) shows that the bottom of the material cavity 52 is configured to be an inclined plane having a predetermined gradient. In the two embodiments shown in FIG. 7(b) and FIG. 7(c), the material cavity 52 may alternatively not be provided with a partition plate 511 and a valve 513.

In another embodiment, a front end of the housing 10 of the self-moving gardening robot 100 is provided with a counter weight. By disposing the counter weight at the front end of the housing 10, an offset of the center of gravity of the whole machine of the self-moving gardening robot 100 due to incline of the materials in the material cavity in the climbing process is effectively balanced.

In another embodiment, the material cavity 52 further has a self-cleaning function. A cleaning device is disposed in the material cavity 52. The cleaning device may automatically and regularly clean the material cavity or be started by a user to clean the material cavity.

Figure 9:
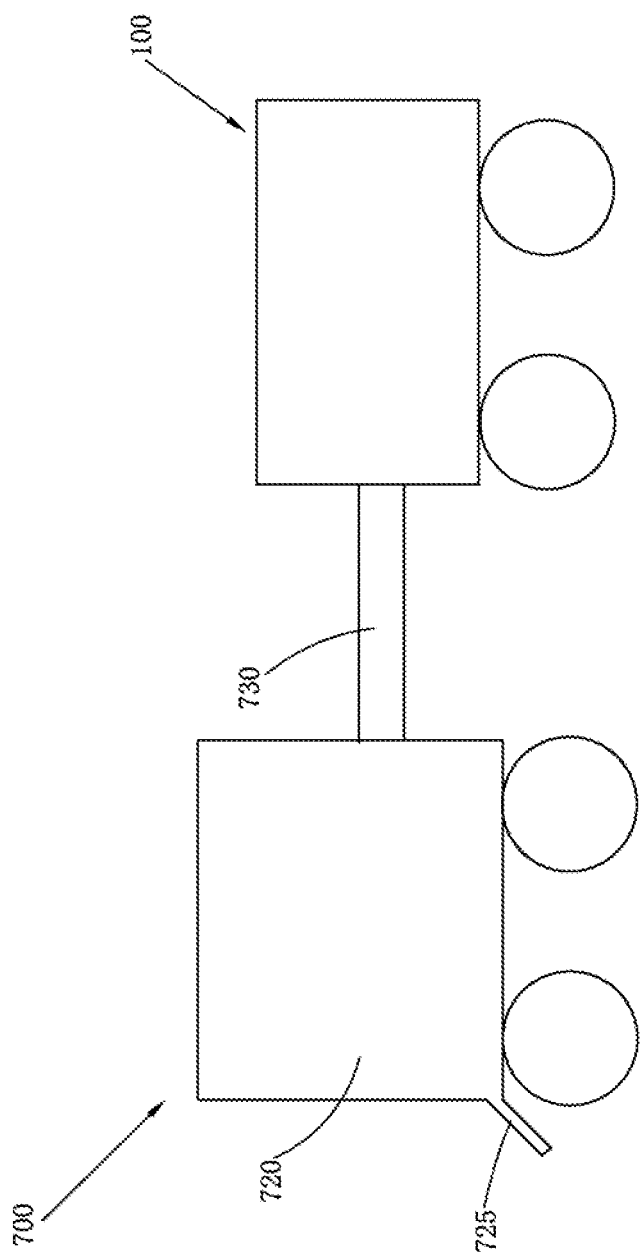
FIG. 9 is a schematic structural diagram of a self-moving gardening robot according to another implementation of the present invention.

In another embodiment, the self-moving gardening robot 100 may alternatively use a drag box to store a material. As shown in FIG. 8, the self-moving gardening robot 100 engages a drag box 700. The drag box 700 is provided with a a box body 720. In one of embodiments, a connector 730 of a length is disposed between the self-moving gardening robot 100 and the box body 720. The connector 730 may be specifically a connection rod or a connection rope (e.g., an example of the accessory interface 12 of FIG. 5). The box body 720 serves as a spatial body for storing a material and a bottom of the box body 720 is provided with a moving module. The self-moving gardening robot 100 drives the drag box 700 to move in the same direction when moving. The box body 720 is provided with a material inlet and a material outlet. When the material stored in the box body 720 is mainly a liquid substance, a form of the material outlet may be specifically a sprinkler device 725. In this embodiment, the sprinkler device 725 is located on an upper portion of the box body 720. In another embodiment, as shown in FIG. 9, the sprinkler device 725 is located at the bottom of the box body. Certainly, in other optional embodiments, a form of the material outlet may alternatively be a drip irrigation device.

Figure 10:
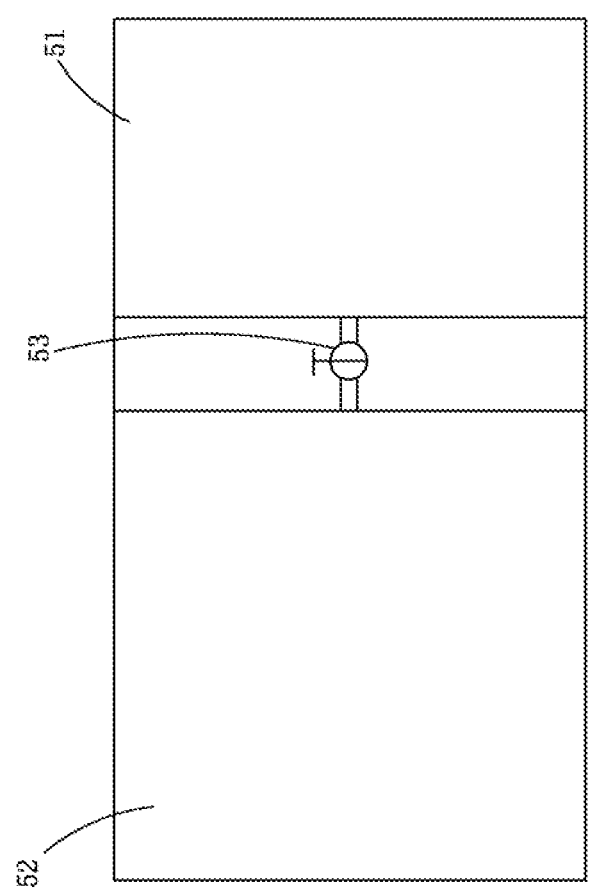
FIG. 10 is a schematic structural diagram of a self-moving gardening robot according to another implementation of the present invention.

FIG. 10 shows that the self-moving gardening robot 100 (e.g., as described with respect to at least FIGS. 2-5, 8, 9, 11-14, 17-20, and 31) is further provided with a nutrient cavity 51. The nutrient cavity 51 is configured to store liquids such as a nutrient solution or pesticides. A liquid passage and a control valve 53 are provided between the nutrient cavity 51 and the material cavity 52. The control valve 53 controls whether to enable the liquid in the nutrient cavity 51 to flow to the material cavity 52 and a total amount of traffic and/or a flow rate of the flow toward the material cavity 52. When the self-moving machine 100 performs a water spraying function, the match method between the nutrient cavity 51 and the material cavity 52 is specifically described below. First a corresponding liquid such as a nutrient solution or pesticides is injected into the nutrient cavity 51; then, the control module 30 controls the control valve 53 to be open for a period of time and then be closed, so that the fluid in the nutrient cavity 51 flows to the material cavity 52 by an appropriate amount; and finally, water is injected into the material cavity 52. The control module 30 (e.g., as described with respect to at least FIG. 3) controls a concentration proportion of the solution in the material cavity by controlling a period of open time of the control valve 53. In this match method, the liquid such as a nutrient solution pesticides can be diluted more evenly.

In an embodiment, the material cavity 52 is disposed at a predetermined space of the self-moving gardening robot 100. Some elements apt to generate heat, such as the energy module 60 and the control module 30, in the working process of the self-moving gardening robot 100 are arranged in peripheries of the material cavity 52. When water is stored in the material cavity 52, the water may cool the peripheries of the material cavity, so as to cool the energy module 60 and the control module 30. In one of embodiments, the cavity body of the material cavity 52 is at least partially made of a thermal conductive material.

A volume capacity of the material cavity 52 is a significant parameter in design of the self-moving gardening robot 100. A size of the volume capacity of the material cavity 52 may affect a specific working efficiency of the self-moving gardening robot 100 and whether the self-moving gardening robot 100 causes damage to a lawn when performing a work. When designing the volume capacity of the material cavity 52, specific factors to be considered include: a size of a working area of the self-moving gardening robot 100, a travel speed of the self-moving gardening robot 100 during work, a total amount of working time of the self-moving gardening robot 100 per unit area, a plant transpiration amount associated with a local climate, an amount of precipitation associated with the local climate, a speed at which water is injected into the material cavity 52 each time, and a water spraying speed of the self-moving gardening robot 100. Among the foregoing contributory factors, the volume capacity of the material cavity 52 is in positive proportion to the working area and the plant transpiration amount. That is, a larger working area and plant transpiration amount indicates a larger volume capacity of the material cavity 52 needed. Among the foregoing contributory factors, the volume capacity of the material cavity 52 is in negative proportion to the travel speed, a working duration, an amount of precipitation, a water injection speed, and a water spraying speed. A larger travel speed of the self-moving gardening robot 100 during working, total amount of working time of the self-moving gardening robot 100 per unit area, amount of precipitation, speed at which water is injected into the material cavity 52 each time, and water spraying speed of the self-moving gardening robot 100 indicates a smaller volume of the material cavity 52 to be designed on the contrary.

In one of embodiments, when implementing functions such as sowing, fertilizing, water spraying, and pesticides spraying, the self-moving gardening robot 100 may use a rotation action of the cutting module 56, to achieve the purposes such as no material stack and even dispersion. When implementing the functions such as sowing, fertilizing, water spraying, and pesticides spraying, the control module 30 controls the cutting module 56 to rotate at a low speed. Materials such as seeds, a fertilizer, water, and pesticides flowing out from the material outlet first fall on an upper surface part of the cutting module 56 and are sprayed and spread to a lawn under the rotation action of the cutting module 56.

In one of embodiments, the control module 30 includes a rotation speed control unit.

When the self-moving gardening robot 100 performs different functions such as grass cutting, water spraying, sowing, pesticides spraying, and fertilizing, the rotation speed control unit controls the cutting module 56 to rotate at different speeds. When the self-moving gardening robot 100 performs a grass cutting function, the rotation speed control unit controls the cutting module 56 to rotate at a high speed. The rotation speed is greater than 2000 r/min, In one of embodiments, 2100 r/min or 2800 r/min. When the self-moving gardening robot 100 performs material functions such as water spraying, sowing, pesticides spraying, and fertilizing, the rotation speed control unit controls the cutting module 56 to rotate at a low speed. The rotation speed is less than 1000 r/min. In one of embodiments, when performing different material functions, the rotation speed control unit may also control the rotation speed of the cutting module 56 to be different correspondingly. Specifically, according to factors such as a weight/volume of a material needed per square meters, and a travel speed and machine body area of the self-moving gardening robot 100, the rotation speed of the cutting module 56 is controlled to be different. As known by those skilled in the art, the control module 30 herein not only includes a program control method such as a micro processor, but also includes a control circuit method of electronic circuit design.

Figure 11:
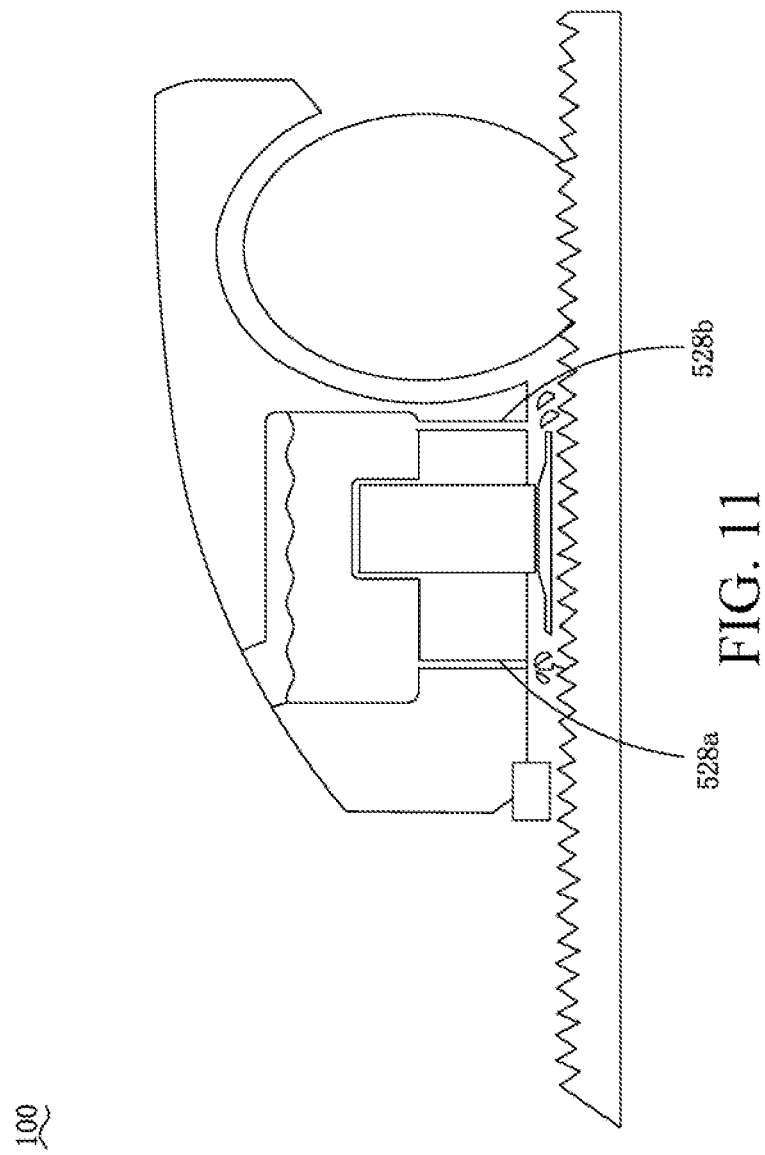
FIG. 11 is a schematic structural diagram of a self-moving gardening robot provided with drip irrigation devices according to an implementation of the present invention.

In one of embodiments, the bottom of the material cavity 52 of the self-moving gardening robot 100 is provided with a drip irrigation device. The drip irrigation device is connected to the material cavity 52 (e.g., as described with respect to at least FIG. 10). FIG. 11 shows a self-moving gardening robot 100 provided with a drip irrigation device. The drip irrigation device 528*a* and 528*b* are respectively two slim tubes. The slim tubes connected the material cavity 52 and extend from the bottom of the material cavity 52 to the bottom of the housing 10 (e.g., as described with respect to at least FIG. 3). When the self-moving gardening robot 100 performs a function of spraying a liquid material (specifically, for example, water spraying, nutrient solution spraying, liquid pesticides spraying), the liquid material is dropped to the lawn through the drip irrigation device. The drip irrigation device makes it easy for the liquid material to approach roots of grasses. Therefore, the grasses can absorb the liquid material better and a utilization rate of the liquid material is optimized. Specifically, the drip irrigation device includes a drip irrigation opening (equivalent to a drip hole). The drip irrigation opening is not higher than the bottom of the housing of the self-moving gardening robot, or a distance between the drip irrigation opening and the lawn is not greater than 15 cm.

Figure 12:
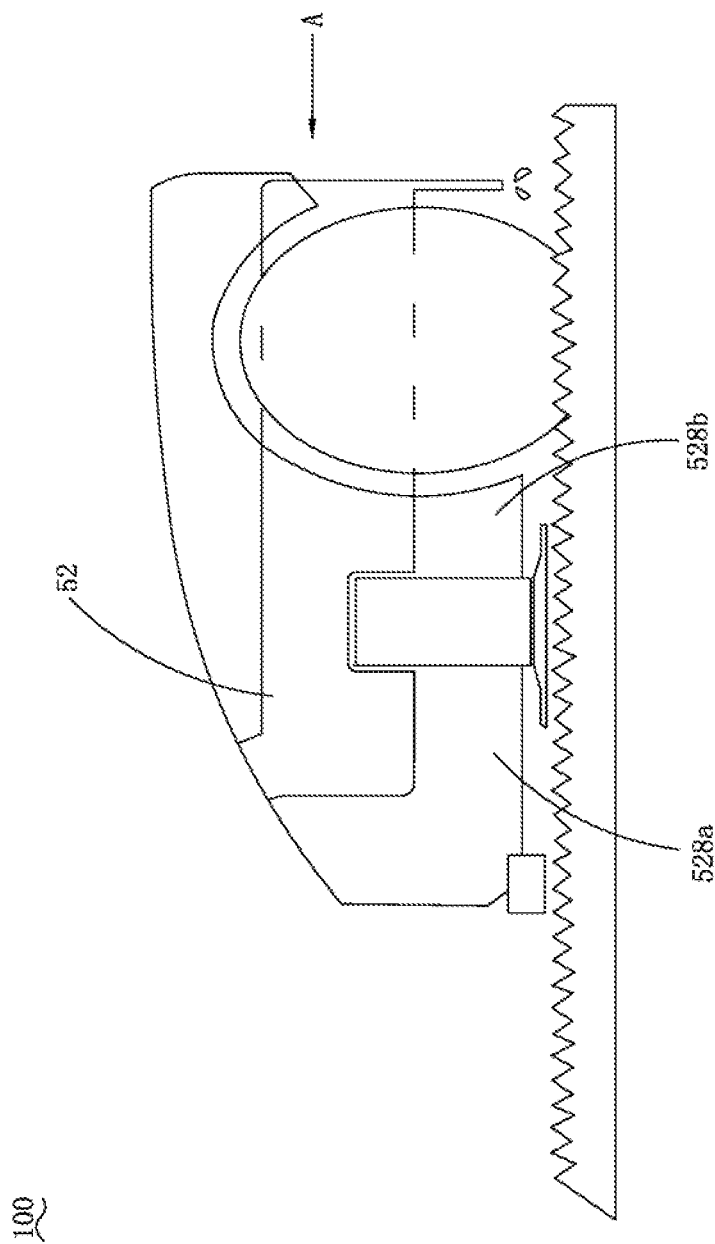
FIG. 12 is a schematic structural diagram of a self-moving gardening robot provided with drip irrigation devices according to another implementation of the present invention.
Figure 13:
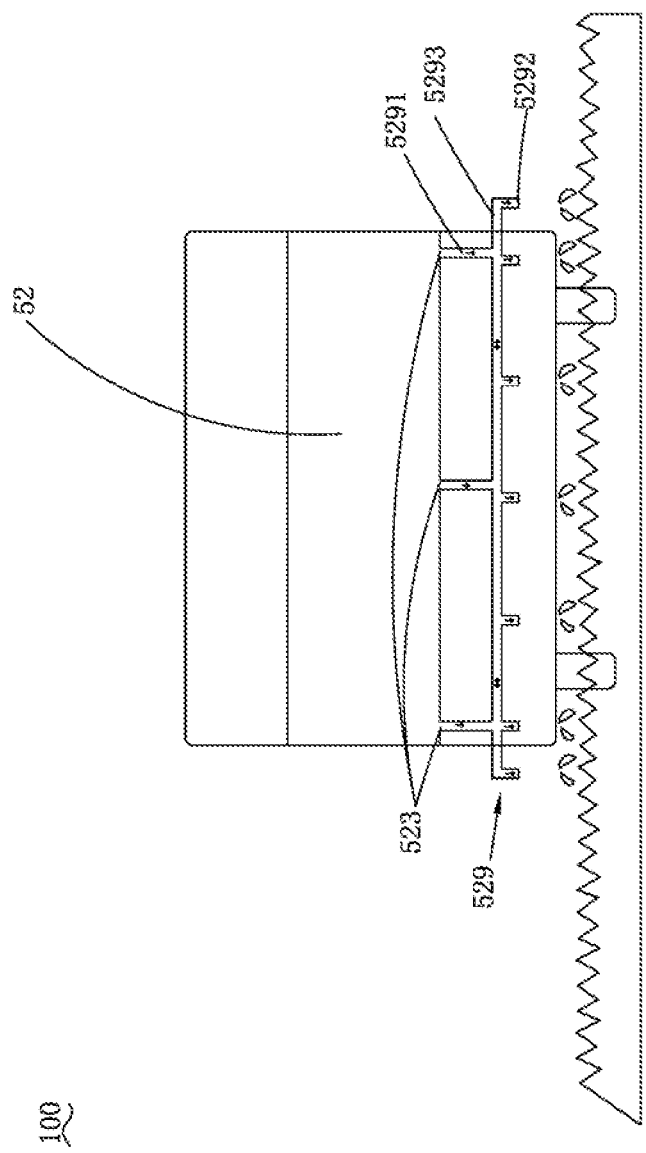
FIG. 13 is a schematic structural diagram of FIG. 12 in a direction A.

FIG. 12 and FIG. 13 show another self-moving gardening robot 100 provided with a drip irrigation device. In this embodiment, one end of the cavity body of the material cavity 52 extends to a tail of the machine body of the self-moving gardening robot 100. The cavity at the tail is provided with a plurality of material outlets 523. The material outlet 523 is disposed at the tail of the machine body to ensure that the moving module 20 of the self-moving gardening robot 100 does not roll over an irrigated area in a process in which the self-moving gardening robot 100 sprays water while moving forward. In this embodiment, a drip irrigation device 529 is provided at the material outlet 523. The specific structure of the drip irrigation device 529 is shown in FIG. 13. The drip irrigation device 529 is provided with a connection part 5291 connected to the material outlet 523 of the material cavity 52. The specific structure of the connection part 5291 is a material passage. The other end of the connection part 5291 is provided with a drip irrigation accessory 5293. A transverse width of the drip irrigation accessory 5293 is greater than or equal to a width of the machine body of the self-moving gardening robot 100, so that drip irrigation is performed on all working areas on a path through which the self-moving gardening robot 100 passes. The drip irrigation accessory 5293 is provided with a plurality of drip holes 5292. The liquid in the material cavity enters the drip irrigation accessory 5293 through the connection part 5291 and is then dropped to the lawn through the drip hole 5292 in the drip irrigation accessory 5293. In one of embodiments, shapes or drip cross sections of the drip holes 5292 of the drip irrigation accessory 5293 are different. Specifically, a size of the cross section of the drip hole 5292 is in positive proportion to a distance with the connection part of the material outlet 523.

Figure 14:
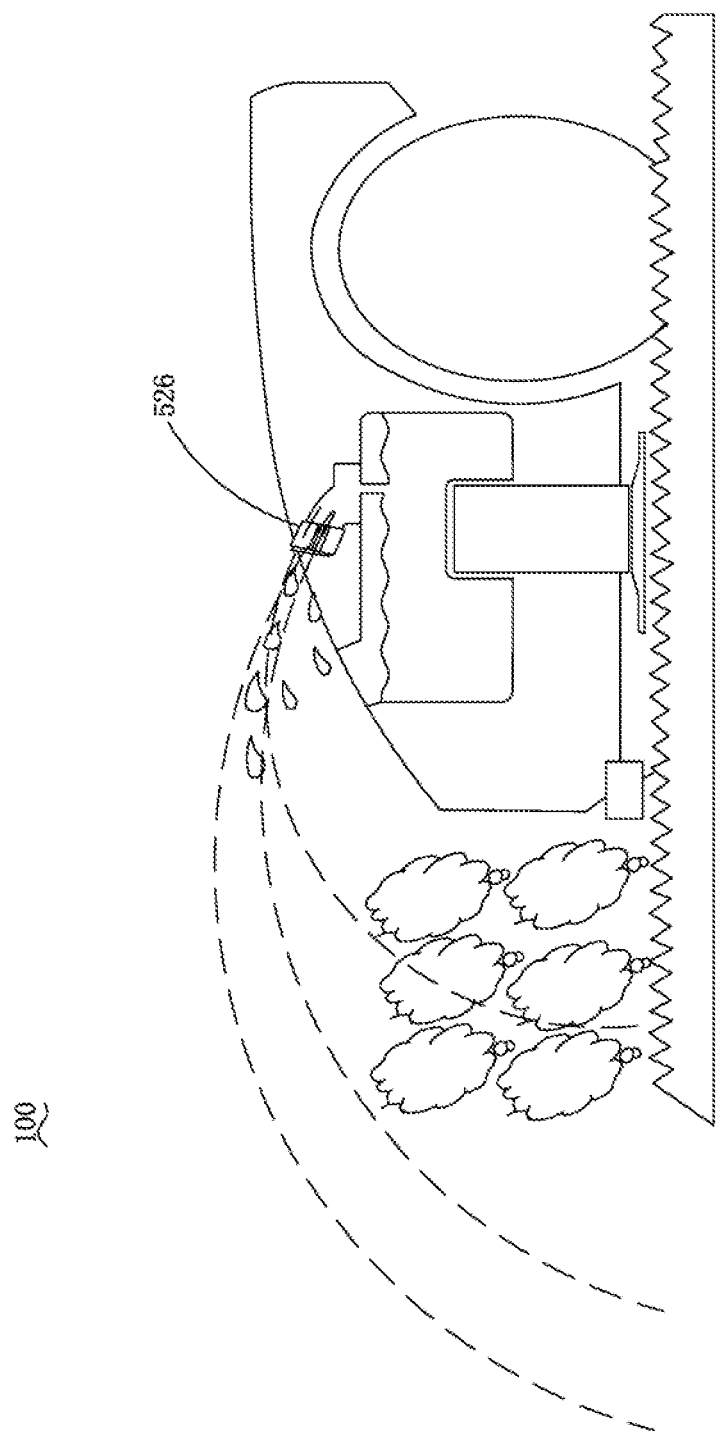
FIG. 14 is a schematic structural diagram of a self-moving gardening robot provided with a spraying device according to an implementation of the present invention.

In one of embodiments, a spraying device is provided on the bottom or top of the material cavity 52 (e.g., as described with respect to at least FIG. 10) of the self-moving gardening robot 100. The spraying device is connected to the material cavity 52. FIG. 14 shows a self-moving gardening robot 100 provided with a spraying device. The spraying device 526 includes a spraying nozzle and a pump. The control module 30 (e.g., as described with respect to at least FIG. 3) controls the pump to form a hydraulic pressure. The liquid material in the material cavity 52 is ejected to the working area through the spraying nozzle under the hydraulic pressure. In one of embodiments, the control module 30 controls a magnitude of the hydraulic pressure formed by the pump, so that a throw range of the liquid material changes to form working areas of different ranges. When the self-moving gardening robot 100 performs a function of spraying a liquid material (specifically, for example, water spraying, nutrient solution spraying, liquid pesticides spraying), the liquid material is sprayed to the lawn or flowers in the lawn through the spraying device.

In other embodiments, the self-moving gardening robot 100 includes a material box interface. The material box interface is configured to externally connect a material box accessory. The material box accessory is configured to store materials such as seeds, a fertilizer, water, or pesticides.

Still referring to FIG. 5, in this embodiment, the self-moving gardening robot 100 further includes a multi-functional accessory interface 12. The multi-functional accessory interface 12 is disposed on a predetermined position of the housing 10 and configured to externally connect accessories of a soil loosening function, a withered grass removing function, or a fallen leaves collecting function. When travelling automatically, the self-moving gardening robot 100 drives the accessory to move forward in the same direction. A working component on the accessory operates to implement the functions such as soil loosening, withered grass removing, fallen leaves collecting, and fallen leaves sweeping.

Still referring to FIG. 5, in this embodiment, a first soil loosening accessory 54*a* is attached to the multi-functional accessory interface 12. The first soil loosening accessory 54a includes a roller part 541 and a soil loosening part 545. The roller part 541 is specifically of a cylinder shape and moves with the self-moving gardening robot 100, so as to roll on the working surface. The soil loosening part 545 specifically include several rigid whiskers and the soil loosening part 545 is attached to the roller part 541. When the roller part 541 rolls on the working surface, the soil loosening part 545 is inserted into the working surface, to flip over mud of the working surface, thereby implementing the soil loosening function.

Figure 15:
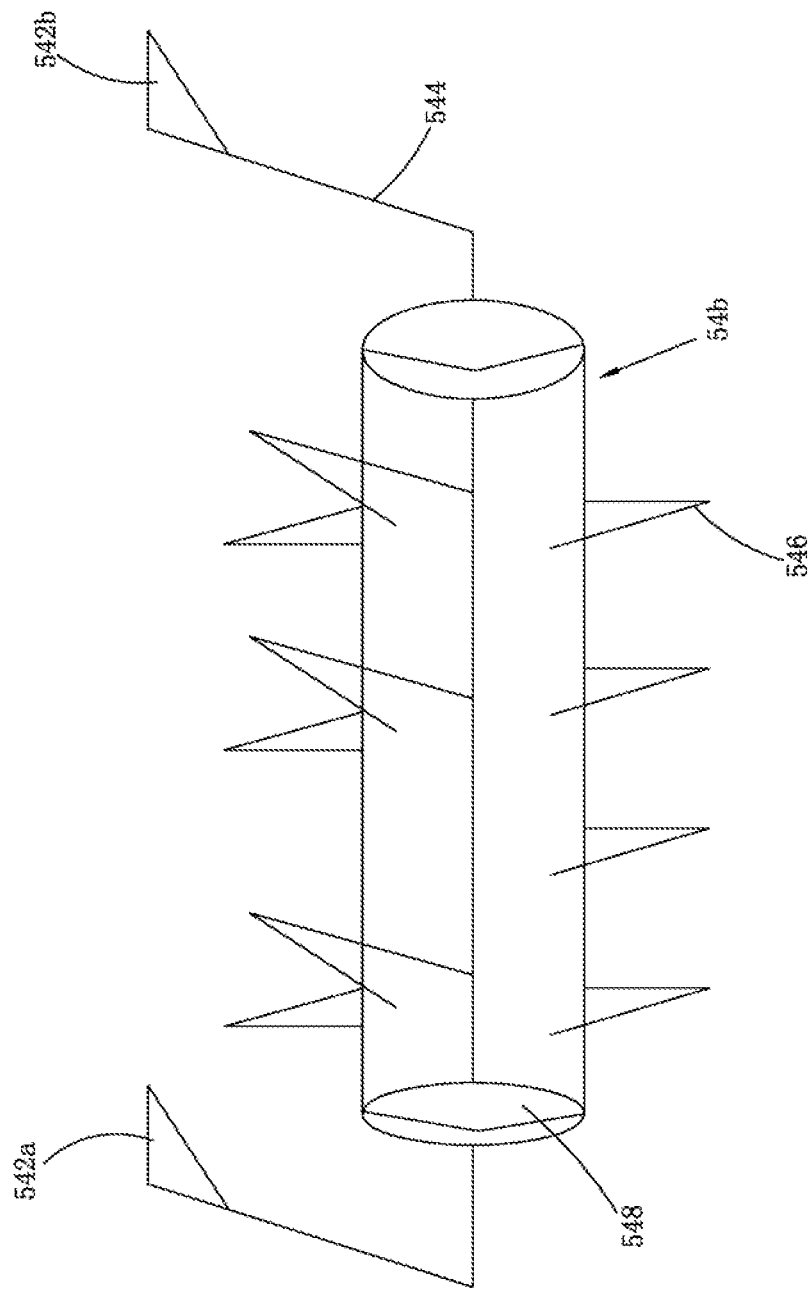
FIG. 15 is a schematic structural diagram of a soil loosening accessory according to the present invention.

FIG. 15 shows a schematic structural diagram of another accessory for implementing a soil loosening function. A second soil loosening accessory 54b includes a mating part 542 configured to match the multi-functional accessory interface 12 of the self-moving gardening robot 100. In this embodiment, the mating part 542 specifically includes a left mating part 542a and a right mating part 542b. The left mating part 542a and the right mating part 542b are connected by a rigid shaft 544. The rigid shaft 544 specifically includes a horizontal shaft and two side arm shafts. Tails of the two side arm shafts are respectively connected to the left mating part 542a and the right mating part 542b. A horizontal shaft of the rigid shaft 544 is provided with a rolling part 548. A plurality of protrusions 546 is disposed on a circumferential direction of the rolling part 548.

When implementing the soil loosening function, the mating part 542 of the second soil loosening accessory 54b matches the multi-functional accessory interface 12 of the self-moving gardening robot 100. The self-moving gardening robot 100 moves automatically in the working area, to drive the roller part 548 to move on the working surface. In the moving process of the roller 548, the protrusions 546 are partially inserted into the working surface, to flip over mud of the working surface, thereby implementing the soil loosening function.

The working principle of implementing the withered grass removing function by the self-moving gardening robot is similar to that of implementing the soil loosening function. Therefore, a mechanical structure of a withered grass removing accessory may be referred to the mechanical structure of the soil loosening accessory. The withered grass removing accessory is not described in detail again herein.

Figure 16:
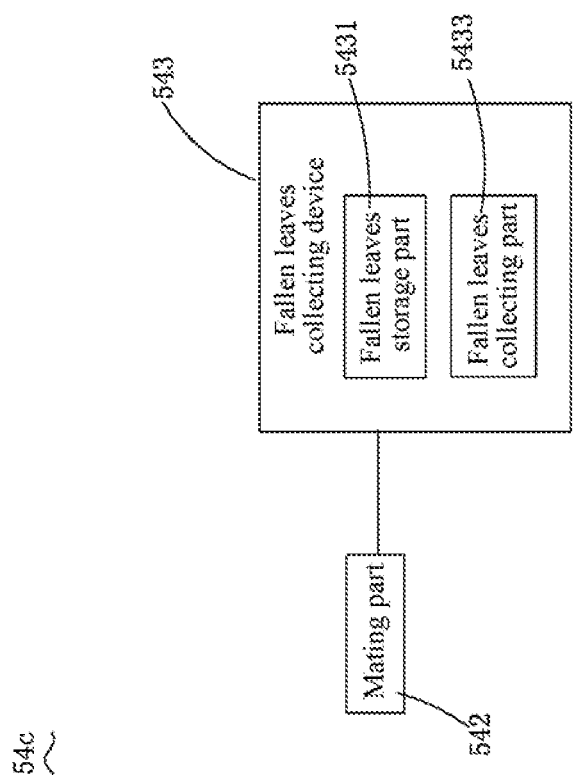
FIG. 16 is a schematic modular diagram of a fallen leaves collecting accessory according to the present invention.

FIG. 16 is a schematic modular diagram of a fallen leaves sucking accessory 54c for implementing a fallen leaves collecting function. The fallen leaves sucking accessory 54c includes a mating part 542 configured to match the multi-functional accessory interface 12 of the self-moving gardening robot 100. The fallen leaves sucking accessory 54c further includes a fallen leaves collecting device 543 connected to the mating part 542. The fallen leaves collecting device 543 includes a fallen leaves storage part 5431 configured to store fallen leaves, and specifically may be in forms such as a collecting bag and a collecting box. In one of embodiments, a full storage detection device is further provided in the fallen leaves storage part 5431 and is configured to detect whether there is storage space in the fallen leaves storage part 5431. The fallen leaves collecting device 543 further includes a fallen leaves collecting part 5433 configured to collect fallen leaves on a working surface to the fallen leaves storage part. The specific structure of the fallen leaves collecting part 5433 is similar to a fallen leaves suction structure in a blowing and sucking machine and includes a motor, a fan, and a suction pipe. The motor drives the fan to rotate to generate an air flow. The fallen leaves on the working surface passes, under a suction force of the air flow, through the suction pipe to enter the fallen leaves storage part 5431.

When implementing the fallen leaves collecting function, the mating part 542 of the fallen leaves sucking accessory 54c matches the multi-functional accessory interface 12 of the self-moving gardening robot 100. The self-moving gardening robot 100 automatically moves in the working area, and the fallen leaves collecting part 5433 is started at the same time. The fallen leaves collecting part 5433 collects fallen leaves on a path through which the self-moving gardening robot 100 passes to the fallen leaves storage part 5431. When the full storage detection device shows that the fallen leaves storage part 5431 is full, the fallen leaves collecting part 5433 stops working. The self-moving gardening robot 100 records the breakpoint location, moves to a preset fallen leaves storage point, and discharges the fallen leaves. In one of embodiments, the self-moving gardening robot 100 is provided with a path planning unit, so that the self-moving gardening robot 100 moves in an optimal path for collecting fallen leaves or returning to the breakpoint location.

In this embodiment, the path planning unit stores a preset path mode, and the control module controls, based on the location information, the self-moving gardening robot to move in the preset path mode. The preset path mode may be an algorithm. The self-moving gardening robot includes an ambient detection module, configured to detect an environment of a working area, and a control module, configured to generate a preset moving path or a preset target location based on the preset path mode and based on at least the ambient information and/or the location information, and to control the self-moving gardening robot to move along the preset moving path or to move toward the preset target location. The ambient detection module includes a camera, a collision detection sensor, or the like. Specifically, the control module generates a specific moving path or target location based on the preset path mode and according to an actual scenario in the working area and the location information of the self-moving gardening robot. For example, the control module generates a moving path bypassing an obstacle based on the obstacle in the working area, generates a spraying location or a fallen leaves storage location along a boundary based on the boundary of the current working area, and may also generate a target location by recording a location of the docking station. Certainly, the location of the docking station may alternatively be obtained based on an input or teaching of a user.

In this embodiment, the path planning unit stores at least two preset path modes, and the control module controls the self-moving gardening robot to respectively move in the corresponding preset path modes when performing at least two lawn care works.

Figure 17:
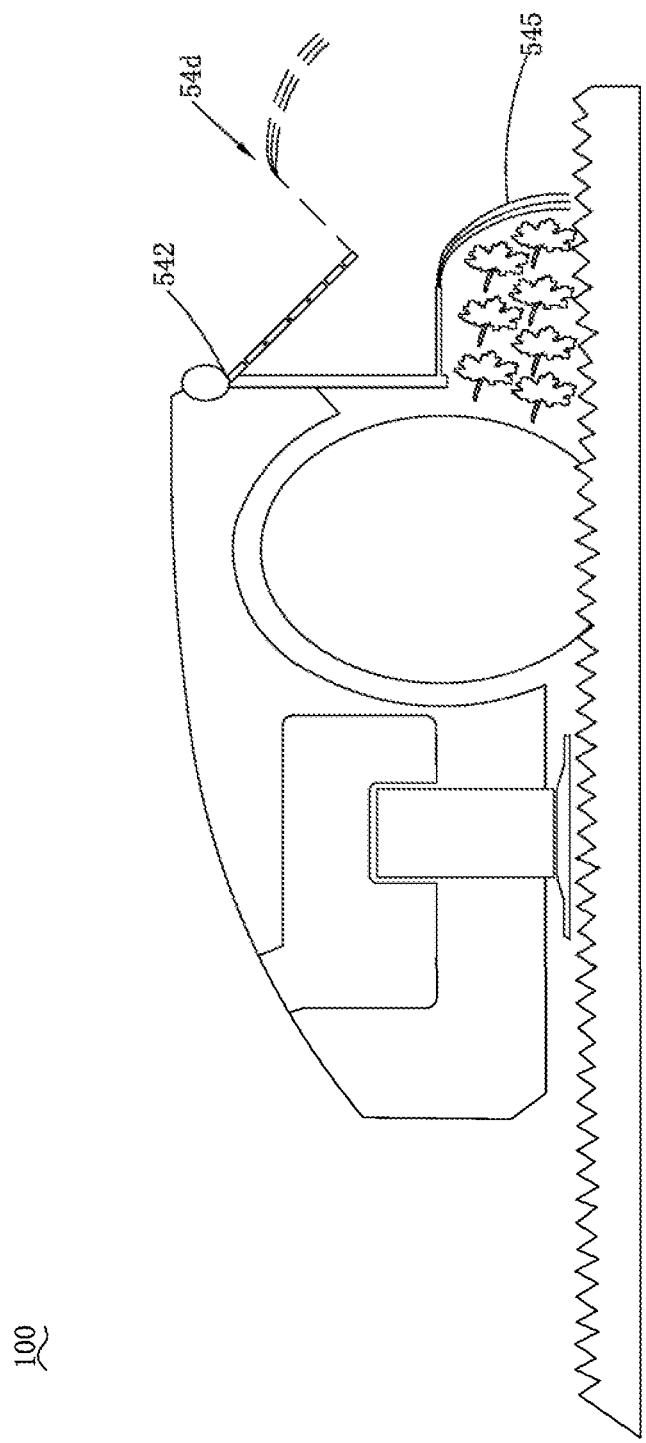
FIG. 17 is a schematic structural diagram of a self-moving gardening robot attached with a fallen leaves raking accessory according to an implementation of the present invention.

FIG. 17 shows a schematic structural diagram of a self-moving gardening robot to which a fallen leaves raking accessory 54d is attached. The fallen leaves raking accessory 54d includes a mating part 542 and a leaves raking part 545. The mating part 542 is configured to match the multi-functional accessory interface 12 of the self-moving gardening robot 100. The leaves raking part 545 is configured to comb and collect fallen leaves on a lawn, and may be specifically of a plurality of structural forms, for example, a comb shape or a plate shape. In this embodiment, the leaves raking part 545 is specifically be of a comb shape, and a cavity is provided between the leaves raking part 545 and a rear end of the housing of the self-moving gardening robot 100. The fallen leaves raking accessory 54d has a leaves raking state shown by the full line in FIG. 11 and non-leaves raking state shown by the dashed line in FIG. 12. The self-moving gardening robot 100 is provided with a motor.

The motor drives the leaves raking accessory 54*d* to switch between the leaves raking state and the non-leaves raking state. When the fallen leaves raking accessory 54*d* is in the leaves raking state, a distance between a tail of the leaves raking part 545 and the working surface is less than or equal to 10 cm, for example, 6 cm, 3 cm, or 0 cm. When the fallen leaves raking accessory 54*d* is in the non-leaves raking state, the distance between the tail of the leaves raking part 545 and the working surface is greater than 10 cm, so that the tail of the leaves raking part 545 is not apt to contact fallen leaves on the working surface.

Figure 18:
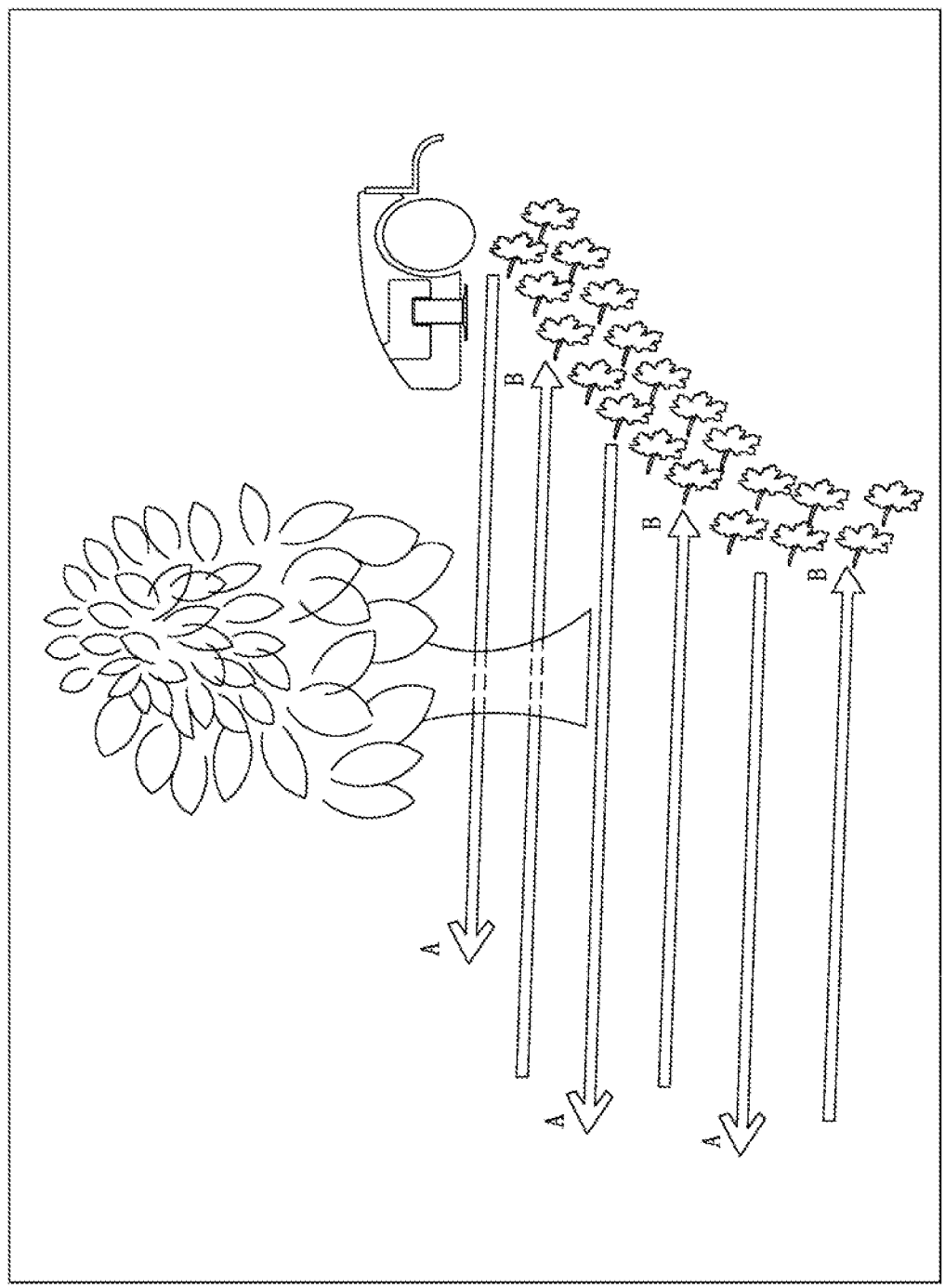
FIG. 18 is a schematic diagram of a scenario in which the self-moving gardening robot shown in FIG. 17 implements a fallen leaves sweeping function.

When implementing a fallen leaves sweeping function, there are two modes for the self-moving gardening robot 100 (e.g., as described with respect to at least FIGS. 2-5, 8, 9, 11-14, 17-20, and 31) to enter a fallen leaves area: (1) a user set mode; and (2) a self-learning mode. In the user set mode, the self-moving gardening robot 100 receives a user instruction through the wireless communication module 90. A user equipment 200 displays a working map interface of the self-moving gardening robot 100. The user designates, through a button or screen of the user equipment 200, the fallen leaves area, a travel path of the self-moving gardening robot 100 in the fallen leaves area, and a collection line location or a collection point location to which fallen leaves are collected by the self-moving gardening robot 100. After finishing the foregoing settings, the user sends a relevant instruction to the self-moving gardening robot 100 through the user equipment 200. In the self-learning mode, the self-moving gardening robot 100 determines the location of the fallen leaves area and the fallen leaves collection line location or the fallen leaves collection point location in the process of forming a working map through self-learning. A preset algorithm for the travel path in the fallen leaves area is provided in the control module 30 of the self-moving gardening robot 100. When the self-moving gardening robot 100 is in the fallen leaves area, the self-moving gardening robot travels and collects fallen leans along a path of the preset algorithm. In one of embodiments, in the fallen leaves area, the self-moving gardening robot 100 travels in a reciprocating manner along a preset path. FIG. 18 shows a travel process for a self-moving machine to implement a fallen leaves sweeping function. In the fallen leaves area, the self-moving gardening robot 100 travels in a reciprocating manner in two directions, namely, direction A and direction B, along a linear path shown in the figure. When the self-moving gardening robot 100 travels linearly in the direction A, the leaves raking accessory 54*d* (e.g., as described with respect to at least FIG. 17) is in the non-leaves raking state. When the self-moving gardening robot 100 travels linearly in the direction B, the leaves raking accessory 54*d* is in the leaves raking state. After the self-moving gardening robot 100 travels in a reciprocating manner in the fallen leaves area multiple times, fallen leaves on the working surface are all stacked in a fallen leaves collection line shown in the figure through sweeping of the leaves raking accessory 54*d*. Certainly, in other embodiments, the reciprocating travel path of the leaves raking accessory 54*d* may be in a non-linear form, fallen leaves raked by the leaves raking accessory 54*d* may alternatively be stacked to a point.

There may be one multi-functional accessory interface 12, configured to match mating parts corresponding to different functional accessories. There may alternatively be a plurality of multi-functional accessory interfaces 12, configured to respectively match mating parts corresponding to different functional accessories. In the foregoing embodiment, the mating parts of different accessories are all configured to match the multi-functional accessory interface 12 of the self-moving gardening robot 100, and therefore only one numeral 542 is used in the text to represent the mating parts of different accessories; this does not constitute a limitation that the mating parts of different accessories need to be of the same structure.

In one of embodiments, when the self-moving gardening robot 100 implements different functions, the control module 30 may control a travel speed of the moving module 20 to be different. When the self-moving gardening robot 100 performs different material functions, the control module 30 controls the travel speed of the moving module 20 according to an amount of a material needed per one square meter, a machine body area of the self-moving gardening robot 100, or/and a rotation speed of the cutting module.

Continuously referring to FIG. 4, in this embodiment, the self-moving gardening robot 100 further includes a grass condition identification sensor 40 (e.g., as shown in FIG. 5). The grass condition identification sensor 40 is configured to detect a growth condition of grasses on a lawn, and specifically may be various sensors for detecting the growth condition of grasses such as an image sensor and a moisture sensor. In this embodiment, the grass condition identification sensor 40 uses a capacitive sensor and determines a grass condition or a grass health condition by detecting a water content of grasses.

Figure 19:
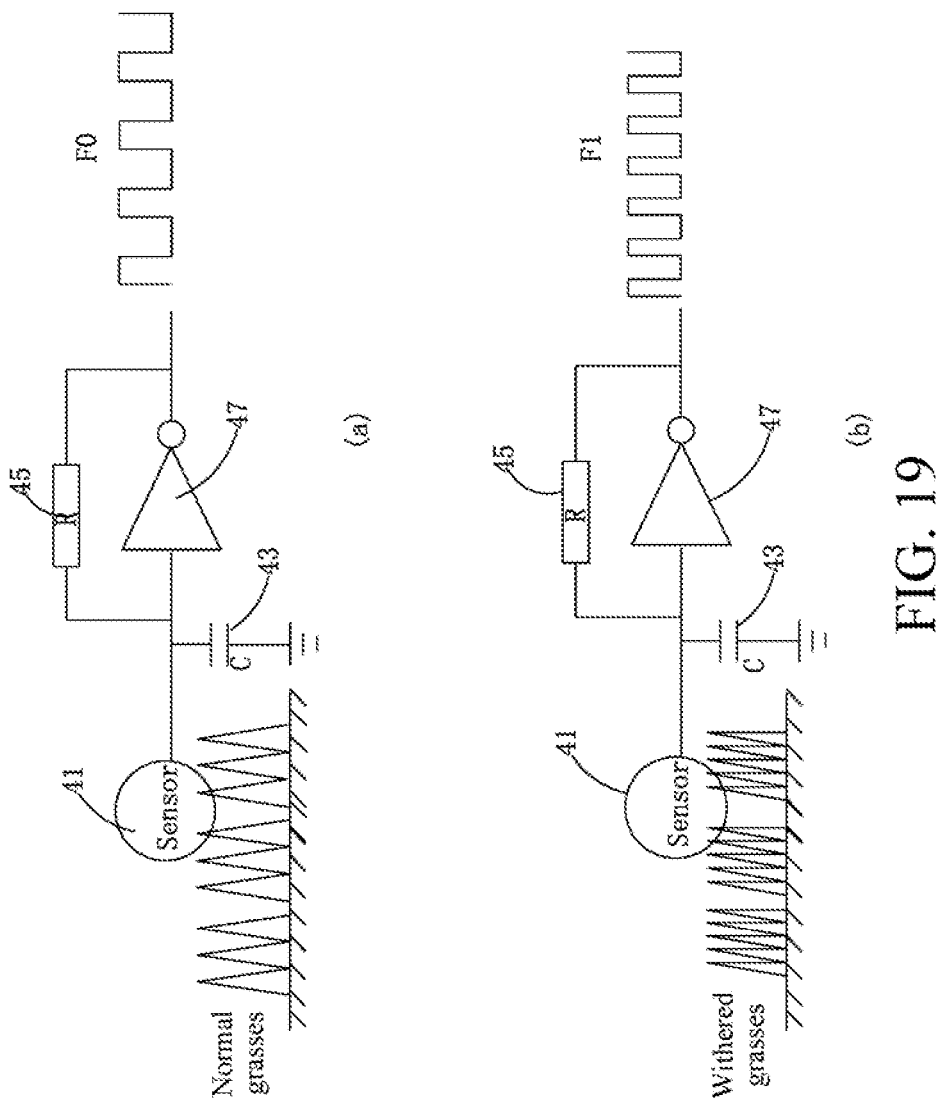
FIG. 19 is a schematic diagram of signal processing circuits and output signals of a grass condition identification sensor when detecting different grass conditions according to the present invention.

FIG. 19 shows a signal processing circuit of a grass condition identification sensor 40. The signal processing circuit of the grass condition identification sensor 40 includes a Schmitt trigger 47, an input capacitor 43, and a resistor 45. An input end of the Schmitt trigger 47 is connected to a probe 41 of the sensor, and an output end of the Schmitt trigger 47 (that is, an output end of the signal processing circuit) is electrically connected to the control module 30 (e.g., as described with respect to at least FIG. 3).

The grass condition identification sensor 40 is a capacitive sensor. The capacitive sensor includes a detection electrode and the detection electrode is configured to sense a grass condition. The sensor further includes a reference electrode corresponding to the detection electrode. The detection electrode approaches the lawn. When the grass condition varies, a capacitance of the capacitive sensor changes. Specifically, the probe 41 serves as the detection electrode of the capacitive sensor, and the reference electrode serves as a circuit ground of the signal processing circuit or the ground. When the grass condition under the probe 41 varies, a capacitance value of the capacitive sensor varies, and a reference value of an output signal of the signal processing circuit also varies.

Referring to FIG. 19, FIG. 19 is a schematic diagram showing signals output by the signal processing circuit in different grass conditions. When the self-moving gardening robot 100 travels on the lawn and the grass condition sensed by the probe 41 changes, the output signal of the signal processing circuit changes correspondingly. Specifically, when the grasses sensed by the probe 41 are normal grasses, the water content of the grasses is high, and correspondingly a dielectric constant value of the capacitive sensor is high. Therefore, a frequency F0 of the output signal of the signal processing circuit is low. When the grasses sensed by the probe 41 are withered grasses, the water content of the grasses is low, and correspondingly a dielectric constant value of the capacitive sensor is low. Therefore, a frequency F1 of the output signal of the signal processing circuit is high. The control module 30 determines a current grass condition according to the output signal of the signal processing circuit.

In one of embodiments, a match table between frequency ranges of the output signal and corresponding grass conditions is set in the control module 30. In this embodiment, a specific form of the grass condition match table is shown in table 1. Certainly, relevant parameters in the match table may change adaptively when a different signal processing circuit is used.

TABLE 1

Grass condition match table

| Grass condition indication color | Water content of grasses | Output frequency of signal processing circuit |
|---|---|---|
| Red | <60% | >950 KHz |
| Yellow | 60% to 70% | 800 KHz to 950 KHz |
| Green | >70% | <800 KHz |

In one of embodiments, the self-moving gardening robot 100 includes a plurality of grass condition identification sensors 40, and heights of probes 41 of the plurality of grass condition identification sensors 40 are different one another. When height differences between the probe 41 and the grasses are different, output signals of signal processing circuits of the capacitive sensors are also different. The control module 30 determines a current height of grasses by identifying the output signals of the signal output circuits of the plurality of capacitive sensors.

It should be noted that in other embodiments, the output signal of the signal processing circuit is not limited herein. When the probe 41 senses a grass condition, the output signal of the signal processing circuit may alternatively be another signal, for example, a level signal, as long as the signal can represent whether the probe 41 has sensed the grass condition.

In another embodiment, the grass condition identification sensor 40 is an image sensor, specifically, a video camera, a photographic camera, or the like. The image sensor photographs an image of a lawn in a travel area of the self-moving gardening robot 100. The control module 30 analyzes the image and obtains a grass condition in the image area through a corresponding image processing algorithm. Specifically, for example, by counting and analyzing color information and texture information in the image, a water content of grasses (green grasses or withered grasses) and a density condition of grasses (a sparse grass condition or a dense grass condition) are determined, so as to determine a health condition of the grasses.

In another embodiment, the self-moving gardening robot 100 is further provided with an ambient sensor configured to sense a surrounding environment. There may be a plurality of or multiple types of ambient sensors, specifically, for example, a moisture sensor, a temperature sensor, a wind speed sensor, or a drench sensor. The self-moving gardening robot 100 senses ambient information through the ambient sensor and transmits the specific ambient information (for example, moisture information, temperature information, wind strength information, or rain condition information) to the user equipment 200 through the wireless communication module 90. The specific transmission method may include: the wireless communication module 90 directly transmits the ambient information to the user equipment 200, or the wireless communication module 90 first transmits the ambient information to the service end 300 and then the service end 300 transmits the ambient information to the user equipment 200. In this embodiment, the self-moving gardening robot 100 is similar to a mobile weather station, to remotely inform the self-moving gardening robot 100 of weather information of the environment of the self-moving gardening robot 100, thereby implementing one machine with multiple functions. Through the user equipment 200, a user may monitor information about the environment of the self-moving gardening robot 100 and learn about information such as moisture, temperature, wind strength, or whether there is rain in the environment of the self-moving gardening robot. In one of embodiments, the user may change a work plan of the self-moving gardening robot 100 based on current ambient information (for example, moisture information, temperature information, wind strength information, or rain condition information).

Continuously referring to FIG. 2, in this embodiment, the energy module 60 provides electric energy to maintain travelling and working of the self-moving gardening robot 100. Specifically, the energy module 60 is a rechargeable battery pack, for example, a lithium battery pack. When the energy of the energy module 60 is lower than a preset threshold, the self-moving gardening robot 100 travels to the docking station 400 for replenishing electric energy.

Figure 20:
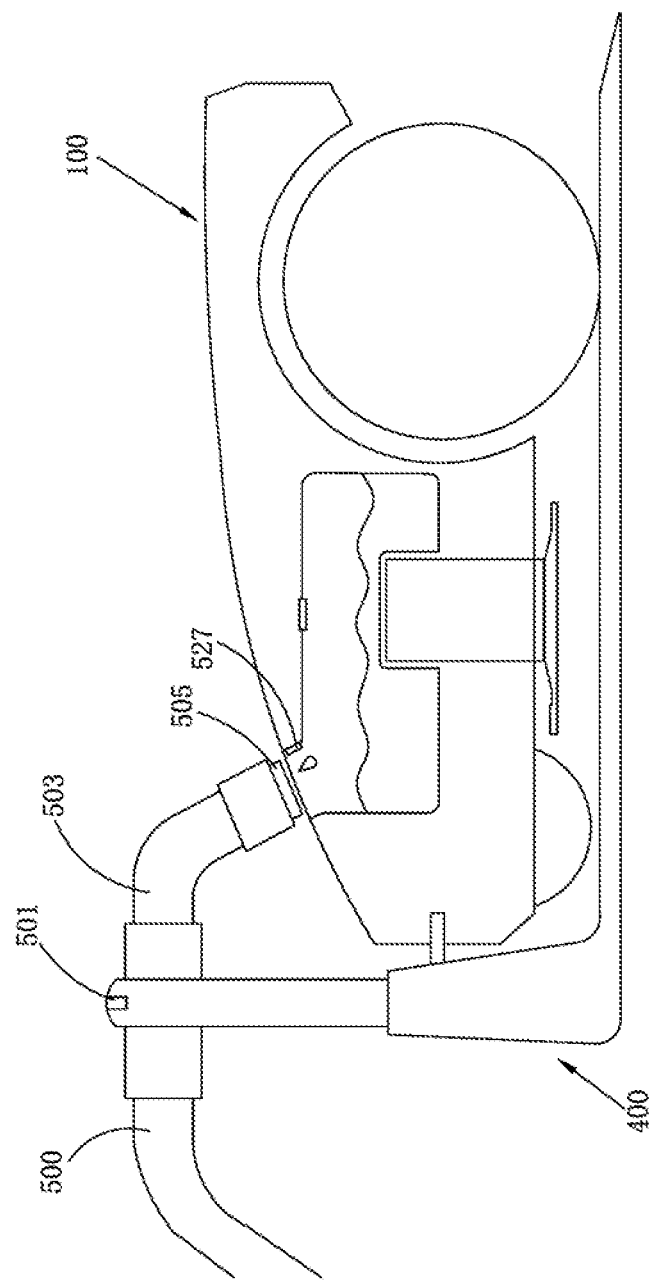
FIG. 20 is a schematic diagram of a self-moving gardening robot when a material is replenished according to an implementation of the present invention.

FIG. 20 shows a schematic structural diagram of a docking station. In this embodiment, the docking station 400 is provided with a material replenishing device 500. The material replenishing device 500 stores a material and injects the material to the material cavity 52 (e.g., as described with respect to at least FIGS. 5, 7(a), 7(b), and 7(c)) or a material storage box accessory of the self-moving gardening robot 100 through a material pipe 503. The material replenishing device 500 includes an automatic valve 501. When the self-moving gardening robot 100 needs to replenish a material, the control module 30 controls the self-moving gardening robot 100 to move to a preset location of the docking station 400 and controls a hatch (a type of switch) of the material opening 521 (e.g., as described with respect to at least FIG. 5) to be open. Alternatively, the material pipe 503 is an elastic pipe having a contraction performance. The material opening 521 includes a hatch driven by the elastic member. When the self-moving gardening robot 100 moves to the preset location of the docking station 400, the elastic material pipe 503 collides on the hatch of the material opening 521. Under the collision force, the hatch of the material opening 521 is opened. A part of the material pipe 503 extends into the material cavity 52. The material replenishing device 500 injects the relevant material into the self-moving gardening robot 100. When the capacity detection device 524 (e.g., as described with respect to at least FIGS. 5, 6(a), 6(b), and 6(c)) detects that the material capacity in the material cavity 52 or the material storage box accessory reaches a highest preset value, the control module 30 controls the self-moving gardening robot 100 to send a signal to the docking station 400. Specifically, communications may be performed in a wireless transmission manner. A control device in the docking station 400 controls the automatic valve 501 to be closed.

In another embodiment, the material replenishing device 500 may fixedly set a duration for which the automatic valve 501 is open. The duration for which the automatic valve 501 is open is determined based on a given volume of the material cavity 52 and a preset flow of the material pipe 503.

The automatic valve 501 may be specifically a normally closed solenoid valve. Before the self-moving gardening robot 100 is not successfully docked with the docking station 400, the solenoid valve is kept closed and the material cannot flow out. When the self-moving gardening robot 100 is successfully docked with the docking station 400, the docking station 400 provides electricity to the solenoid valve and the material flows out.

In this embodiment, the material replenishing device 500 is disposed in the docking station 400, whether the self-moving gardening robot 100 is moved to the preset location can be determined by using charging docking modules of the self-moving gardening robot 100 and the docking station 400. When the charging docking modules are successfully docked, it is considered that the self-moving gardening robot 100 has moved to the preset location. The control module in the docking station 400 controls the automatic valve 501 to be open. In one of embodiments, a tail 505 or an accessory of the material pipe 503 is provided with a circle of magnets, and a hall sensor 527 is disposed near an opening of the material cavity 52. The automatic valve 501 of the material replenishing device 500 is opened only when the hall sensor 527 senses a magnetic signal.

The docking determining method for the charging docking modules may be specifically a wired contact method through a current, a voltage, a communications protocol, or the like, or wireless non-contact method through infrared, ultrasound, Hall induction, uwb, or the like.

In one of embodiments, the docking station 400 distinguishes the self-moving gardening robots 100 of different functions through a signal for docking determining.

Types of the materials may be specifically water, pesticides, seeds, a fertilizer, or the like. There may be specifically one material replenishing device 500 to store different materials in different periods of time to provide different materials to the self-moving gardening robot 100.

When the type of the material is specifically water, the material replenishing device 500 is specifically a water supply replenishing device. In an embodiment, the water supply is connected to a household water faucet and the material replenishing device 500 through a water pipe. A power supply of the docking station 400 is connected to a household power supply and the docking station 400 through a cable. To control costs and maintain water pressure of the water supply, the location selected for the docking station 400 is close to the household water faucet as far as possible, to reduce a length of the water pipe.

In one of embodiments, a water passage and an electricity passage of the docking station 400 are separated from each other and a water-proof layer and an insulation layer are provided between the water passage and the electricity passage.

Figure 21:
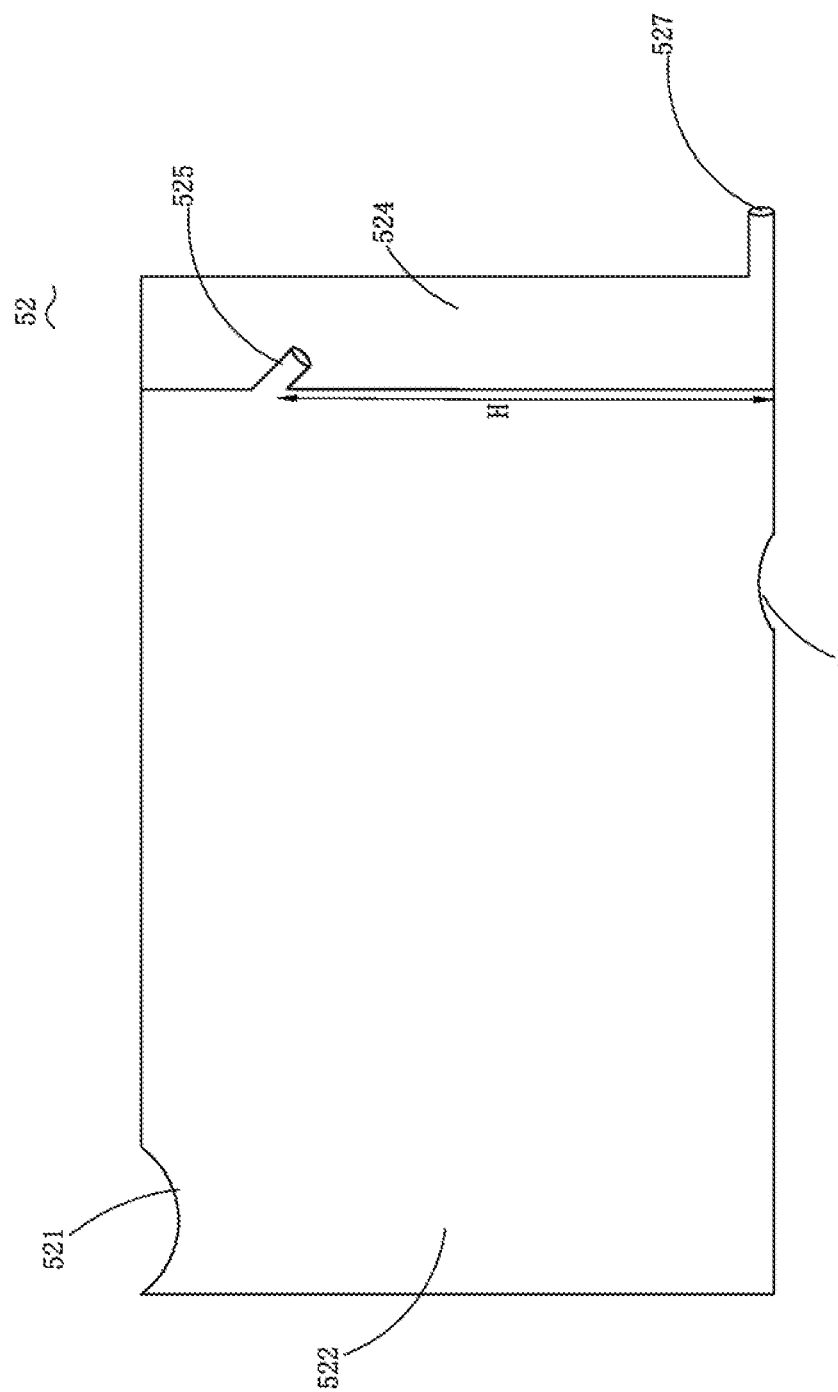
FIG. 21 is a schematic diagram of a water overflowing preventing structure of a self-moving gardening robot according to the present invention.

In one of embodiments, to prevent electric short circuit of the self-moving gardening robot caused by water overflowing the material cavity 54 in the process of adding water to the self-moving gardening robot 100, for example, short circuit of an electric button on the housing due to water inflow, short circuit of a control board or an electronic circuit around the material cavity 54 due to water inflow, the material cavity 52 of the self-moving gardening robot 100 is provided with a water overflowing prevention structure. FIG. 21 shows a schematic diagram of a water overflowing prevention structure of the material cavity 52. The material cavity 52 includes a main cavity 522 and a water overflowing cavity 524. A water overflowing vent 525 connecting the water overflowing cavity 524 is provided at a predetermined height H of the main cavity 522. A water leak vent 527 is provided at a bottom of the water overflowing cavity 524. The main cavity 522 is configured to store water and includes a material inlet 521 configured to intake water and a material outlet 523 configured to spray water to a grassland or a flower garden. When a level of water entering the main cavity 522 from the material inlet 521 is greater than or equal to the preset height H, the water in the main cavity 522 enters the water overflowing cavity 524 through the water overflowing vent 525 and is then dropped to a grassland or a flower garden through the water leak vent 527. The water overflowing prevention structure effectively prevents the situation in which water overflows from the material cavity in the water injection process.

In one of embodiments, the docking station 400 is also further provided with a nutrient solution box and a flow valve for controlling a flow of the nutrient solution. When water is added to the self-moving gardening robot 100, the flow valve is opened to enable the nutrient solution to mix with water and the flow to the material cavity 52.

There may alternatively be a plurality of material replenishing devices 500, respectively storing different materials. The self-moving gardening robot 100 automatically selects a corresponding material replenishing device 500 when needing a specific type of material. Certainly, the material replenishing device 500 may alternatively not use the same docking station 400 with the charging device. In one of embodiments, the charging device of the self-moving gardening robot 100 may use a wireless charging method. In one of embodiments, an accessory switching device may further be provided at the docking station 400. Accessories for implementing different functions are provided at the accessory switching device. When the self-moving gardening robot needs to switch a functional accessory, the self-moving gardening robot travels to a predetermined location of the accessory switching device and the accessory switching device automatically replaces the accessory carried by the self-moving gardening robot or automatically connects an accessory 54 of a corresponding function to the accessory interface 12 of the self-moving gardening robot.

In one of embodiments, the docking station 400 has a plurality of docking directions, and the self-moving gardening robot 100 may enter the docking station in different directions each time the self-moving gardening robot 100 returns.

In one of embodiments, the location of the docking station 400 is selected to be arranged on a hard ground other than a soft lawn.

In another embodiment, the moving module 20 uses an inflatable wheel, to prevent the self-moving gardening robot 100 from damaging a lawn, and an area of a cross section of the inflatable wheel satisfies a relationship of not crushing grasses. The area of the cross section of the inflatable wheel is associated with a weight of the self-moving gardening robot 100 and is also associated with an anti-crush coefficient of the working surface and the grasses.

The following content specifically introduces a working process for the self-moving gardening robot to implement multi-functional lawn maintenance.

The self-moving gardening robot 100 is provided with a function selection module. The function selection module performs a functional task prescribed by an instruction according to the received instruction. In an embodiment, the housing 10 of the self-moving gardening robot 100 is provided with a functional button (or another user input module) corresponding to different functions and a user triggers a function selection module through the functional button. In another embodiment, the self-moving gardening robot 100 is provided with a wireless communication module 90 and a user inputs or selects a corresponding functional option through a corresponding app client on the user equipment 200. The wireless communication module 90 receives the corresponding functional instruction and transmits the instruction to the function selection module. Certainly, the self-moving gardening robot 100 may alternatively be provided with both a functional button and a wireless communication module.

In one of embodiments, the self-moving gardening robot 100 is further provided with a full-automatic maintenance module automatically performing multi-functional tasks in order. A user sends an instruction through a housing button or a remote client to enable the full-automatic maintenance module, so that the self-moving gardening robot 100 enters a full-automatic lawn maintenance mode. In a specific embodiment, in the full-automatic lawn maintenance mode, the self-moving gardening robot 100 first starts a soil loosening function and then performs a sowing function, followed by a water spraying function, a fertilizing function, a grass cutting function, and a withered grass removing function. Specific parameters such as a sequence of the respective functions, time intervals between the respective functions, and a repeated time of the respective functions are not limited herein. The dealer or manufacturer of the self-moving gardening robot 100 may fix the parameters values in the full-automatic maintenance module based on big data statistics of lawn maintenance. In one of embodiments, a variable interface for the foregoing parameters is reserved in the full-automatic maintenance module and a user may adjust the foregoing parameters according to needs. In the full-automatic lawn maintenance mode, participation of a user and functional switch are no longer needed in daily maintenance actions by the self-moving gardening robot 100, such as sowing, fertilizing, water spraying, pesticides spraying, and withered grass removing for a lawn, and the self-moving gardening robot 100 can adaptively finish the actions.

Certainly, a user may alternatively input specific working time plan information through a housing button or a remote client.

In one of embodiments, the functional tasks can be grouped into high-frequency functional tasks and low-frequency functional tasks based on different frequencies at which the functional tasks are performed. For example, the grass cutting function, the water spraying function, and the fallen leaves collecting function may be set to be high-frequency functional tasks; and the soil loosening function, the sowing function, and the withered grass removing task may be set to be low-frequency functional tasks. When the self-moving gardening robot 100 performs a high-frequency functional task, the grass condition identification sensor 40 counts and/or updates grass condition information of the whole working area. The control module 30 determines, according to the grass condition information, a part of the working area on which a low-frequency functional task needs to be performed. The control module 30 controls the self-moving gardening robot 100 to automatically enter the part of the working area to perform the corresponding low-frequency functional task, or to prompt the user of the specific low-frequency functional task that needs to be performed on the part of the working area, so that the user performs functional task switch.

The self-moving gardening robot 100 may finish all task of courtyard maintenance by switching different functional tasks. In a specific implementation, for example, the self-moving gardening robot 100 automatically performs a high-frequency functional task, such as a grass cutting task or a water spraying task, according to a schedule. In this embodiment, the self-moving gardening robot 100 performing a grass cutting task is used as an example. In the process in which the self-moving gardening robot 100 performs the grass cutting task, the grass condition identification sensor 40 identifies a health condition of the lawn in the working area and transmits the health condition to the user equipment 200 through the wireless communication module 90. After the self-moving gardening robot 100 traverses the whole working area, the grass condition identification sensor 40 identifies the grass condition of the whole working area. The user equipment 200 or the service end 300 sends function switch prompt information to the user based on a preset algorithm and according to the grass condition or the self-moving gardening robot 100 automatically switches and performs another functional task. Specifically, when the grass condition indicates that a withered grass area is large, the user equipment 200 prompts relevant functional tasks such as grasses removing, soil loosening, and sowing. Under the prompt of the user, the functional tasks of the self-moving gardening robot 100 are sequentially switched. Specifically, when the grass condition indicates that the moisture of the lawn is excessively low, the self-moving gardening robot 100 automatically starts the water spraying task after finishing the grass cutting task. Certainly, only one specific scenario is described for automatic switch and manual switch of the functional tasks, and a change in the scenarios does not constitute a limitation to the automatic switch and manual switch.

In one of embodiments, the control module of the self-moving gardening robot 100 is provided with a schedule arrangement module. The schedule arrangement module distributes a time arrangement for performing different functions and/or a time arrangement for performing one same function for the self-moving gardening robot 100 according to date or season information. In a specific embodiment, the schedule arrangement module may store a time arrangement list according to annual grow rules of grasses in all regions around the world and used for performing different functions by the self-moving gardening robot 100. The rules can be obtained through meteorological statistics data.

In another embodiment, the schedule arrangement module may alternatively be operated by a user to set working frequencies at which the self-moving gardening robot 100 performs the different functions. For example, when performing the water spraying function, the self-moving gardening robot 100 is set to have a working frequency of 3 days each time and to work for a predetermined time each time; or, the self-moving gardening robot 100 is set to merely work on Tuesday and Saturday within a week and to work for a predetermined time each time. In one of embodiments, the self-moving gardening robot 100 may intelligently adjust the working frequency of water spraying according to a weather condition. When it is predicted to rain in the weather forecast, the water spraying frequency is reduced intelligently to avoid a raining day. In one of embodiments, the self-moving gardening robot 100 may intelligently compare, based on an irrigation amount each week recommended according to local climate and a grass condition, a water spraying frequency and a total water spraying amount each time set by a user, to automatically increase or decrease the water spraying frequency and the total water spraying amount each time.

The self-moving gardening robot 100 may be a single functional irrigating robot to perform a water spraying or flower watering function. In this embodiment, the self-moving gardening robot 100 does not need to use the same machine body with the foregoing functions such as grass cutting and fertilizing, and does not need to externally connect an accessory to implement functions such as soil loosening, withered grass removing, and fallen leaves sweeping. Correspondingly, a hardware part of the self-moving gardening robot 100 can be simplified or slightly changed. For example, the cutting module 56 no longer needs to be disposed in the working module 50 and the multi-functional accessory interface 12 no longer needs to be disposed in the housing 10. The self-moving gardening robot 100 performing the water spraying function is used as an example in the following content to introduce the whole process for the self-moving gardening robot 100 to finish the water spraying task in the working area.

After the self-moving gardening robot 100 receives a water spraying task instruction, the capacity detection device 524 detects a residual water amount in the material cavity 52. If the residual water amount is insufficient, the control module 30 controls the self-moving gardening robot 100 to return to the material replenishing device 500, for water supply. If the residual water amount is sufficient, the control module 30 controls the self-moving gardening robot 100 to travel in the working area from the start point and start to perform the water spraying work.

In the water spraying process, the self-moving gardening robot 100 controls the material opening 523 to be open and water falls from the material opening 523. When the self-moving gardening robot 100 uses the same machine body with the grass cutting function, the control module 30 starts the rotation speed control unit, to control the cutting module 56 to rotate at a low speed. The cutting module 56 rotates to drive the fallen water to evenly spread toward the lawn.

Certainly, the water spraying process may also be completed by using a drip irrigation device or a spraying device. In the automatic moving process of the self-moving gardening robot 100, the drip irrigation device is opened and water drops, from the material cavity through the drip irrigation device, on an area of a path through which the self-moving gardening robot 100 moves. When a spraying device is used in the water spraying process, the water spraying process is similar to a drip irrigation and water spraying process.

The self-moving gardening robot 100 has a precise water spraying working mode and a common water spraying working mode. In the common water spraying working mode, in the travel process of the self-moving gardening robot 100, the material opening is kept to be open, to spray water to the working area through which the self-moving gardening robot 100 travels. In the mode, the self-moving gardening robot 100 does not need to depend on the grass condition detected by the grass condition identification sensor 40, to perform water spraying control.

In the precise water spraying working mode, the grass condition identification sensor 40 detects a grass condition of an area where the self-moving gardening robot 100 is located and transmits the grass condition signal to the control module 30. The control module 30 controls opening and closing of the hatch of the material opening 523 according to the grass condition signal. When the grass condition identification sensor 40 identifies that the grass condition in the area where the self-moving gardening robot 100 is located is good, the control module 30 determines that water spraying is not needed in the area and therefore controls the material opening 523 to be closed. When the grass condition identification sensor 40 identifies that the grass condition in the area where the self-moving gardening robot 100 is located is poor, the control module 30 determines that water spraying is needed in the area and therefore controls the hatch of the material opening 523 to be open. In the precise water spraying working mode, the self-moving gardening robot 100 merely performs water spraying on a lawn area needing water spraying, thereby achieving the objective of saving water and avoiding impact on the grass condition and growth of the whole lawn due to abuse of water spraying.

In one of embodiments, the precise water spraying location may be transmitted to an application corresponding to the user equipment 200 trough the wireless communication module 90. A user learns about the locations on which precise water spraying has been performed and the total number of corresponding location points through an application interface. In another implementation process, the user may also designate, through the application interface, locations needing precise water spraying, and the application transmits the instruction to the self-moving gardening robot 100 in a wireless manner. The self-moving gardening robot 100 enters the designated location point to perform water spraying and transmits completion information to the application after precise water spraying is done at the preset location. Through the application interface, the user learns about a relevant condition of completion of precise water spraying at a location by the self-moving gardening robot 100.

In a implementation process, the self-moving gardening robot 100 is provided with a positioning module 70, and the travel mode of the self-moving gardening robot 100 in the working area is travelling along a planned path. The positioning module 70 positions a location of the self-moving gardening robot 100 and transmits the location information to the control module 30. The control module 30 compares the location information and planned path data, to control a travel direction of the self-moving gardening robot 100. In one of embodiments, the self-moving gardening robot 100 automatically traverses the whole working area with the assist of the positioning module 70. The control module 30 controls the self-moving gardening robot 100 not to travel to a lawn area on which water has been sprayed, thereby preventing the self-moving gardening robot 100 from damaging the lawn or leaving a wet tracing rut on the lawn, and meanwhile preventing the self-moving gardening robot 100 from performing repeated water spraying on the same area. After the self-moving gardening robot 100 traverses the whole working area, the self-moving gardening robot 100 stops the water spraying function.

In this embodiment, the self-moving gardening robot 100 may perform self-learning by using the positioning module 70, to determine a working map of the working area. Specifically, the user controls the self-moving gardening robot 100 or takes out the positioning module 70, to walk around the working area along the borders, so that the self-moving gardening robot 100 records the travel track and defines the track as a boundary of the working area; or to walk around an obstacle point in the working area, so that the self-moving gardening robot 100 records the track and defines the track as an obstacle area; or to walk around a flower bed or a flower garden, so that the self-moving gardening robot 100 records the track and defines the track as a flower garden area; or to walk around a predetermined radius of a tree, so that the self-moving gardening robot 100 records the track and defines the track as a fallen leaves area; or to walk around an area such as a pool or a steep slope that is not suitable for the self-moving gardening robot 100 to enter, so that the self-moving gardening robot 100 records the track and defines the track as a dangerous area. The control module 30 of the self-moving gardening robot 100 determines different water spraying policies based on a preset algorithm and according to a formed map and a sign in the map.

In this embodiment, the storage unit of the self-moving gardening robot 100 stores a map of the working area 3.

After the self-moving gardening robot 100 is positioned, the self-moving gardening robot 100 can identify its location on the map. In one of embodiments, the map information of the working area 3 stored in the storage unit may update according to a state of the working area traversed by the self-moving machine 100 each time.

In one of embodiments, the map of the self-moving gardening robot 100 has an automatic update function. When the self-moving gardening robot 100 encounters an obstacle in the working area, the self-moving gardening robot circles around the obstacle to generate an island and updates map information of the island to the map in the storage unit.

In one of embodiments, when a grassland condition in the working area changes, the self-moving gardening robot 100 receives the change and marks the changed area on the map, to further change the water spraying policy for the area. Specifically, sowing is again performed on a subarea in the working area. During sowing, a sowing machine transmits map information of the subarea to the self-moving gardening robot 100. The self-moving gardening robot 100 marks the newly sowed area in the existing map, and the control module 30 automatically changes the water spraying policy of the newly sowed area according to an amount of water needed for a growth cycle of the type of grasses, specifically, for example, reducing the water spraying frequency in the area or reducing the water spraying amount of each water spraying. Certainly, if the sowing machine does not have a map coordinate marking function, the map information of the newly sowed area may also be manually updated by a user and transmitted to the self-moving gardening robot 100.

Figure 22:
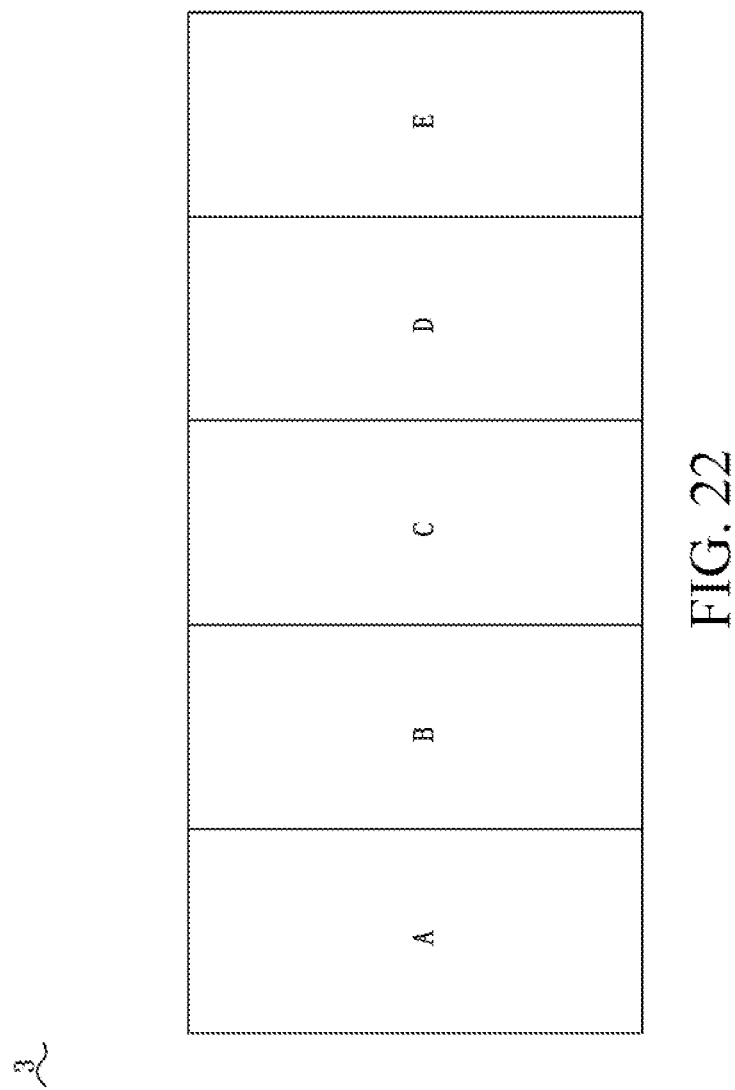
FIG. 22 is a schematic diagram of partition of a working area by a self-moving gardening robot according to the present invention.

In one of embodiments, after the working area map of the self-moving gardening robot 100 is formed, the self-moving gardening robot 100 may automatically divide the working area, to implement a partition water spraying policy. FIG. 22 is a schematic diagram of automatic partition of the working area by the self-moving gardening robot 100. In this embodiment, the self-moving gardening robot 100 divides the working area into five working subareas, namely, A, B, C, D, and E. The self-moving gardening robot 100 performs water spraying on only one working subarea each day according to a water spraying frequency. In a specific implementation process, for example, the self-moving gardening robot 100 performs the water spraying work only on a working subarea A on Monday, performs the water spraying work only on a working subarea B on Tuesday, performs the water spraying work only on a working subarea C on Wednesday, performs the water spraying work only on a working subarea D on Thursday, and performs the water spraying work only on a working subarea E on Friday. On Saturday or next Monday, the self-moving gardening robot 100 again performs the water spraying work on the working subarea A. Water spraying is periodically performed on each working subarea in turn at a set frequency. In one of embodiments, the time for the self-moving gardening robot 100 to spray water to the subarea can be automatically adjusted according to the weather. In a specific implementation process, if the self-moving gardening robot 100 finishes the water spraying work for the working subarea A on Monday and on Tuesday, it rains, the self-moving gardening robot 100 does not perform the water spraying work on the working subarea B on Tuesday, but performs the water spraying work on the working subarea B on Wednesday. Correspondingly, the water spraying dates for the working subareas C, D, and E are postponed by one day. In this embodiment, no limitation is constituted for the number of the working subareas in the working area 3, and the specific number of the working subareas may be determined according to a total area of the working area and a water capacity of the material cavity and an endurance power of the battery of the self-moving gardening robot. In this embodiment, no limitation is constituted for the water spraying frequency, the period, and the postponed time according to the weather of the working subarea, which can be changed adaptively according to the specific application scenario. In this embodiment, by performing partition irrigation on the working area 3, load of the self-moving gardening robot 100 can be effectively reduced, specifically, for example, the requirements for the water capacity of the material cavity and the endurance power of the battery of the self-moving gardening robot 100 can be reduced. In this embodiment, the time for partition irrigation may be automatically adjusted according to the weather condition, and rainfall can be effectively used to irrigate the grasses, thereby effectively reducing water consumption.

Figure 23:
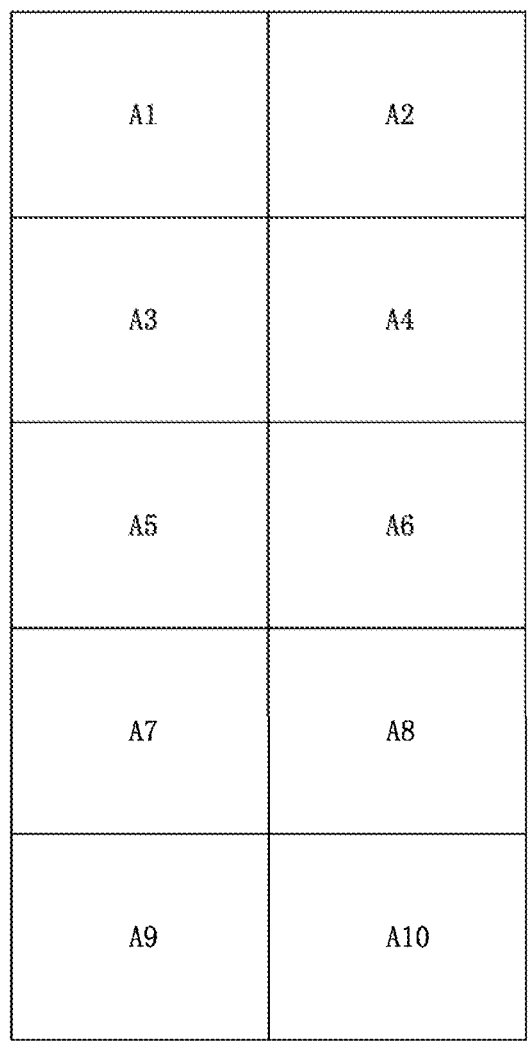
FIG. 23 is a schematic diagram of partition of a working subarea by a self-moving gardening robot according to the present invention.

In one of embodiments, the self-moving gardening robot 100 may further divide each working subarea when performing water spraying on the working subarea. FIG. 23 is a schematic diagram showing performing partition water spraying on the working subarea A. The self-moving gardening robot 100 divides the working subarea A into 10 small subareas, respectively A1 to A10, to form a grid partition. The number and area of the small subareas are determined according to the water capacity and endurance power of the battery of the self-moving gardening robot 100. Specifically, the amount of water in the material cavity of the self-moving gardening robot 100 is enough to irrigate a small subarea, the endurance power of the battery can meet a round trip for the self-moving gardening robot 100 from the docking station 400 to the small subarea and a trip for the self-moving gardening robot 100 to perform water spraying in the small subarea.

Figure 24:
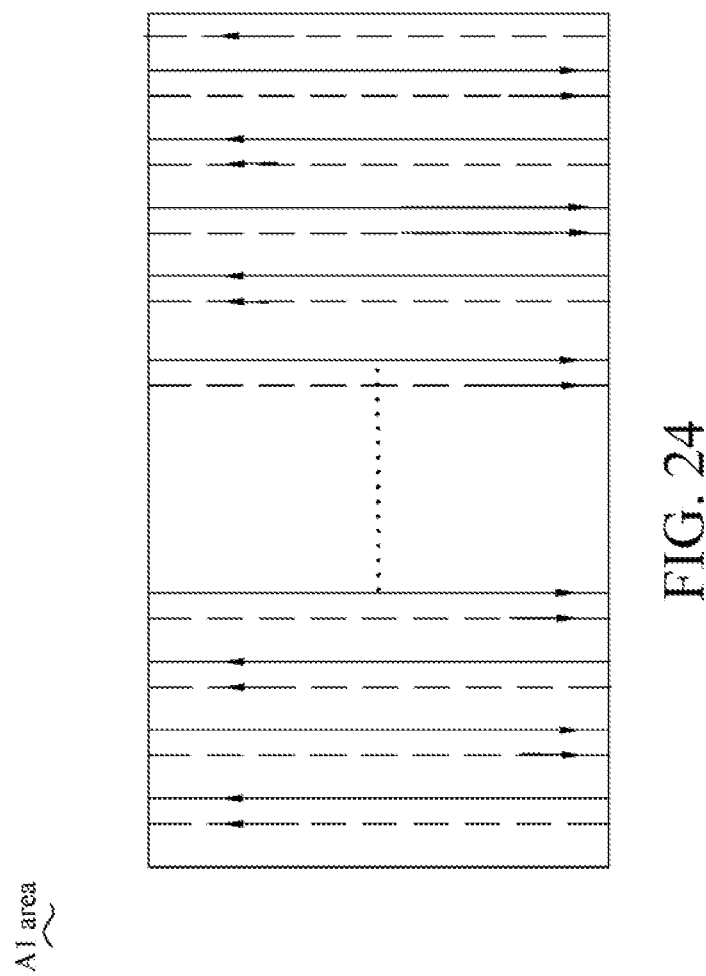
FIG. 24 is a schematic diagram of moving paths of a self-moving gardening robot in a working subarea according to the present invention.
Figure 25:
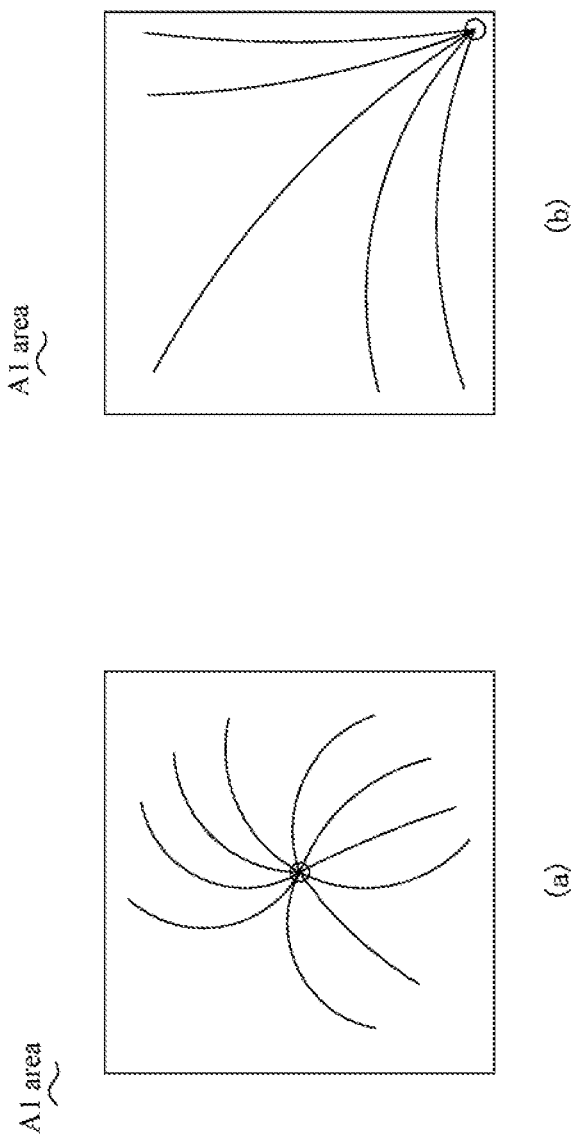
FIG. 25 is a schematic diagram showing a self-moving gardening robot performing sprinkling irrigation in a working subarea according to the present invention.

Water spraying in the small subarea by the self-moving gardening robot 100 may specifically use a drip irrigation manner or a sprinkling irrigation manner. In an embodiment, as shown in FIG. 24, the self-moving gardening robot 100 (e.g., as described with respect to at least FIGS. 2-5, 8, 9, 11-14, 17-20, and 31) uses a drip irrigation manner and travels in a small subarea A1 along a planned path in a reciprocating manner. The planned path may be specifically a plurality of paths parallel to each other. In one of embodiments, a water spraying diameter of the self-moving gardening robot 100 is greater than or equal to a transverse length of the machine body of the self-moving gardening robot 100. When the self-moving gardening robot 100 travels along the path in a reciprocating manner, the drip irrigation device is started and grasses on the path are irrigated. In one of embodiments, the planned paths for the self-moving gardening robot 100 to enter the small subarea A1 in different periods are different. As shown in FIG. 24, the path shown by the full line is a path that the self-moving gardening robot 100 travels the first time, and the path shown by the dashed line is a path that the self-moving gardening robot 100 travels the second time. Through different preset paths to the small subarea each time, the self-moving gardening robot 100 can effectively alleviate the problem of grass crushing due to repeated paths in the water spraying process, and the whole water spraying distribution amount is effectively distributed in the small subarea A1. In an embodiment, as shown in FIG. 25, the self-moving gardening robot 100 (e.g., as described with respect to at least FIGS. 2-5, 8, 9, 11-14, 17-20, and 31) sprays water in the small subarea A1 in a sprinkling irrigation manner. The self-moving gardening robot 100 is located a point in the small subarea A1, the control module 30 (e.g., as described with respect to at least FIG. 3) controls a direction and injection strength of the sprinkler device, to implement irrigation on the whole small subarea A1. In one of embodiments, the sprinkling irrigation location points of the self-moving gardening robot 100 in the small subarea A1 are different in different periods. As shown in FIG. 25(a), the sprinkling irrigation location point of the self-moving gardening robot 100 in the small subarea A1 at the first time is a central position of the small subarea A1, and the sprinkling irrigation method is ejecting and spraying 360° around in the small subarea A1. As shown in FIG. 25(b), the sprinkling irrigation location point of the self-moving gardening robot 100 in the small subarea A1 at the second time is a boundary position of the small subarea A1, and the ejecting method is ejecting in a fan shape in the small subarea A1. Through different sprinkling irrigation location points in the small subarea each time, the self-moving gardening robot 100 effectively distributes the whole water spraying distribution amount in the small subarea A1 and effectively avoids the problem of uneven water spraying amount at borders of the small subarea A1 and an adjacent small subarea thereof.

Figure 26:
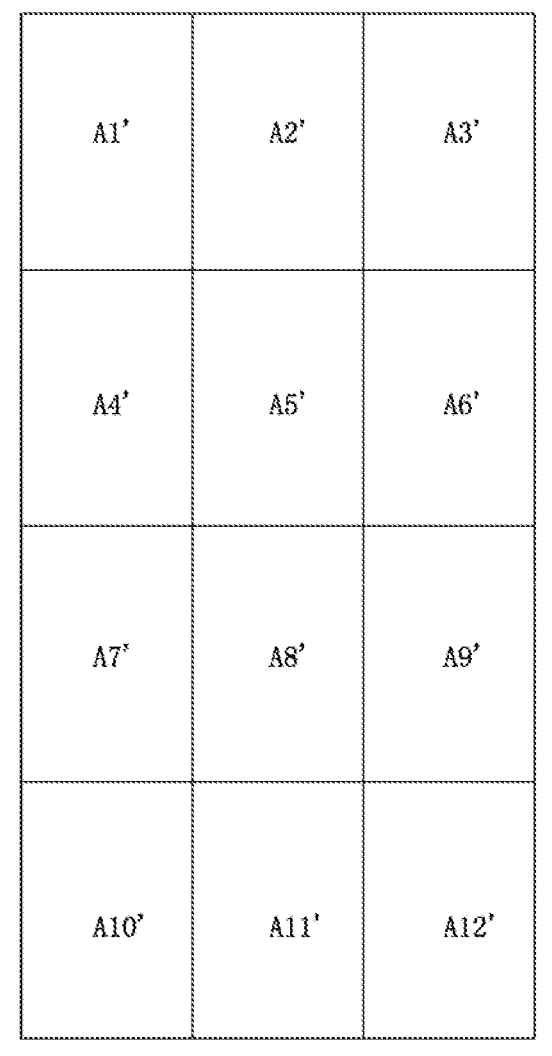

In one of embodiments, partition of the working subarea by the self-moving gardening robot 100 is dynamically changing. Specifically, the small subareas obtained by dividing the working subarea A by the self-moving gardening robot 100 the first time are shown in FIG. 23, and the small subareas obtained by dividing the working subarea A by the self-moving gardening robot 100 the second time are shown in FIG. 26. Through dynamic partition of the small subareas, distribution of irrigation on grasses in the working subarea A by the self-moving gardening robot 100 becomes more uniform, thereby promoting uniform growth of the grasses in the whole working subarea A and enabling the whole lawn to have an aesthetic appearance.

When performing irrigation on each working subarea, the self-moving gardening robot 100 (e.g., as described with respect to at least FIGS. 2-5, 8, 9, 11-14, 17-20, and 31) performs irrigation on each small subarea in a manner of from far to near by using the docking station 400 (e.g., as described with respect to at least FIG. 2) as a base point. With respect to FIG. 23, assume that the docking station 400 depicted in FIG. 2 is arranged at a boundary angle of a small subarea A1, the self-moving gardening robot 100 performs irrigation on the small subarea in a time order of A1→A2→A3→A4→A5→A6→A7→A8→A10→A9 or A2→A1→A4→A3→A6→A5→A8→A7→A10→A9, or in other irrigation manners from far to near. In the process in which the self-moving gardening robot 100 returns to the docking station 400 for adding water and/or charging after completing irrigation on the small subarea, a planned return path does not pass through an irrigated area. In one of embodiments, the return path of the self-moving gardening robot 100 is a calculated shortest path. In one of embodiments, the dangerous areas marked during construction of the map are excluded from the return path of the self-moving gardening robot 100. In one of embodiments, the return path of the self-moving gardening robot 100 changes dynamically each time, and the same return path is not repeatedly traveled.

In one of embodiments, the irrigation policies of the self-moving gardening robot 100 for a working area having a slope and a working area not having a slope are different. Specifically, the irrigation amounts needed by the grasses on a slope facing the sun and on a slope facing north are different from that of grasses on flat surfaces. Therefore, the irrigation frequency and irrigation amount on the grasses on the slope facing the sun by the self-moving gardening robot 100 may adaptively be increased and the irrigation frequency and irrigation amount on the grasses on the slope facing north may adaptively be reduced. In one of embodiments, when a slope angle of a slope land is excessively large and the slope land is not suitable of the self-moving gardening robot 100 to travel, the self-moving gardening robot 100 may select to perform irrigation in a sprinkling irrigation below or above the slope land. In one of embodiments, when constructing the working area map of the self-moving gardening robot 100, the user may mark a slope facing the sun and a slope facing north, and the self-moving gardening robot 100 may automatically determine the slope facing the sun and the slope facing north according to the mark when travelling to a specific area.

In a implementation process, the self-moving gardening robot 100 is provided with a positioning module 70. The storage unit of the control module 30 records location information of the self-moving gardening robot 100 when implementing water spraying. Therefore, the self-moving gardening robot 100 may implement not repeatedly spraying water at the same water spraying location point. The control module 30 first determines whether a location of the self-moving gardening robot 100 is a water spraying position recorded in the storage unit; if yes, the control module 30 controls the working module for spraying water not to work; otherwise, the control module 30 controls the water spraying module to work.

In a implementation process, the self-moving gardening robot 100 is provided with a positioning module 70. When the self-moving gardening robot 100 needs to interrupt water spraying to replenish water supply, the storage unit of the control module 30 records the interrupted location information and the traveling direction at this time and controls the self-moving gardening robot 100 to move to the docking station according to the preset moving path or the preset target location, to replenish water supply. After the self-moving gardening robot 100 completes replenishing water supply, the control module 30 controls the self-moving gardening robot 100 to travel to the interrupted position and to travel in the original direction, to perform the water spraying task.

In a implementation process, the self-moving gardening robot 100 is provided with a positioning module 70, and the storage unit of the control module 30 records location information of the self-moving gardening robot 100 during the travel process and grass condition information identified by the grass condition identification sensor 40 for the location information. After the self-moving gardening robot 100 travels to cover the whole lawn, the storage unit records grass condition information of the whole lawn.

In a implementation process, the self-moving gardening robot 100 is provided with a wireless communication module 90, and a user learns about a state of the self-moving gardening robot 100 and controls the self-moving gardening robot 100 through the user equipment 200. Specifically, the capacity detection device 524 detects a material residual amount in the material cavity 52 and transmits the material residual amount to the service end 300. The service end 300 receives material residual amount data and determines whether to add a material, so as to generate a prompt instruction. The service end 300 transmits the material residual amount data and the prompt instruction to a corresponding app program or application on the user equipment 200. The corresponding app program or application or app or application interface of the user equipment 200 displays the material residual amount data and a material addition prompt state.

The corresponding app program of the user equipment 200 is provided with an instruction input port, for a user to remotely control the self-moving gardening robot 100. The specific control instructions include: various control instructions such as setting a working schedule of the self-moving gardening robot 100, performing functional selection or switch, setting relevant parameters of the self-moving gardening robot 100, enabling the self-moving gardening robot 100 to start work, and commanding the self-moving gardening robot 100 to return to the docking station 400.

In one of embodiments, the self-moving gardening robot 100 is further provided with a grass condition identification sensor 40. The app or application interface of the user equipment 200 may display grass condition of a current location of the self-moving gardening robot 100.

In one of embodiments, the self-moving gardening robot 100 is also provided with a positioning module 70, and the app interface of the user equipment may display the grass condition of the whole lawn. The wireless communication module 90 transmits data of each location of the lawn and grass condition at the location to the service end 300, and the service end 300 counts lawn information of the whole lawn, to form a grass condition thumbnail image corresponding to the lawn map or a grass condition data ratio of the whole lawn. In one of embodiments, the app or application interface of the user equipment displays the lawn map, and the grass conditions in all the areas of the lawn map are marks in colors. An area with a good grass condition is shown in green, an area with an intermediate grass condition is shown in yellow, and an area with a poor grass condition is shown in red. Through the interface, a user may clearly learn about the grass conditions in all areas of the whole lawn. In one of embodiments, the app interface of the user equipment may further display an operation prompt according to the statistic grass condition information. Specifically, when a withered grass ratio in the statistic grass conditions reaches 10% of the area of the lawn, the app interface of the user equipment displays and prompts a user the specific functions to be implemented: for example, implementing a withered grass removing function, implementing a re-sowing function, implementing a water spraying function, and implementing a fertilizing function.

In an embodiment, by disposing a wireless transmission relay or using a long-distance coverage wireless communications device, all points in the working area 3 are covered with a wireless network. The self-moving gardening robot 100 can be wirelessly connected to the service end 300 at any point in the working area 3. The self-moving gardening robot 100 interacts with the service end in real time in the working area 3, to transmit data and receive instructions. In other embodiments, if the self-moving gardening robot 100 works in a working area of an ultra large range, a part of the working area is covered by the wireless network and the other part of the working area is not covered by the wireless network. The wireless communication module 90 can be connected to the service end 300 only when the self-moving gardening robot 100 is in the part of area covered by the wireless network. In this embodiment, the self-moving gardening robot 100 stores work data or grass condition data through the storage unit of the control module 30. When the self-moving gardening robot 100 enters the part of area covered by the wireless network, the control module 30 transmits data that has been stored in the storage unit to the service end 300 through the wireless transmission module 90.

In one of embodiments, the self-moving gardening robot 100 obtains local weather forecast information through the wireless communication module 90. The control module 30 controls the self-moving gardening robot 100 to perform or not to perform a water spraying function according to the obtained weather forecast information. A specific example is described below. According to a schedule or a user instruction, the self-moving gardening robot 100 needs to perform a water spraying task today. Before performing the water spraying task, the self-moving gardening robot 100 first obtains weather condition information of next three days through the wireless communication module 90. If it is predicted to have rain in the next three days, the wireless communication module 90 transmits the information to the control module 30. The control module 30 controls the self-moving gardening robot 100 not to perform the water spraying function temporarily. In other embodiments, obtaining of the weather conditions and control of instruction generation may alternatively be completed by the service end 300.

Figure 1:
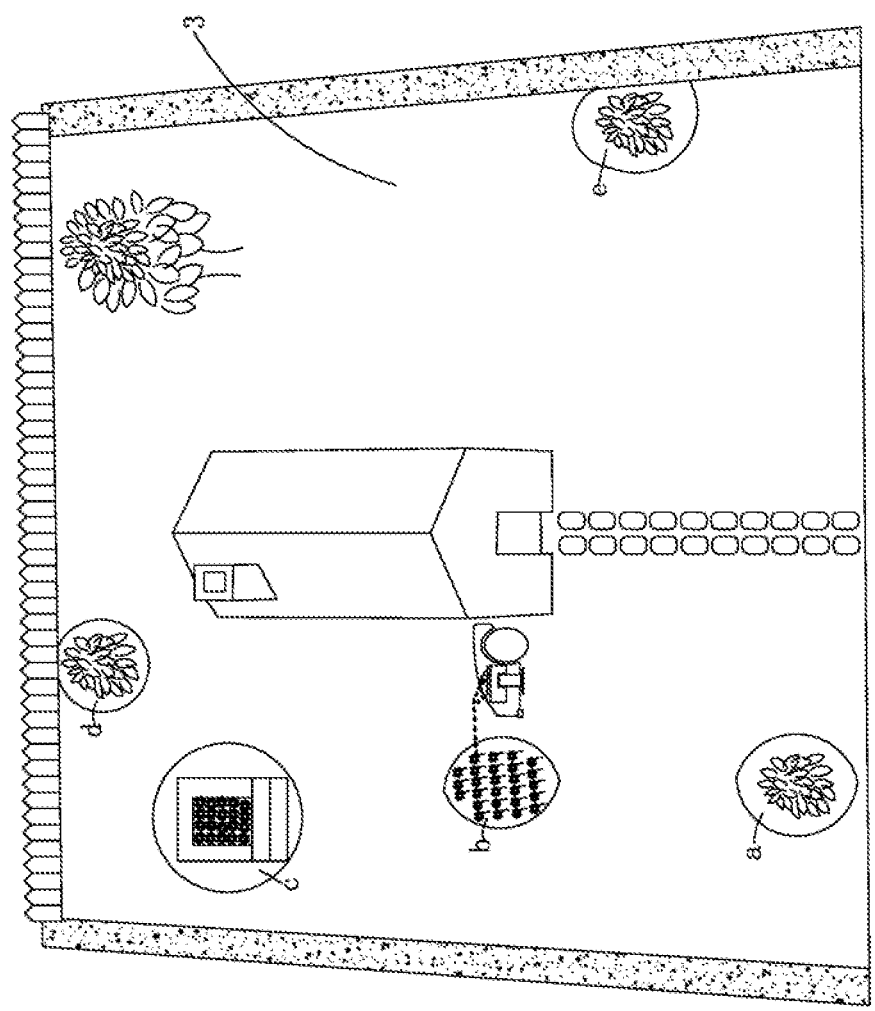
FIG. 1 is a schematic diagram of an arrangement of a common home courtyard.

When there are still flower plants in the working area 3 in addition to the lawn, the process for the self-moving gardening robot 100 to perform flower watering for the flowers is shown in FIG. 1. In this embodiment, the self-moving gardening robot 100 is provided with a spraying device 526. The self-moving gardening robot 100 has a water spraying mode for spraying water on a lawn and a flower watering mode for watering flowers. In the flower watering mode, the self-moving gardening robot 100 is first positioned to the flower garden area stored in the self-learning process. As shown in FIG. 1, there is a plurality of flower garden areas, respectively, area a, area b, area c, area d, and area e, in the working area 3. The self-moving gardening robot 100 moves to different flower garden areas. The control device 30 enables the spraying device 526 and controls a throw range of the spraying device 526 to be different according to different ranges of the flower garden areas.

When the self-moving gardening robot 100 separately performs other functions such as grass cutting, fertilizing, sowing, pesticides spraying, soil loosening, withered grass removing, and fallen leaves collecting or when the self-moving gardening robot 100 is integrated with multiple functions and respectively perform the individual function, the part of the working process similar to that in the working process of performing the water spraying function is not described in detail again herein.

Certainly, the material of the self-moving gardening robot 100 may alternatively be directly added manually by a user. When the material in the material cavity 52 is less than a preset threshold, the self-moving gardening robot 100 prompts a user to add the material. For example, the self-moving gardening robot 100 transmits prompt information to the corresponding application of the user equipment 200 through the wireless transmission module 90, or self-moving gardening robot 100 sends a prompt signal such as a sound or light.

Certainly, when the self-moving gardening robot 100 performs some functions, the travel mode of the self-moving gardening robot 100 in the working area is also random travel. The self-moving gardening robot 100 travels randomly in the working area multiple times, to cover the whole working area.

The following describes details of the complete working process for the self-moving gardening robot to implement different functions.

Figure 27:
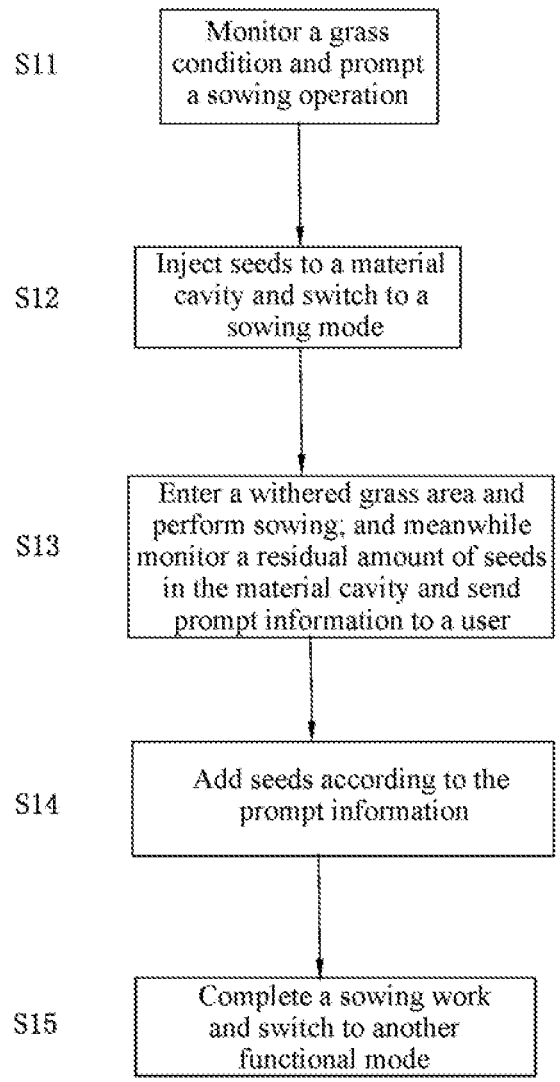
FIG. 27 is a workflow chart showing a self-moving gardening robot performing a sowing task according to the present invention.

FIG. 27 shows a specific workflow for a self-moving gardening robot 100 to perform a sowing functional task.

Step S11: Monitor a health condition of a lawn and according to a grass condition, prompt a user of whether a sowing operation needs to be performed. In the step, the health condition of the lawn may be collected and obtained by a grass condition identification sensor 40 in a process in which the self-moving gardening robot 100 traverses a working area when the self-moving gardening robot 100 performs another functional task (for example, a grass cutting task). When the grass condition shows that there is a withered grass area or an accumulated area of withered grass areas is large, the self-moving gardening robot 100 sends a sowing task prompt to a user equipment 200 through a wireless communication module 90.

Step S12: After the user receives the sowing task prompt, the user injects corresponding seeds to a material cavity 52 of the self-moving gardening robot 100, and switches a working mode of the self-moving gardening robot 100 to a sowing mode.

Step S13: In the sowing working mode, the self-moving gardening robot 100 finds the withered grass area by using the grass condition identification sensor 40, finds the withered grass area, according to a withered grass location point stored in the process of monitoring the health condition of the lawn, or finds the withered grass area by receiving a withered grass location point selected by the user. The self-moving gardening robot 100 enters the withered grass area, to perform sowing. In the sowing process, the self-moving gardening robot 100 simultaneously monitors a residual amount of seeds in the material cavity 52. The specific monitoring method may be implemented by using the foregoing capacity detection device 524. When the residual amount of seeds is less than a preset capacity, the self-moving gardening robot 100 sends, to the user equipment 200 through the wireless communication module 90, prompt information of adding seeds.

Step S14: When the user receives the prompt information of adding seeds, the user again injects the corresponding seeds to the material cavity 52 of the self-moving gardening robot 100.

Step S15: After the self-moving gardening robot 100 completes the sowing task for all withered grass areas, the user or the self-moving gardening robot 100 switches so that the self-moving gardening robot 100 enters another working mode, is turned off, or returns to a docking station 400 for docking. In the step, the self-moving gardening robot 100 may determine whether the sowing task for all the withered grass areas is completed by traversing the lawn, or determine whether the sowing task is performed on the stored withered grass location point or the withered grass location point pointed by the user.

If the area of the withered grass area is large, step S13 and step S14 need to be repeated multiple times in the process in which the self-moving gardening robot 100 completes the sowing task for all the withered grass areas.

In the specific implementation process, the seeds are added by the user manually. As described above, the self-moving gardening robot 100 may automatically return to the docking station 400 for automatically adding seeds. The specific adding process is not described in detail herein.

In the process in which the self-moving gardening robot 100 performs the sowing task, if electric energy insufficiency appears to the self-moving gardening robot 100, the self-moving gardening robot 100 automatically returns to the docking station 400 for replenishing electric energy.

The scenario and workflow for the self-moving gardening robot 100 to perform a fertilizing function are similar to those for the self-moving gardening robot 100 to perform the sowing function, and therefore the workflow for the self-moving gardening robot 100 to perform the fertilizing function may also refer to FIG. 27.

Figure 28:
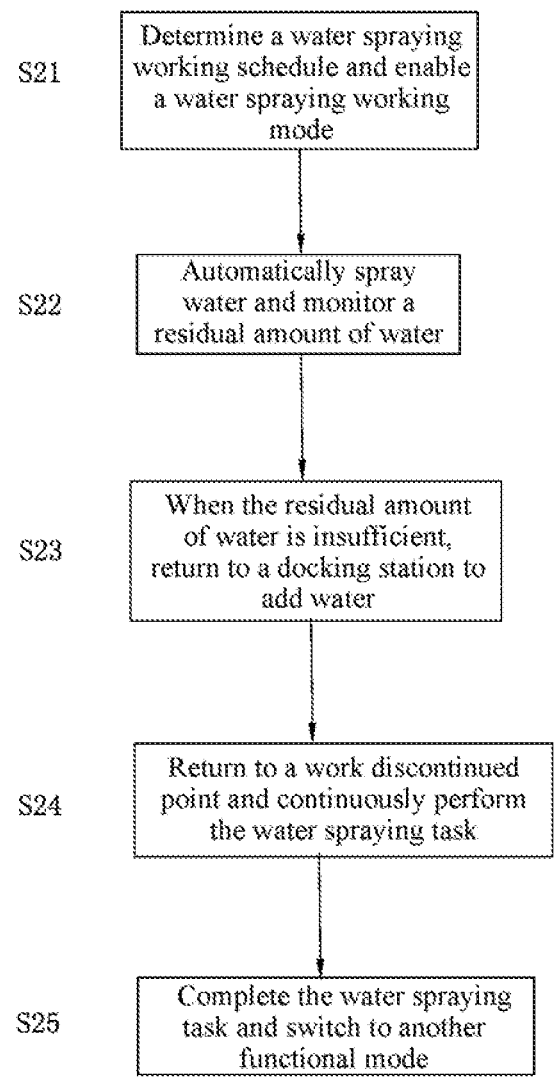
FIG. 28 is a workflow chart showing a self-moving gardening robot performing a water spraying task according to the present invention.

FIG. 28 shows a specific workflow for a self-moving gardening robot 100 to perform a lawn water spraying function.

Step S21: The self-moving gardening robot 100 receives a water spraying working schedule and enables a water spraying working mode. In the step, there are specifically two methods for arrangement of the water spraying working schedule. Method 1: A user manually sets a water spraying working schedule of the self-moving gardening robot 100. The specific setting method and schedule may refer to the working process for the self-moving gardening robot to implement multi-functional lawn maintenance described in the foregoing text. Method 2: The self-moving gardening robot 100 obtains weather information through a wireless communication module 90 and according to the weather information, lawn moisture monitoring information, and a working schedule of a task such as grass cutting, automatically sets a water spraying working schedule or automatically modifies a water spraying working schedule set by a user.

Step S22: The self-moving gardening robot 100 automatically sprays water and monitors a residual amount of water in a material cavity 52 in the water spraying process. The specific process of automatic water spraying may refer to the working process for the self-moving gardening robot to implement multi-functional lawn maintenance described in the foregoing text. The specific monitoring method may be implemented by using the foregoing capacity detection device 524.

Step S23: When the residual amount of water is less than a preset capacity, the self-moving gardening robot 100 automatically returns to a docking station 400 for replenishing water.

Step S24: After water replenishing is completed, the self-moving gardening robot 100 returns to a work interrupted point and continuously performs the water spraying task. The specific workflow of step S23 and step S24 may refer to relevant content of the working process for the self-moving gardening robot to implement multi-functional lawn maintenance described in the foregoing text.

Step S25: After the self-moving gardening robot 100 completes the water spraying task, the user or the self-moving gardening robot 100 switches so that the self-moving gardening robot 100 enters another working mode, is turned off, or returns to a docking station 400 for docking. In the step, the self-moving gardening robot 100 determines whether the water spraying task is completed after traversing all lawn areas.

If the area needing water spraying is large, step S22 to step S24 need to be repeated multiple times in the process in which the self-moving gardening robot 100 completes the water spraying task. In one of embodiments, the self-moving gardening robot 100 selects a path on which water spraying is not performed to travel each time the self-moving gardening robot 100 goes back and forth between the interrupted point and the docking station.

In the process in which the self-moving gardening robot 100 performs the water spraying task, if electric energy insufficiency appears to the self-moving gardening robot 100, the self-moving gardening robot 100 automatically returns to the docking station 400 for replenishing electric energy.

Figure 29:
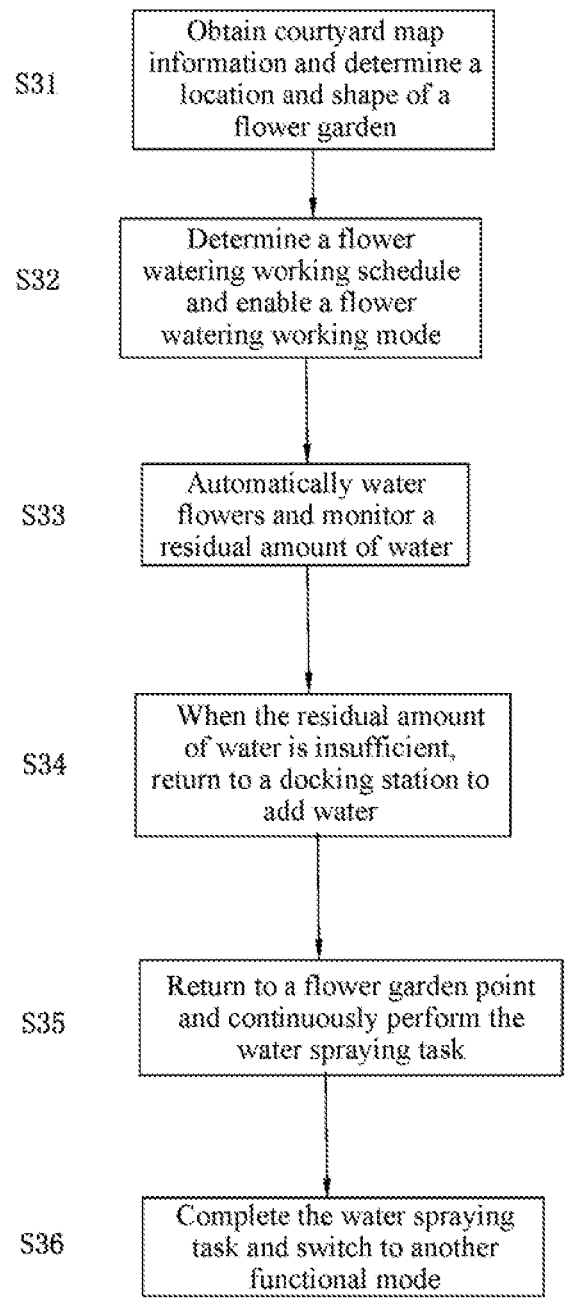
FIG. 29 is a workflow chart showing a self-moving gardening robot performing a flower watering task according to the present invention.

FIG. 29 shows a specific workflow for a self-moving gardening robot 100 to perform a flower watering function.

Step S31: The self-moving gardening robot 100 obtains courtyard map information, location information of a flower garden, and flower garden shape information. In the step, the specific process for obtaining the map information and a location and shape information of the flower garden may refer to relevant content of the working process for the self-moving gardening robot to implement multi-functional lawn maintenance described in the foregoing text.

Step S32: The self-moving gardening robot 100 receives a flower watering working schedule and enables a flower watering working mode. In the step, there are specifically two methods for arrangement of the flower watering working schedule. Method 1: A user manually sets a flower watering working schedule of the self-moving gardening robot 100. The specific setting method and schedule may refer to relevant content of the working process for the self-moving gardening robot to implement multi-functional lawn maintenance described in the foregoing text. Method 2: The self-moving gardening robot 100 obtains weather information through a wireless communication module 90 and according to the weather information, lawn moisture monitoring information, and a working schedule of a task such as grass cutting, automatically sets a flower watering working schedule or automatically modifies a flower watering working schedule set by a user.

Step S33: The self-moving gardening robot 100 automatically waters flowers and monitors a residual amount of water in a material cavity 52. The flower watering mode may be implemented by using the spraying device 526 described in the foregoing text. The specific process of automatic flower watering may refer to relevant content of the working process for the self-moving gardening robot to implement multi-functional lawn maintenance described in the foregoing text. The specific monitoring method may be implemented by using the foregoing capacity detection device 524.

Step S34: When the residual amount of water is less than a preset capacity, the self-moving gardening robot 100 automatically returns to a docking station 400 for replenishing water.

Step S35: After water replenishing is completed, the self-moving gardening robot 100 returns to a flower garden point and continuously performs the flower watering task. The specific workflow of step S34 and step S35 may refer to relevant content of the working process for the self-moving gardening robot to implement multi-functional lawn maintenance described in the foregoing text.

Step S36: After the self-moving gardening robot 100 completes the flower watering task, the user or the self-moving gardening robot 100 switches so that the self-moving gardening robot 100 enters another working mode, is turned off, or returns to the docking station 400 for docking. In the step, the self-moving gardening robot 100 determines whether the flower watering task is completed after traversing all flower garden location points.

If the area of the flower garden needing to be watered is large, step S33 to step S35 need to be repeated multiple times in the process in which the self-moving gardening robot 100 completes the flower watering task.

In the process in which the self-moving gardening robot 100 performs the flower watering task, if electric energy insufficiency appears to the self-moving gardening robot 100, the self-moving gardening robot 100 automatically returns to the docking station 400 for replenishing electric energy.

Figure 30:
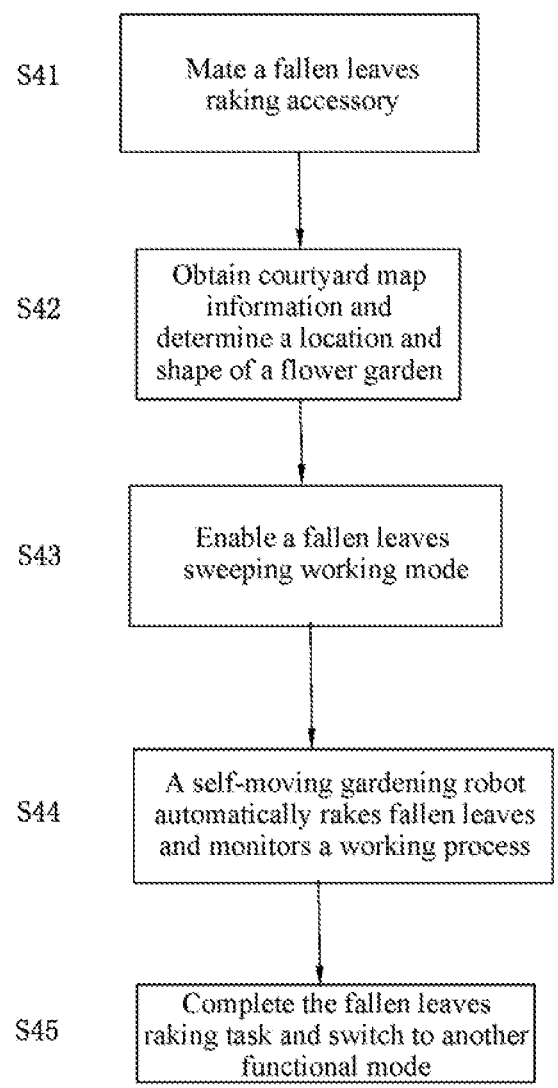
FIG. 30 is a workflow chart showing a self-moving gardening robot performing a fallen leaves sweeping task according to the present invention.

FIG. 30 shows a specific workflow for a self-moving gardening robot 100 to perform a fallen leaves raking function.

Step S41: The user installs a fallen leaves raking accessory 54d to a multi-functional accessory interface 12 of the self-moving gardening robot 100.

Step S42: The self-moving gardening robot 100 obtains courtyard map information, location information of a fallen leaves area, and fallen leaves area shape information. In the step, the specific process for obtaining the map information and a location and shape information of the fallen leaves area may refer to relevant content of the working process for the self-moving gardening robot to implement multi-functional lawn maintenance described in the foregoing text.

Step S43: The self-moving gardening robot 100 enables a fallen leaves sweeping working mode. In the step, there are specifically two methods for enabling of the fallen leaves sweeping working mode. Method 1: The user has set the fallen leaves sweeping schedule, and the self-moving gardening robot 100 automatically enables the fallen leaves sweeping working mode at a predetermined time according to the schedule. Method 2: The user directly enables the fallen leaves sweeping working mode manually.

Step S44: The self-moving gardening robot 100 automatically performs a fallen leaves raking working task and monitors a working process. The specific process of automatically performing a fallen leaves raking working task may refer to relevant content of the working process for the self-moving gardening robot to implement multi-functional lawn maintenance described in the foregoing text.

Step S45: After the self-moving gardening robot 100 completes the fallen leaves raking task, the user or the self-moving gardening robot 100 switches so that the self-moving gardening robot 100 enters another working mode, is turned off, or returns to the docking station 400 for docking. In the step, the self-moving gardening robot 100 determines whether the fallen leaves sweeping task is completed after traversing all fallen leaves area location points.

In the process in which the self-moving gardening robot 100 performs the fallen leaves sweeping task, if electric energy insufficiency appears to the self-moving gardening robot 100, the self-moving gardening robot 100 automatically returns to the docking station 400 for replenishing electric energy.

By mating a withered grass removing or soil loosening accessory, the scenario and workflow for the self-moving gardening robot 100 to perform a withered grass removing or soil loosening function are enabled to be similar to those for the self-moving gardening robot 100 to perform the fallen leaves sweeping function, and therefore the workflow for the self-moving gardening robot 100 to perform the withered grass removing or soil loosening function may also refer to FIG. 18.

Figure 31:
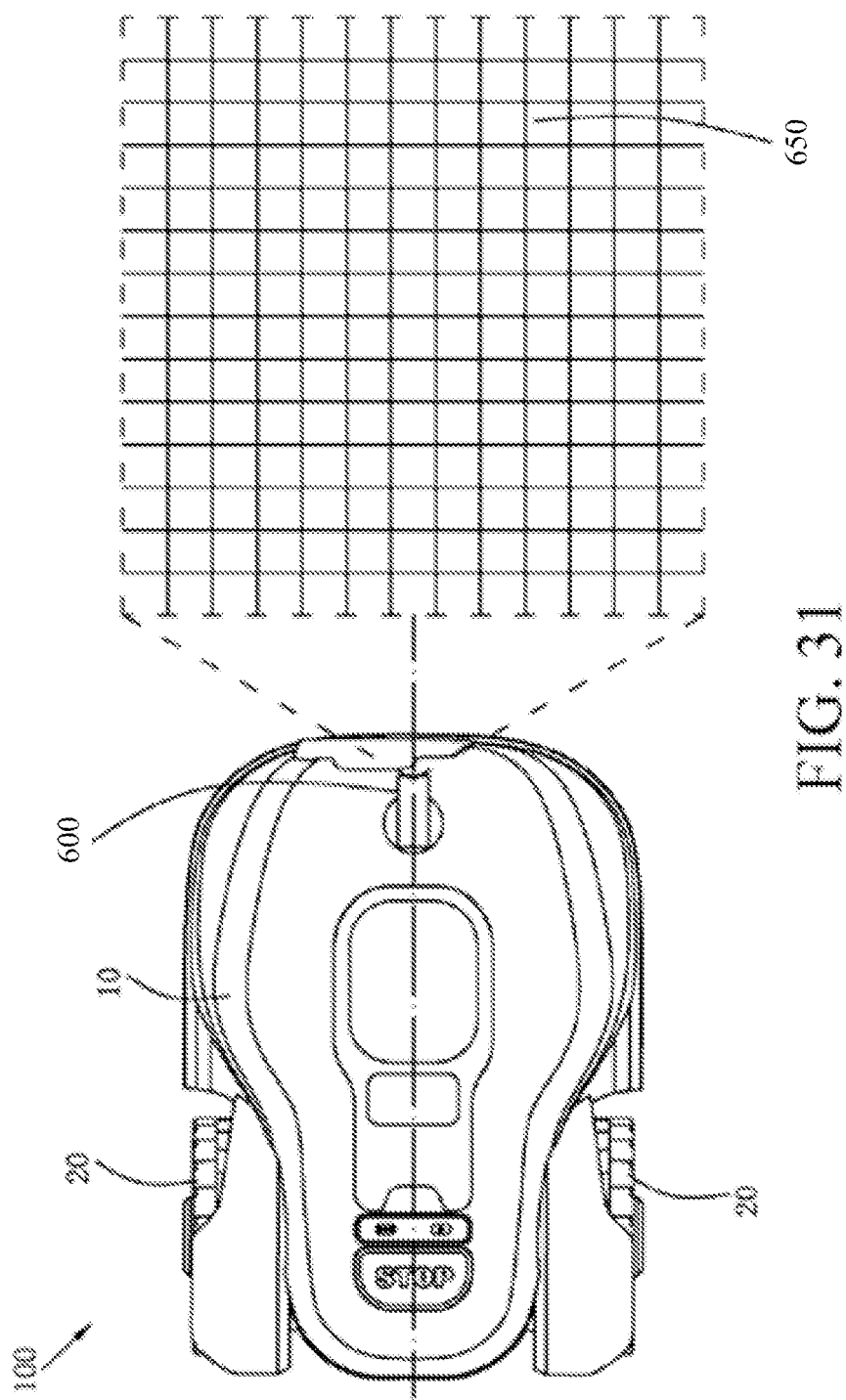
FIG. 31 is a schematic diagram of a field of view of a self-moving gardening robot according to the present invention.

In an embodiment, the self-moving gardening robot 100 further has a function of identifying normal grasses and weeds. As shown in FIG. 31, a housing 10 of the self-moving gardening robot 100 is provided with an image sensor 600, specifically, a video camera, a photographic camera, or the like. The image sensor 600 photographs an image of a front area of the self-moving gardening robot 100. In this embodiment, a field of view of the image sensor 600 is a fixed area, for fixed viewing angle range from 90° to 120°. In other optional embodiments, the field of view may alternatively be movable. An angle range within the viewing angle range may be selected and used as an actual field of view. For example, a range of 90 degrees in a middle part of 120 degrees of the viewing angle range is selected as the actual field of view. A ground area in front of the self-moving gardening robot 100 is a target area 650 to which the self-moving gardening robot 100 travels. When a working area 650 of the self-moving gardening robot 100 is a lawn, weeds and normal grasses may simultaneously exist in the target area 650. A control module 30 receives an image of the target area 650 obtained by the image sensor 600 and identifies weeds and normal grasses in the target area 650 based on an image identification algorithm. The self-moving gardening robot 100 removes weeds from the target area 650 according to an identification result of the control module 30.

There is a plurality of methods for the self-moving gardening robot 100 to remove weeds. Method 1: Mechanically remove weeds. An accessory interface of the self-moving gardening robot 100 is connected to a weeding accessory and the weeding accessory is run on an identified weeds area, to pull out or cut the weeds. The specific mechanical structure of the weeding accessory may be similar to the soil loosening accessory or the withered grass removing accessory in the foregoing text, or is an individual grass pull mechanism or individual grass cutting mechanism. Method 1: Chemically remove weeds. The material cavity 52 of the self-moving gardening robot 100 stores a chemical agent for removing weeds. On an identified weeds area, a material outlet 523 is opened to drop/eject/spray the chemical agent to the weeds.

Figure 32:
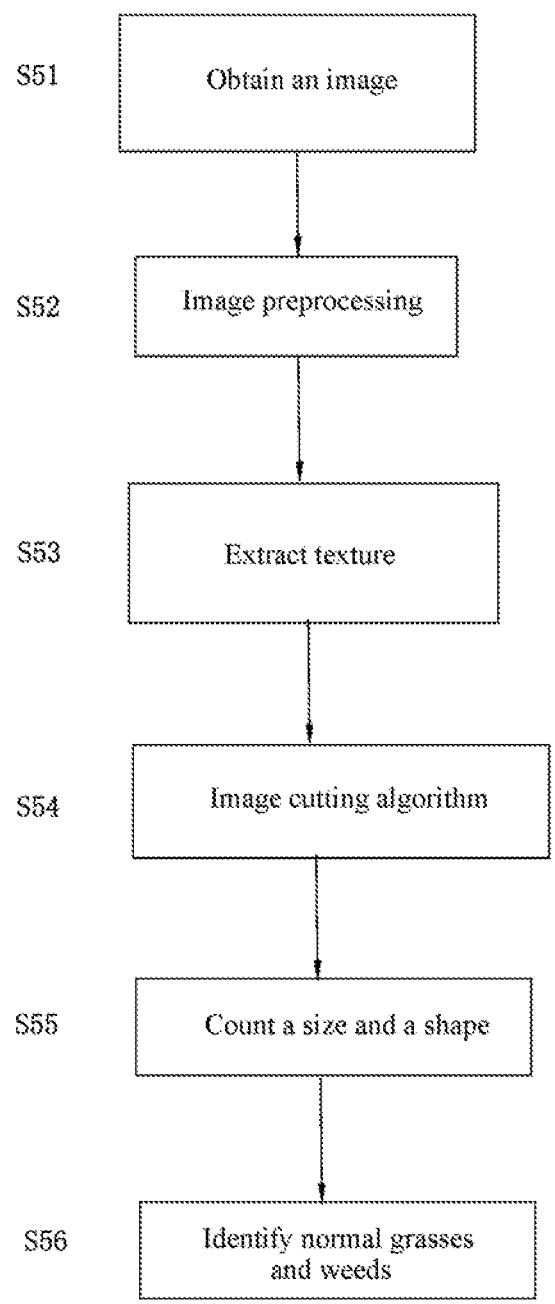
FIG. 32 is a flowchart is an algorithm for a self-moving gardening robot to identify normal grasses and weeds according to the present invention.

In this embodiment, there may be multiple types of image identification algorithms in the control module 30 for identifying weeds and normal grasses. FIG. 32 is a flowchart of a first image identification algorithm. The specific flow of steps is described as follows:

Step S51: An image sensor 600 obtains an image of a target area 650 and transmits the image to the control module 30.

Step S52: The control module 30 performs preprocessing on the image. The image preprocessing step includes operations such as enhancement and color model conversion on the image.

Step S53: The control module 30 performs texture extract on the preprocessed image.

Step S54: The control module 30 performs image cutting on the image on which texture extract has been performed.

Step S55: The control module 30 counts a profile size and shape of the cut image.

Step S56: The control module 30 compares the counted profile size and shape with a profile size and shape of normal grasses prestored in a memory, if a comparison result difference is within a preset range, determines that the grasses corresponding to the image are normal grasses, and otherwise, determines that the grasses are weeds.

In one of embodiments, before step S52, the control module 30 performs partition on the obtained image. Specifically, as shown in FIG. 31, the target area 650 is divided into a plurality of subareas, and operations in subsequent steps are performed on each subarea. The partition operation performed on the image facilitates positioning of a weeds location by the self-moving gardening robot 100.

Figure 33:
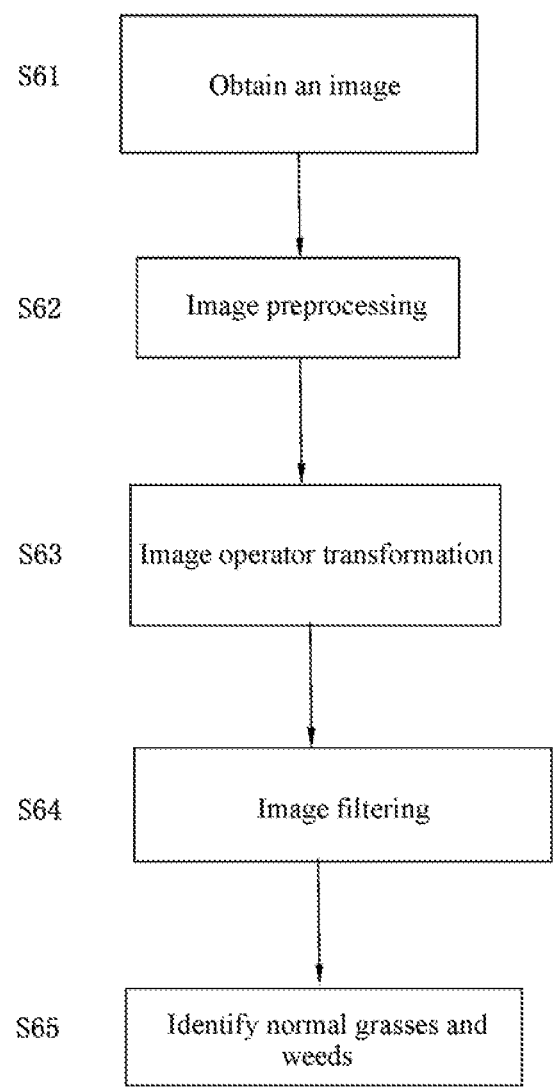
FIG. 33 is a flowchart is another algorithm for a self-moving gardening robot to identify normal grasses and weeds according to the present invention.

FIG. 33 is a flowchart of a second image identification algorithm. The specific flow of steps is described as follows:

Step S61: An image sensor 600 obtains an image of a target area 650 and transmits the image to the control module 30.

Step S62: The control module 30 performs preprocessing on the image. The image preprocessing step includes operations such as enhancement and color model conversion on the image.

Step S63: The control module 30 performs operator transformation on the preprocessed image. The specific operation of the operator transformation includes Haar operator transformation, Fourier transformation, or wavelet transformation of other forms.

Step S64: The control module 30 filters the transformed image. A filter operator is set according to an actual condition of normal grasses or weeds in the lawn.

Step S65: The control module 30 compares the filtered image and a preset image of normal grasses, if a comparison result difference is within a preset range, determines that the grasses corresponding to the image are normal grasses, and otherwise, determines that the grasses are weeds.

In one of embodiments, before step S62, the control module 30 performs partition on the obtained image. Specifically, as shown in FIG. 19, the target area 650 is divided into a plurality of subareas, and operations in subsequent steps are performed on each subarea. The partition operation performed on the image facilitates positioning of a weeds location by the self-moving gardening robot 100.

In another embodiment, the function of the self-moving gardening robot 100 for identifying normal grasses and weeds may alternatively be implemented by using a spectrum sensor. The housing 10 of the self-moving gardening robot 100 is provided with a spectrum sensor. The spectrum sensor obtains spectrum data in the target area 70. The control module 30 receives the spectrum data obtained by the spectrum sensor and compares the spectrum data and a spectrum range of normal grasses prestored in the memory, if the spectrum data is within the spectrum range of the normal grasses, determines that the grasses in the area corresponding to the spectrum data are normal grasses, and otherwise, determines that the grasses are weeds. Certainly, a spectrum range of weeds may alternatively be preset in the memory. If the spectrum data obtained by the spectrum sensor is within the spectrum range of weeds, it is determined that the grasses in the area corresponding to the spectrum data are weeds and the control module 30 controls the self-moving gardening robot to enter the corresponding area to perform a weeds removing action.

The present invention is not limited to the specific embodiment structure and all structures based on the concept of the present invention fall within the protection scope of the present invention.

What is claimed is:

1. A self-moving gardening robot, configured to perform at least two lawn care works, comprising:
   a housing;
   a moving module, driving the self-moving gardening robot to move;
   a working module, performing the corresponding lawn care work;
   a power module, driving the moving module and the working module;
   an energy module, supplying energy to the self-moving gardening robot; and
   a control module, controlling the self-moving gardening robot to automatically move and perform a first work of the at least two lawn care works,
   wherein:
   the self-moving gardening robot comprises a positioning module, configured to obtain location information of the self-moving gardening robot; the control module comprises a path planning unit, storing a preset path mode; and the control module controls the self-moving gardening robot to move in the preset path mode based on the obtained location information; and wherein:
the control module generates a preset moving path, the preset moving path comprising a reciprocating path that includes a first direction and a second direction;
the working module comprises a fallen leaves collecting module, configured to perform a fallen leaves collecting work; and the fallen leaves collecting module comprises a leaves raking part, configured to centralize fallen leaves on a working surface of the self-moving gardening robot and to enable the centralized fallen leaves to move with the self-moving gardening robot; and
the control module controls the self-moving gardening robot to move along the first direction of the reciprocating path when performing the fallen leaves collecting work, controls the leaves raking part to perform a leaves raking work when the self-moving gardening robot moves along the first direction of the reciprocating path, so that the fallen leaves move to a fallen leaves storage location of a working area, and controls the leaves raking part not to perform the leaves raking work when the self-moving gardening robot moves along the second direction of the reciprocating path.

2. The self-moving gardening robot according to claim 1, wherein: the path planning unit stores at least two preset path modes and the control module controls the self-moving gardening robot to move in the corresponding preset path modes respectively when performing the at least two lawn care works.

3. The self-moving gardening robot according to claim 1, wherein: the working module further comprises at least one of a grass cutting module, a liquid spraying module, a fertilizing module, a soil loosening module, a sowing module, a withered grass removing module, and a sweeping module, to respectively perform a second work of the at least two lawn care works.

4. The self-moving gardening robot according to claim 1, wherein: the self-moving gardening robot comprises an accessory interface, configured to externally connect the working module performing the lawn care work.

5. The self-moving gardening robot according to claim 1, wherein: the self-moving gardening robot further comprises an ambient detection module, configured to detect an environment of the working area; the control module generates the preset moving path or a preset target location based on the preset path mode and based on at least the ambient information and/or the location information; and the control module controls the self-moving gardening robot to move along the preset moving path or to move toward the preset target location.

6. The self-moving gardening robot according to claim 5, wherein: the control module generates at least two preset moving paths for performing the first lawn care work, so that moving paths of the self-moving gardening robot when performing the fallen leaves collecting work are not repeated.

7. The self-moving gardening robot according to claim 5, wherein, for the first work of the at least two lawn care works:

the preset moving path comprises the reciprocating path;
the working module comprises the fallen leaves collecting module, configured to perform the fallen leaves collecting work; and the fallen leaves collecting module comprises the leaves raking part, configured to centralize fallen leaves on the working surface and to enable the centralized fallen leaves to move with the self-moving gardening robot; and
the control module controls the self-moving gardening robot to move along the reciprocating path when performing the fallen leaves collecting work, controls the leaves raking part to perform the leaves raking work when the self-moving gardening robot moves along the first direction of the reciprocating path, so that the fallen leaves move to the fallen leaves storage location along the moving direction of the self-moving gardening robot, and controls the leaves raking part not to perform the leaves raking work when the self-moving gardening robot moves along the second direction of the reciprocating path, so that the self-moving gardening robot returns to the working area.

8. The self-moving gardening robot according to claim 5, wherein:
the working module comprises, for a second work of the at least two lawn care works, a spraying device, configured to perform a liquid spraying work; and the preset target location comprises a spraying location; and
the control module generates at least two spraying locations, and the control module controls the self-moving gardening robot to move to the at least two spraying locations to perform the liquid spraying work and controls working parameters of the self-moving gardening robot to be different when the self-moving gardening robot performs the liquid spraying work at the at least two spraying locations.

9. The self-moving gardening robot according to claim 5, wherein:
the preset target location comprises a location of a docking station of the self-moving gardening robot, or the preset moving path further comprises a moving path for the self-moving gardening robot to return back to the docking station; and
when the self-moving gardening robot interrupts performing at least one lawn care work, the control module records a location and a gesture of the self-moving gardening robot when the work is interrupted, then controls the self-moving gardening robot to move toward the docking station based on the preset moving path or the preset target location, and further controls the self-moving gardening robot to return to the location where the work is interrupted and to continuously work in the gesture when the work is interrupted.

10. The self-moving gardening robot according to claim 9, wherein:
the fallen leaves collecting module further comprises a fallen leaves storage part, storing the collected fallen leaves; and the docking station is configured to store the fallen leaves stored in the fallen leaves storage part;
the fallen leaves storage part comprises a capacity detection device, detecting a capacity of the fallen leaves stored in the fallen leaves storage part;
when the capacity detection device detects that the capacity of the fallen leaves stored in the fallen leaves storage part reaches a preset threshold, the control module controls the self-moving gardening robot to interrupt the fallen leaves collecting work, records a current location and gesture, then controls the self-moving gardening robot to move toward the docking station based on the preset moving path or the preset target location to store the fallen leaves, and further controls the self-moving gardening robot to return back to the recorded location and to continuously perform the fallen leaves collecting work in the recorded gesture.

11. The self-moving gardening robot according to claim 9, wherein: the self-moving gardening robot comprises a material cavity, configured to store a material and the self-moving gardening robot performs, for a second work of the at least two lawn care works, a corresponding material spreading work; and the docking station is configured to replenish a material to the material cavity;

the material cavity comprises a capacity detection device, detecting a material capacity in the material cavity; and when the capacity detection device detects that the material capacity in the material cavity is less than a preset threshold, the control module controls the self-moving gardening robot to interrupt the spreading work, records a current location and gesture, then controls the self-moving gardening robot to move toward the docking station based on the preset moving path or the preset target location, to replenish a material to the material cavity, and further controls the self-moving gardening robot to return back to the recorded location and to continuously perform the spreading work in the recorded gesture.

12. The self-moving gardening robot according to claim 9, wherein: the moving path for the self-moving gardening robot to return back to the docking station does not pass through an area where the self-moving gardening robot has performed the lawn care work or the moving path for the self-moving gardening robot to return back to the docking station comprises a shortest path from a returning start point to the docking station.

13. The self-moving gardening robot according to claim 9, wherein: the control module controls the self-moving gardening robot to return back to the docking station in a varying moving path.

14. The self-moving gardening robot according to claim 1, wherein: the self-moving gardening robot comprises a wireless communication module, configured to implement wireless communications between the self-moving gardening robot and a user equipment, the self-moving gardening robot receives the preset path mode set by a user through the wireless communication module, and the path planning unit stores the preset path mode set by the user or the self-moving gardening robot comprises a self-learning mode, and in the self-learning mode, the self-moving gardening robot learns about the preset path mode, and the path planning unit stores the preset path mode learned by the self-moving gardening robot.

15. The self-moving gardening robot according to claim 1, wherein: the self-moving gardening robot comprises a function selection module and the control module controls the self-moving gardening robot to correspondingly perform at least one lawn care work according to an instruction received by the function selection module.

16. The self-moving gardening robot according to claim 15, wherein: the self-moving gardening robot comprises an input module, disposed in the housing, for a user to input an instruction of performing at least one lawn care work, and configured to transmit the instruction to the function selection module or the self-moving gardening robot comprises a wireless communication module, configured to implement wireless communications between the self-moving gardening robot and a user equipment; and the wireless communication module receives an instruction of performing at least one lawn care work sent by the user equipment and transmits the instruction to the function selection module.

17. The self-moving gardening robot according to claim 15, wherein: the control module controls an order for the self-moving gardening robot to perform the at least two lawn care works according to the instruction received by the function selection module.

18. The self-moving gardening robot according to claim 1, wherein: the self-moving gardening robot comprises a grass condition identification sensor, configured to identify a grass growth condition; the control module comprises a storage unit and the storage unit stores location information of a location where the self-moving gardening robot passes during moving and information about a grass condition identified at the location; and after the self-moving gardening robot traverses the working area, the control module counts grass conditions in the working area.

19. The self-moving gardening robot according to claim 1, wherein: the self-moving gardening robot comprises a wireless communication module and is remotely connected to a service end through the wireless communication module and the service end collects or/and counts relevant data information about the self-moving gardening robot.

* * * * *